US 7,403,752 B2

(12) United States Patent
Raghavan et al.

(10) Patent No.: US 7,403,752 B2
(45) Date of Patent: *Jul. 22, 2008

(54) MULTI-CHANNEL COMMUNICATIONS TRANSCEIVER

(75) Inventors: Sreen A. Raghavan, La Jolla, CA (US); Thulasinath G. Manickam, San Diego, CA (US); Peter J. Sallaway, San Diego, CA (US); Gerard E. Taylor, Laguna Nigel, CA (US)

(73) Assignee: Vativ Technologies, Inc., San Diego, CA (US)

(*) Notice: Subject to any disclaimer, the term of this patent is extended or adjusted under 35 U.S.C. 154(b) by 116 days.

This patent is subject to a terminal disclaimer.

(21) Appl. No.: 10/310,255

(22) Filed: Dec. 4, 2002

(65) Prior Publication Data

US 2003/0134607 A1 Jul. 17, 2003

Related U.S. Application Data

(63) Continuation-in-part of application No. 10/167,158, filed on Jun. 10, 2002, which is a continuation-in-part of application No. 10/071,771, filed on Feb. 6, 2002, which is a continuation-in-part of application No. 09/965,242, filed on Sep. 26, 2001, which is a continuation-in-part of application No. 09/904,432, filed on Jul. 11, 2001.

(51) Int. Cl.
*H04B 17/02* (2006.01)

(52) U.S. Cl. .............. 455/132; 455/291.1; 455/323; 455/334; 379/265

(58) Field of Classification Search .............. 455/132, 455/103, 203, 115.1, 114.2, 91, 295–296, 455/307, 423, 107–104, 114.3, 118–119, 455/333, 334, 67.13, 67.11, 251.1, 313–314, 455/323, 371–341; 379/219, 298, 260–265, 379/322, 350

See application file for complete search history.

(56) References Cited

U.S. PATENT DOCUMENTS 4,025,719 A 5/1977 Nussbaumer
4,455,649 A 6/1984 Esteban et al.
4,599,732 A 7/1986 LeFever
4,679,225 A 7/1987 Higashiyama
4,710,922 A 12/1987 Scott (Continued)

FOREIGN PATENT DOCUMENTS

| CN | 2161025 Y | 4/1994 |
|---|---|---|
| EP | 0554056 B1 | 5/1998 |
| EP | 0987830 A | 3/2000 |
| TW | 238628 | 8/2005 |
| WO | WO 97/30521 | 8/1997 |
| WO | WO 99/45683 | 9/1999 |
| WO | WO 00/51303 A | 8/2000 |
| WO | WO 03/007564 A | 1/2003 |
| WO | WO 2004/109948 A2 | 12/2004 |

OTHER PUBLICATIONS

Response to Office Action file Sep. 12, 2006 in U.S. Appl. No. 09/904,432.

(Continued)

*Primary Examiner*—Pablo N. Tran
(74) *Attorney, Agent, or Firm*—Finnegan, Henderson, Farabow, Garrett & Dunner, L.L.P.

(57) ABSTRACT

A transceiver system according to the present invention transmits data utilizing the baseband and one or more frequency separated transmission bands. A baseband transmitter is combined with one or more transmitters that transmit data into one of the frequency separated transmission bands. A baseband receiver is combined with one or more receivers that receive data from the frequency separated transmission bands. Any combination of modulation systems can be utilized (e.g. PAM for the baseband and QAM for the frequency separated bands). A transceiver circuit or chip according to the present invention includes a transmitter and a receiver and communicates with a corresponding transceiver chip. In some embodiments, one baseband PAM transmitter is combined with one frequency separated QAM transmitter.

35 Claims, 22 Drawing Sheets

U.S. PATENT DOCUMENTS

| | | | |
|---|---|---|---|
| 4,995,031 | A | 2/1991 | Aly et al. |
| 5,079,770 | A | 1/1992 | Scott |
| 5,285,474 | A | 2/1994 | Chow et al. |
| 5,293,378 | A | 3/1994 | Shimizu |
| 5,535,228 | A | 7/1996 | Dong et al. |
| 5,604,768 | A | 2/1997 | Fulton |
| 5,715,280 | A | 2/1998 | Sandberg et al. |
| 5,781,617 | A | 7/1998 | McHale et al. |
| 5,796,783 | A | 8/1998 | Crawford |
| 5,808,671 | A | 9/1998 | Maycock et al. |
| 5,822,368 | A | 10/1998 | Wang |
| 5,838,268 | A | 11/1998 | Frenkel |
| 5,838,732 | A | 11/1998 | Carney |
| 5,838,740 | A | 11/1998 | Kallman et al. |
| 5,844,950 | A | 12/1998 | Aono et al. |
| 5,852,629 | A | 12/1998 | Iwamatsu |
| 5,930,231 | A | 7/1999 | Miller et al. |
| 5,991,311 | A | 11/1999 | Long et al. |
| 5,999,575 | A | 12/1999 | Morinaga et al. |
| 6,005,893 | A | 12/1999 | Hyll |
| 6,044,112 | A | 3/2000 | Koslov |
| 6,121,828 | A | 9/2000 | Sasaki |
| 6,128,114 | A | 10/2000 | Wingo |
| 6,160,820 | A | 12/2000 | Isaksson et al. |
| 6,163,563 | A * | 12/2000 | Baker et al. ............... 375/130 |
| 6,246,664 | B1 | 6/2001 | Bohm |
| 6,252,900 | B1 | 6/2001 | Liu et al. |
| 6,259,745 | B1 | 7/2001 | Chan |
| 6,269,129 | B1 | 7/2001 | Rhee et al. |
| 6,275,544 | B1 | 8/2001 | Aiello et al. |
| 6,292,559 | B1 | 9/2001 | Gaikwad et al. |
| 6,351,293 | B1 | 2/2002 | Perlow |
| 6,351,677 | B1 | 2/2002 | Leyonhjelm et al. |
| 6,407,843 | B1 | 6/2002 | Rowan et al. |
| 6,418,161 | B1 | 7/2002 | Shively et al. |
| 6,438,174 | B1 | 8/2002 | Isaksson et al. |
| 6,441,683 | B1 | 8/2002 | Hwang et al. |
| 6,462,679 | B1 | 10/2002 | Van Nguyen |
| 6,477,207 | B1 | 11/2002 | Lindholm |
| 6,496,540 | B1 | 12/2002 | Widmer |
| 6,522,702 | B1 | 2/2003 | Maruyama |
| 6,529,303 | B1 | 3/2003 | Rowan et al. |
| 6,647,071 | B2 | 11/2003 | Sommer et al. |
| 6,678,319 | B1 * | 1/2004 | Jamali ..................... 375/234 |
| 6,714,529 | B1 * | 3/2004 | Tanabe et al. ............ 370/343 |
| 6,724,331 | B1 | 4/2004 | El-Ghoroury et al. |
| 6,731,704 | B1 | 5/2004 | Kiyanagi |
| 6,804,497 | B2 | 10/2004 | Kerth et al. |
| 6,807,234 | B2 | 10/2004 | Hansen |
| 6,831,954 | B1 | 12/2004 | Mandyam |
| 6,970,448 | B1 | 11/2005 | Sparrell et al. |
| 6,975,685 | B1 | 12/2005 | Merriam, Jr. |
| 7,236,757 | B2 | 6/2007 | Raghavan et al. |
| 7,295,623 | B2 | 11/2007 | Raghavan |
| 2001/0031014 | A1 | 10/2001 | Subramanian et al. |
| 2002/0039052 | A1 | 4/2002 | Straub et al. |
| 2002/0086651 | A1 | 7/2002 | Prentice et al. |
| 2002/0093994 | A1 | 7/2002 | Hendrickson et al. |
| 2002/0110206 | A1 | 8/2002 | Becker et al. |
| 2002/0159551 | A1 | 10/2002 | Ekvetchavit et al. |
| 2002/0163974 | A1 | 11/2002 | Friedman |
| 2003/0017809 | A1 | 1/2003 | Garlepp et al. |
| 2003/0054782 | A1 | 3/2003 | Snider |
| 2003/0112798 | A1 | 6/2003 | Ziegler et al. |
| 2004/0091028 | A1 | 5/2004 | Aronson et al. |
| 2004/0106380 | A1 | 6/2004 | Vassiliou et al. |
| 2004/0121753 | A1 | 6/2004 | Sugar et al. |
| 2004/0130483 | A1 | 7/2004 | Brilka et al. |
| 2004/0137941 | A1 | 7/2004 | Tanaka et al. |
| 2004/0162023 | A1 | 8/2004 | Cho |
| 2004/0190660 | A1 | 9/2004 | Morris et al. |

OTHER PUBLICATIONS

Office Action issued by the Chinese IPO on Mar. 17, 2006 with English translation, 18 pages.
Response to Office Action dated Oct. 8, 2006, to the Chinese IPO.
Response to Second Examination Report for EP Appl. No. 02 748 158.9, dated Sep. 12, 2006.
Response to Final Office Action filed May 1, 2006 in U.S. Appl. No. 09/965,242.
Office Action mailed Jul. 26, 2006 in U.S. Appl. No. 09/965,242.
Response to Office Action dated Oct. 18, 2006, in U.S. Appl. No. 09/965,242.
Response to Office Action dated Mar. 28, 2006, in U.S. Appl. No. 10/071,771.
Final Office Action dated Jun. 13, 2006, in U.S. Appl. No. 10/071,771.
Response to Office Action dated Aug. 1, 2006, in U.S. Appl. No. 10/071,771.
Preliminary Amendment dated Oct. 18, 2006, in U.S. Appl. No. 10/454,382.
Office Action dated Oct. 31, 2006, in U.S. Appl. No. 10/454,382.
Reply to Office Action dated Nov. 22, 2006, in U.S. Appl. No. 10/454,382.
Notice of Allowance dated Dec. 19, 2006, in U.S. Appl. No. 09/904,432.
Amendment dated Feb. 21, 2007, in U.S. Appl. No. 09/904,432.
Second Office Action issued by the Chinese IPO in Chinese Appl. No. 02817774.6 on Dec. 15, 2006, Translation only.
Final Office Action dated Jan. 4, 2007, in U.S. Appl. No. 09/965,242.
Amendment After Final dated Feb. 21, 2007, in U.S. Appl. No. 09/965,242.
Notice of Allowance dated Jan. 4, 2007, in U.S. Appl. No. 10/071,771.
Advisory Action dated Mar. 21, 2007, in U.S. Appl. No. 09/965,242.
Notice of Allowance dated Mar. 22, 2007, in U.S. Appl. No. 10/071,771.
Office Action dated Mar. 19, 2007, in U.S. Appl. No. 10/454,382.
Notice of Allowance mailed Jun. 28, 2007, in U.S. Appl. No. 09/904,432.
Supplemental Notice of Allowance mailed Jul. 25, 2007, in U.S. Appl. No. 09/904,432.
Reply to Advisory Action filed May 4, 2007, in U.S. Appl. No. 09/965,242.
Office Action mailed Aug. 8, 2007, in U.S. Appl. No. 09/965,242.
Amendment and Response to Office Action filed May 18, 2007, in U.S. Appl. No. 10/454,382.
Office Action mailed Jun. 22, 2007, in U.S. Appl. No. 10/454,382.
Amendment and Response to Office Action filed Oct. 9, 2007, in U.S. Appl. No. 10/454,382.
Voluntary Amendment filed Nov. 2, 2006, with copy of foreign counsel transmittal letter forwarding such, in Chinese Application No. 200480015236.7.
EPO Examination Report for EP Appl. No. 02 748 158.9, dated Dec. 8, 2004 (5 pages).
EPO Response to Examination Report for EP Appl. No. 02 748 158.9, dated Jul. 5, 2005 (23 pages).
Taiwanese Office Action granting acceptance for Appl. No. 91115102, dated Jul. 13, 2005 (4 pages).
Taiwanese Response to Official Letter for Appl. No. 91115102, dated May 26, 2005 (6 pages).
Taiwanese Official Letter for Appl. No. 91115102, dated May 3, 2005 (3 pages).
International Preliminary Report on Patentability for WO Application No. PCT/US2004/014538, mailed Dec. 22, 2005 (8 pages).
Article 34 Amendment for WO Appl. No. PCT/US02/22339, filed Dec. 18, 2003 (31 pages).
Written Opinion for WO Application No. PCT/US02/22339, dated Feb. 13, 2004 (11 pages).
International Preliminary Examination Report for WO Application No. PCT/US02/22339, dated Sep. 17, 2004 (24 pages).

Final Office Action mailed Nov. 15, 2005 in U.S. Appl. No. 09/904,432.
Response to Final Office Action filed Feb. 15, 2006 in U.S. Appl. No. 09/904,432.
Response to Office Action dated Oct. 28, 2005 in U.S. Appl. No. 09/965,242.
Final Office Action mailed Jan. 30, 2006 in U.S. Appl. No. 09/965,242.
Office Action dated Dec. 28, 2005 in U.S. Appl. No. 10/071,771.
Second Examination Report for EP Appl. No. 02 748 158.9, dated Mar. 14, 2006, 10 pages.
Office Action mailed May 17, 2006 in U.S. Appl. No. 09/904,432.
Clark, Jr., G.C. and Cain, J.B., Error Correction Coding for Digital Communications (Plenum Press, New York 1981) pp. 253-264.
Lee, Edward A. and Messerschmitt, David G., Digital Communications (Kluwer Academic Publishers, 1988) pp. 371-402.
Ungerboeck, G., "Channel Coding with Multilevel/Phase Signals," IEEE Transactions on Information Theory, vol. It-28, Jan. 1982, pp. 55-67.
International Search Report dated Jul. 12, 2004, from corresponding PCT Application No. PCT/US04/014538.
Sklar, Bernard, Digital Communications, Fundamentals and Applications (Prentice-Hall, Inc., 1988), pp. 51-244 and 314-535.
Ungerboeck, G., "Trellis Coding Modulation with Redundant Signal Sets, Part I. Introduction." IEEE Communications Magazine, vol. 25, No. 2, Feb. 1987, pp. 12-21.
International Search Report for corresponding PCT Application No. PCT/US02/22339, issued Mar. 21, 2003 (4 pages).
Written Opinion for related PCT Appl. No. PCT/US2004/014538, issued Dec. 7, 2004 (6 pages).
Office Action mailed Mar. 10, 2005 in U.S. Appl. No. 09/904,432.
Response to Office Action dated Aug. 10, 2005 in U.S. Appl. No. 09/904,432.
Office Action mailed Dec. 17, 2004 in U.S. Appl. No. 09/965,242.
Response to Office Action dated Mar. 17, 2005 in U.S. Appl. No. 09/965,242.
Office Action mailed Jun. 28, 2005 in U.S. Appl. No. 09/965,242.
Office Action mailed Aug. 9, 2004 in U.S. Appl. No. 10/071,771.
Response to Office Action dated Jan. 10, 2005 in U.S. Appl. No. 10/071,771.
Office Action mailed Jun. 28, 2005 in U.S. Appl. No. 10/071,771.
Response to Office Action dated Sep. 28, 2005 in U.S. Appl. No. 10/071,771.
Office Action mailed Oct. 26, 2004 in U.S. Appl. No. 10/167,158.
Final Office Action dated Feb. 5, 2008, in U.S. Appl. No. 09/965,242.
Notice of Allowance dated Dec. 27, 2007, in U.S. Appl. No. 10/454,382.
Supplemental Notice of Allowance dated Jan. 16, 2008, in U.S. Appl. No. 10/454,382.

* cited by examiner

MULTI-CHANNEL COMMUNICATIONS TRANSCEIVER

RELATED APPLICATIONS

The present disclosure is a continuation-in-part of U.S. application Ser. No. 10/167,158 filed on Jun. 10, 2002 to Sreen A. Raghavan, Tulasinath G. Manickam, Peter J. Sallaway, and Gerard E. Taylor, which is a continuation-in-part of U.S. application Ser. No. 10/071,771 filed on Feb. 6, 2002 to Sreen A. Raghavan, Thulasinath G. Manickam, Peter J. Sallaway, and Gerard E. Taylor, which is a continuation-in-part of U.S. application Ser. No. 09/965,242 to Sreen Raghavan, Thulasinath G. Manickam, and Peter J. Sallaway, filed Sep. 26, 2001, which is a continuation-in-part of U.S. application Ser. No. 09/904,432, by Sreen Raghavan, filed on Jul. 11, 2001, assigned to the same entity as is the present application, each of which are herein incorporated by reference in its entirety.

BACKGROUND

1. Field of the Invention

The present invention is related to high-speed communications of data in a communication system and, in particular, to high data rate transmission of data between components in a communication system.

2. Discussion of Related Art

Many conventional systems for transmitting data between components within a cabinet or between cabinets of components utilize copper or optical backplanes for transmission of digital data. For example, high data rate transceiver systems are utilized in many backplane environments, including optical switching devices, router systems, switches, chip-to-chip communications and storage area networking switches. Other environments that utilize high speed communication between components include inter-cabinet communications and chip-to-chip chip communications. Typical separations of components in such systems is between about 0.1 and about 10 meters.

Existing techniques utilized in such environments typically use non-return to zero (NRZ) modulation to send and receive information over high-speed backplanes or for high data rate chip-to-chip interconnects. Typically, the transceiver for sending high-speed data over a backplane is called a serializer/deserializer, or SERDES, device.

FIG. 1A shows a block diagram of a backplane environment 100. Components 101-1 through 101-Q are coupled to transmit and receive data through input/output (I/O) ports 102-1 through 102-Q, respectively, to backplane 110. Conventionally, components 101-1 through 101-Q are SERDES devices.

FIG. 1B shows a block diagram of a conventional transmitter portion of one of SERDES devices 101-1 through 101-Q on I/O ports 102-1 through 102-Q, respectively. Parallel data is received in a bit encoder 105. Bit encoder 105 encodes the parallel data, for example by adding redundancy in the input data, to ensure a minimum rate of data transitions in the output data stream. Typical encoding schemes include rate 8/10 (8 bit input to 10 bit output) encoding. The parallel data is serialized in parallel to serial converter 106. Output driver 107 then receives the serialized data from parallel to serial converter 106 and outputs, usually, a differential voltage signal for transmission over backplane 110. In addition, there is typically a phase locked loop (PLL) 114 that provides the necessary clock signals for encoder 105 and parallel-to-serial converter 106. The input signal to PLL 114 is a reference clock signal from a system PLL 103.

FIG. 1C shows a conventional receiver 108 of one of SERDES devices 101-1 through 101-Q on I/O ports 102-1 through 102-Q, respectively, of FIG. 1A. Input driver 109 receives differential voltage signal from backplane 110 and outputs the analog data signal to clock and data recovery circuit 113. Data recovery 113 can, in some systems, perform equalization, recover the timing and output a serial bit stream of data to serial-to-parallel converter 111. The serial data is input to bit decoder 112 which converts the parallel data to parallel decoded data. Clock and data recovery circuit 113 also outputs the necessary clock signals to serial-to-parallel converter 111 and bit decoder 112.

A conventional SERDES system 100 can enable serial data communication at data rates as high as 2.5 Gbps to 3.125 Gbps over a pair of FR4 copper traces in a copper backplane communication system. One of the biggest problems with existing SERDES systems 100 is that they are very bandwidth inefficient, i.e., they require 3.125 GHz of bandwidth to transmit and receive 2.5 Gbps of data over a single pair of copper wires. Therefore, it is very difficult to increase the data rates across backplane bus 110. Additionally, SERDES system 100 requires the implementation of a high clock rate (3.125 GHz for 2.5 Gbps data rates) phase locked loop (PLL) 114 implemented to transmit data and recover high clock rates in data recovery 113. The timing window within which receiver 108 needs to determine whether the received symbol in data recovery 115 is a 1 or a 0 is about 320 ps for the higher data rate systems. This timing window creates extremely stringent requirements on the design of data recovery 115 and PLL 114, as they must have very low peak-to-peak jitter.

Conventional SERDES system 100 also suffers from other problems, including eye closure due to intersymbol interference (ISI) from the dispersion introduced by backplane 110. The ISI is a direct result of the fact that the copper traces of backplane 110 attenuate higher frequency components in the transmitted signals more than the lower frequency components in the transmitted signal. Therefore, the higher the data rate the more ISI suffered by the transmitted data. In addition, electrical connectors and electrical connections (e.g., vias and other components) used in SERDES device 100 cause reflections, which also cause ISI.

To overcome these problems, equalization must be performed on the received signal in data recovery 113. However, in existing very high data-rate communication systems, equalization is very difficult to perform, if not impossible due to the high baud rate. A more commonly utilized technique for combating ISI is known as "pre-emphasis", or pre-equalization, performed in bit encoder 105 and output driver 107 during transmission. In some conventional systems, the amplitude of the low-frequencies in the transmitted signal is attenuated to compensate for the higher attenuation of the high frequency component by the transmission medium of bus 110. While this makes the receiver more robust to ISI, pre-emphasis reduces the overall noise tolerance of transmission over backplane 110 of backplane communication system 100 due to the loss of signal-to-noise ratio (SNR). At higher data rates, conventional systems quickly become intractable due to the increased demands.

Therefore, there is a need for a more robust system for transmitting data between components on a backplane or data bus at very high speeds.

SUMMARY

In accordance with the present invention, a data transmission system is presented that allows very high data transmission rates over a data bus that utilizes the signal attenuation properties of the copper based backplane interconnect system. In addition, this transmission scheme does not result in increased intersymbol interference at the receiver despite transmitting data at a very high speed. The data transmission system includes a transmitter system and a receiver system coupled through a transmission medium. The transmitter system receives parallel data having N bits and separates the N bits into (K+1) subsets for transmission into the base band and K frequency separated channels on the transmission medium. The receiver system receives the data from the base band and the K frequency separated channels from the transmission medium and recovers the N parallel bits of data. In some embodiments, the N parallel bits are separated into (K+1) subsets of bits, the (K+1) subsets of bits are encoded into (K+1) symbols, K of which are up-converted to a carrier frequency appropriate to that channel. The summed output signal resulting from the summation of the K up-converted channels and the baseband channel is transmitted over the transmission medium.

Transmitted data in each of the (K+1) channels can suffer from inter-symbol interference (ISI) as well as cross-channel interference due to harmonic generation in up-conversion and down-conversion processes in the transmitter and receiver. In accordance with the present invention, a receiver which corrects for cross-channel interference as well as for inter-symbol interference is presented.

In some embodiments, the transmitter system includes (K+1) separate transmitters. Each of the (K+1) transmitters receives a subset of the N-bits and maps the subset of bits onto a symbol set. K of the transmitters modulate the symbols with a carrier signal at a frequency separated from that of others of the (K+1) transmitters. The summed signals from each of the (K+1) separate transmitters is transmitted over the transmission medium. The transmission medium can be any medium, including optical, infrared, wireless, twisted copper pair, or copper based backplane interconnect channel.

In some embodiments, each of the (K+1) transmitters receives a subset of the N data bits, encodes the subset, maps the encoded subset onto a symbol set appropriate for that transmitter. K of the transmitters, for example, up-convert its analog symbol stream to a carrier frequency assigned to that transmitter. The remaining transmitter transmits into the base band. The output signal from each of the transmitters is then transmitted through the transmission medium to a receiver system having a receiver for recovering the data stream transmitted on each of the carrier frequencies.

For example, in some embodiments each of the K up-converting transmitters receives the subset of bits and encodes them with a trellis encoder. One of the transmitters maps its subset of bits into a pulsed amplitude modulation (PAM) symbol set and the remaining K up-converting transmitters each maps its subset onto a quadrature-amplitude modulated (QAM) symbol set. In some embodiments, the symbols output from the QAM mapping are processed through a digital-to-analog converter before being up-converted to a carrier frequency to produce the output signal from the transmitter. The PAM transmitters can utilize a digital-to-analog converter to create the PAM symbol output voltage levels. Any combination of encoding and symbol mapping schemes can be utilized in the (K+1) transmitters.

In some embodiments, a PAM channel and one or more QAM channels can be utilized such that there is no cross-channel interference between the QAM channels and the PAM channel. In some embodiments, a single QAM channel combined with a PAM channel can be utilized.

Each of the output signals from the (K+1) transmitters are summed for transmission in (K+1) separate transmission channels on the transmission medium. The receiver receives the summed signals, with data transmitted at (K+1) separate channels. In some embodiments, the receiver down-converts the summed signals by the frequency of each of the (K) separate non-baseband channels to recover the symbols transmitted in each of the (K+1) separate channels. The baseband receiver can include a low-pass filter to separate the baseband channel from the higher frequency channels on the transmission medium. The subsets of digital data can then be recovered from the recovered symbols.

The receiver system receives the combined signal, separates the signal by carrier frequency, and recovers the bits from each carrier frequency. In some embodiments, the signal received from the transmission medium is received into (K+1) parallel receivers. Each of the (K+1) receivers separates out the signal centered around the carrier frequency allocated to that channel by the transmitter or the baseband signal, equalizes the signal, and decodes the signal to retrieve the subset of the N bits assigned to that corresponding transmitter modulator.

As a result, parallel streams of serial data bits are separated into separate subsets which are transmitted on different frequency bands to form separate channels on the transmission medium. Therefore, the data rate and the symbol rate transmitted in each of the separate channels can be much lower than the overall data transmission rate. The lower data rate and symbol rate in each channel provides for simpler receiver processing with many fewer problems (e.g., speed of components utilized for equalization and data recovery) than the high data rate transmissions. In addition, because the symbol rates are lower, the amount of receiver equalization needed on each of the (K+1) channels can be smaller, and can be implemented with simpler equalization structures. Because of the lower symbol rates, receiver signals can be processed with complex, optimal algorithms.

A complex cross-channel correction algorithm according to the present invention can also be implemented. The cross-channel correction involves adjusting each of the signals of each of the channels by some portions of the signals from the other channels in order to eliminate the interference. The parameters of the cross-channel correction can be adaptively chosen to optimize receiver performance. In some embodiments, no cross-channel interference occurs between the baseband channel and the K high frequency channels and therefore no cross-channel correction is needed between the baseband channel and the K high frequency channels.

Data transmission according to the present invention can utilize any combination of symbol mappings. For example, in some embodiments a baseband transmitter utilizing 4, 8, 16 or 32-PAM symbol mapping can be combined with one or more up-converting transmitters with 16, 32, 64, 128 or 256 QAM symbol mappers, for example. In some embodiments, an encoder can be used to encode any of the subset of bits, for example the most-significant bit before the bits are mapped onto a symbol set. For example, a 10 Gbps transceiver can utilize uncoded (no error correction coded) 16-PAM with baud rate of 1.25 GHz in combination with uncoded 16 QAM with baud rate 1.25 GHz. In another example, 4/5 trellis encoded 32-QAM can be combined with uncoded 16-PAM. In yet another example, uncoded 8-PAM can be combined with five (5) 6/7 trellis encoded 128-QAM to form a 10 Gbps transmission system. Many other examples can be utilized.

In some embodiments, the output signals from each of the up-converting transmitters transmitting into the K high frequency channels are summed and the sum signal filtered with a high-pass filter to eliminate any baseband component before the output signal from the baseband transmitter is added. Further, the baseband transmitter can include a low-pass filter to eliminate any higher frequency component of the baseband transmitter's output signal which can interfere with the signals from the up-converting transmitters.

A transmission system in accordance with the present invention can include a plurality of receivers and a cross-channel interference canceller coupled to each of the receivers for receiving signals from the high frequency channels. Each of the plurality of receivers receives signals from one of a plurality of transmission bands. One receiver receives signals from the base band channel and the remaining receive signals from higher frequency channels.

In some embodiments, at least one of the plurality of receivers that receives signals from a higher frequency channel includes a down converter that converts an input signal from: the one of the plurality of transmission bands to a base band. A filter coupled to receive signals from the down converter can substantially filter out signals not in the base band after down-conversion. Further, an analog-to-digital converter coupled to receive signals from the filter and generate digitized signals and an equalizer coupled to receive the digitized signals can be included. In some embodiments, a trellis decoder coupled to receive signals from the equalizer and generate recreated data, the recreated data being substantially the same data transmitted by a corresponding transmitter. In some embodiments, a cross-channel interference canceller can be coupled to receive output signals from each of the equalizers and to provide signals to a digital filter or the trellis decoder.

In some embodiments, the receiver that receives signals from the base band channel includes a low pass filter to filter out signals at high frequencies (e.g., the remaining channels), an analog to digital converter, an equalizer, and a data recovery circuit. In some embodiments, the equalizer can have adaptively chosen equalization parameters.

These and other embodiments are further discussed below with respect to the following figures.

SHORT DESCRIPTION OF THE FIGURES

In the figures, elements designated with the same identifications on separate figures are considered to have the same or similar functions.

DETAILED DESCRIPTION

Figure 2A:
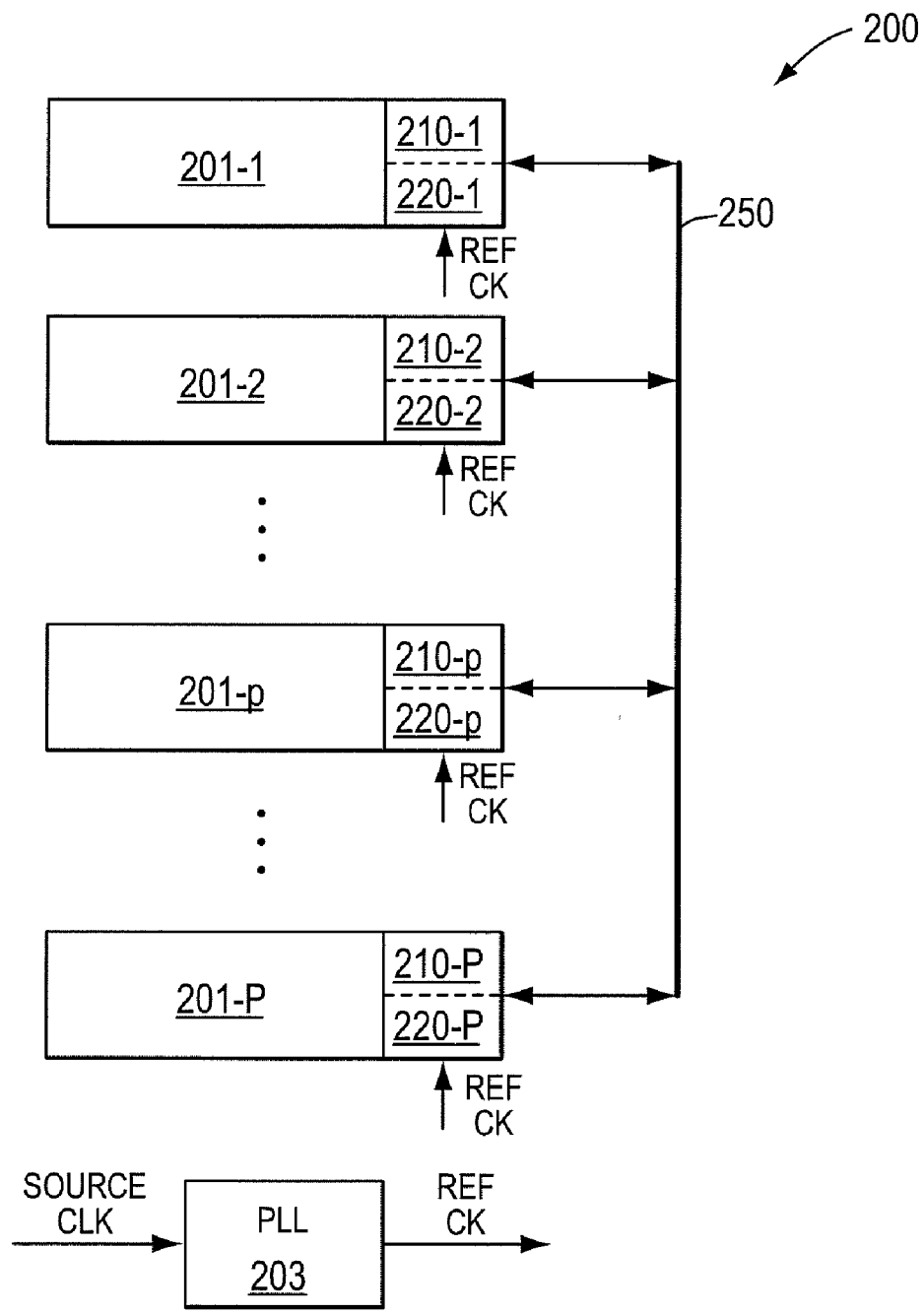
FIG. 2A shows a block diagram of a transmission system according to the present invention.

FIG. 2A shows a block diagram of a transmission system 200 according to the present invention. System 200 includes any number of components 201-1 through 201-P, with component 201-p representing an arbitrary one of components 201-1 through 201-P, coupled through a transmission medium 250. Transmission medium 250 may couple component 201-p to all of the components 201-1 through 201-P or may couple component 201-p to selected ones of components 201-1 through 201-P. In some embodiments, components 201-1 through 201-P are coupled through FR4 copper traces.

System 200 can represent any backplane system, any chassis-to-chassis digital communication system, or any chip-to-chip interconnect with components 201-1 through 201-P representing individual cards, cabinets, or chips, respectively.

Transmission channel 250 can represent any transmission channel, including optical channels, wireless channels, or metallic conductor channels such as copper wire or FR4 copper traces. Typically, transmission channel 250 attenuates higher frequency signals more than lower frequency signals. As a result, intersymbol interference problems are greater for high data rate transmissions than for low data rate transmissions. In addition, cross-talk from neighboring signals increases with transmission frequency.

Components 201-1 through 201-P include transmitter systems 210-1 through 210-P, respectively, and receiver systems 220-1 through 220-P, respectively. In operation, one of transmitter systems 210-1 through 210-P from one of components 201-1 through 201-P is in communication with one of receiver systems 220-1 through 220-P from a different one of components 201-1 through 201-P. Further, in some embodiments, timing for all of components 201-1 through 201-P can be provided by a phase-locked-loop (PLL) 203 synchronized to a transmit source clock signal. In some embodiments, PLL 203 provides a reference clock signal and each of components 201-1 through 201-P can include any number of phase locked loops to provide internal timing signals.

In some systems, for example backplane systems or cabinet interconnects, the transmission distance through transmission channel 250, i.e. the physical separation between components 201-1 through 201-P, can be as low as 1 to 1.5 meters. In some chip-to-chip environments, the physical separation between components 201-1 though 201-P can be much less (for example a few millimeters or a few centimeters). In some embodiments of the present invention, separations between components 201-1 through 201-P as high as about 100 meters can be realized. Furthermore, in some embodiments transmission channel 250 can be multiple twisted copper pair carrying differential signals between components 201-1 through 201-P. In some embodiments, components 201-1 through 201-P can share wires so that fewer wires can be utilized. In some embodiments, however, dedicated twisted copper pair can be coupled between at least some of components 201-1 through 201-P. Further, transmission medium 250 can be an optical medium, wireless medium, or data bus medium.

Figure 2B:
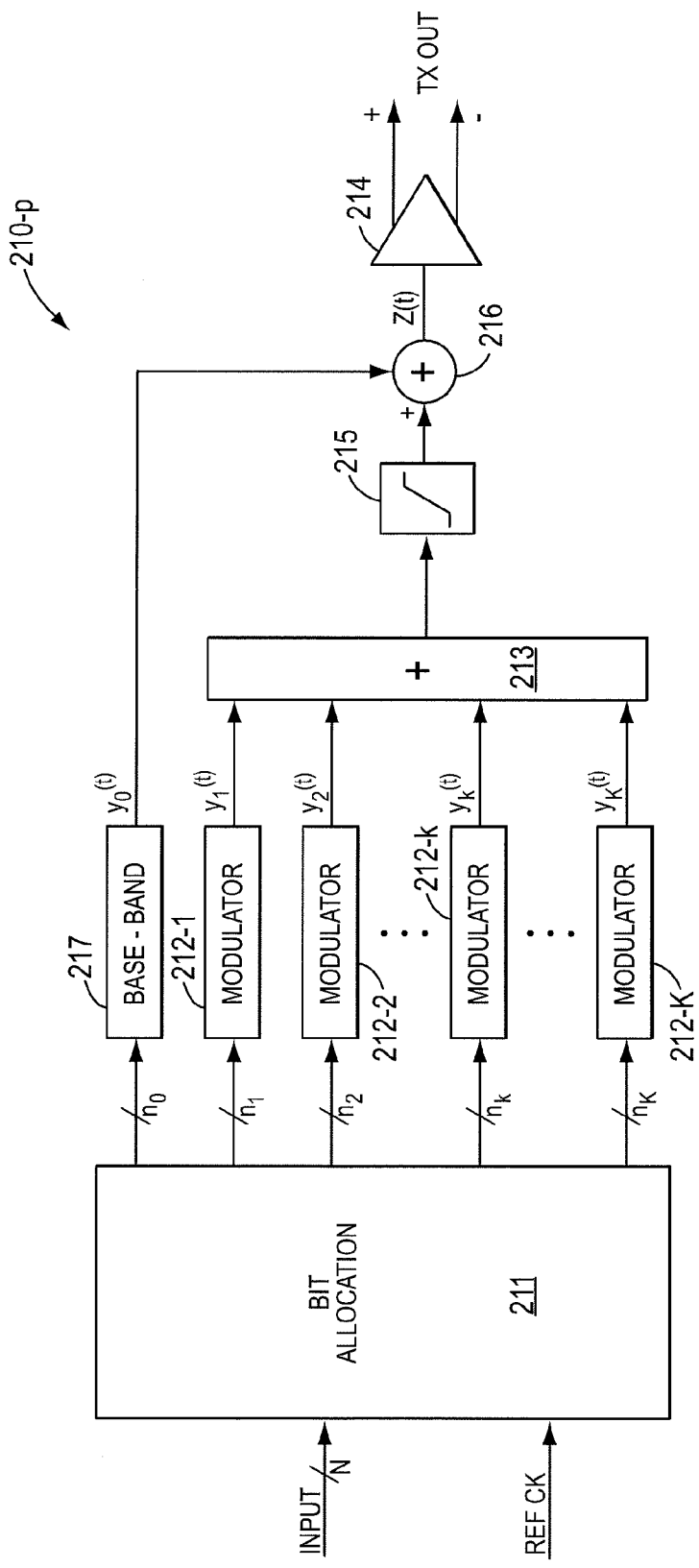
FIG. 2B shows a block diagram of a transmitter according to the present invention.

FIG. 2B shows a block diagram of an embodiment of transmitter system 210-p, an arbitrary one of transmitter systems 210-1 through 210-P. Transmitter system 210-p receives an N-bit parallel data signal at a bit allocation block 211. Bit allocation block 211 also receives the reference clock signal from PLL 203. Bit allocation block 211 segregates the N input bits into K+1 individual channels such that there are n, through nK bits input to transmitters 212-1 through 212-K, respectively, and no bits input to baseband transmitter 217. Transmitter 217 and transmitters 212-1 through 212-K transmit into (K+1) channels. In some embodiments, each of the N bits is assigned to one of the K+1 individual channels so that the sum of $n_0$ through $n_K$ is the total number of bits N. In some embodiments, bit allocation block 211 may include error pre-coding, redundancy, or other overall encoding such that the number of bits output, i.e.

$$\sum_{i=0}^{K} n_i,$$

is greater than N.

Each of transmitters 212-1 through 212-K encodes the digital data input to it and outputs a signal modulated at a different carrier frequency. Therefore, the $n_k$ digital data bits input to transmitter 212-k, an arbitrary one of transmitters 212-1 through 212-K, is output as an analog signal in a kth transmission channel at a carrier frequency $f_k$. Additionally, baseband transmitter 217 transmits into the baseband channel.

Figure 3:
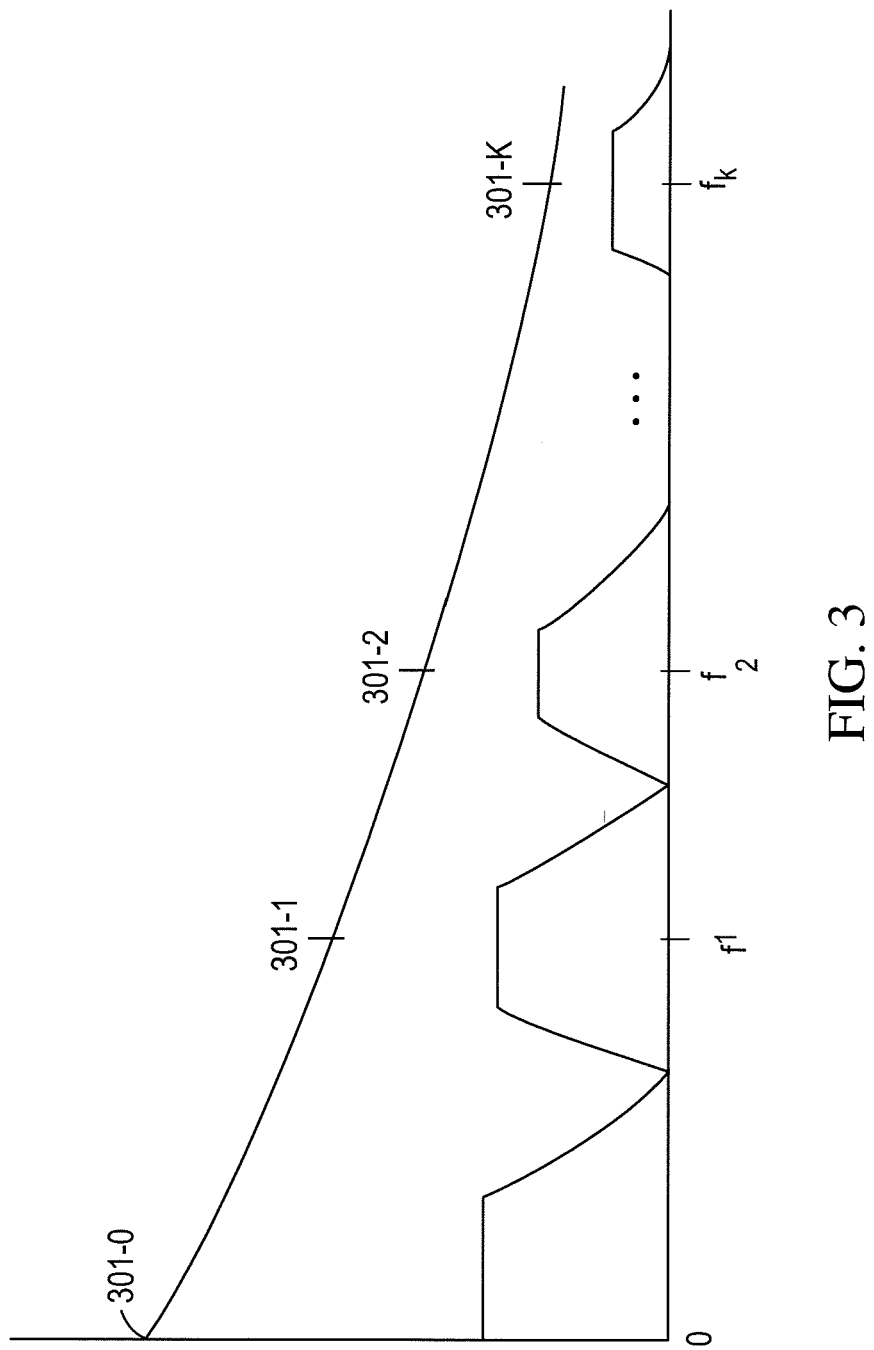
FIG. 3 shows a graph of attenuation versus transmission band on the transmission medium according to the present invention.

FIG. 3 shows schematically the transport function for a typical transmission channel 250 (FIG. 2A), H(f). As is shown, the attenuation at higher frequencies is greater than the attenuation at lower frequencies. Transmitters 212-1 through 212-K transmit analog data at carrier frequencies centered about frequencies $f_i$ through $f_K$, respectively. Therefore, transmitters 212-1 through 212-K transmit into transmission channels 301-1 through 301-K, respectively. Transmitter 217 transmits into transmission channel 301-0, which is centered at 0 frequency. In some embodiments, the width of each of transmission channels 301-0 through 301-K can be the same. The width of the bands of each of transmission channels 301-0 through 301-K can be narrow enough so that there is little to no overlap between adjacent ones of transmission channels 301-0 through 301-K. In some embodiments, since the attenuation for the lower frequency channels is much smaller than the attenuation for the higher frequency channels, lower frequency channels can be bit-loaded to carry a higher number of bits per baud interval than the number of bits per baud interval that can be carried at higher carrier frequencies.

As shown in FIG. 2B, the analog output signal from each of transmitters 212-1 through 212-K, $y_1(t)$ through $y_K(t)$, then represents the transmission signal in each of channels 301-1 through 301-K, respectively. Signals $y_1(t)$ through $y_K(t)$, then, are input to summer 213 and the summed analog signal output from summer 213 can be input to a high pass filter 215. The output signal from high pass filter 215 is input to summer 216 where it is summed with the baseband signal $y_0(t)$ from baseband transmitter 217. High pass filter 215 prevents transmitters 212-1 through 212-K from transmitting signals into the baseband channel and reduces or eliminates the need to consider cross-channel interference between signals produced by baseband transmitter 217 and those generated by transmitters 212-1 through 212-K.

The output signal from summer 216, z(t), is input to an output driver 214. In some embodiments, output driver 214 generates a differential transmit signal corresponding to signal z(t) for transmission over transmission medium 250. Output driver 214, if transmission medium 250 is an optical medium, can also be an optical driver modulating the intensity of an optical signal in response to the signal z(t).

Figure 2C:
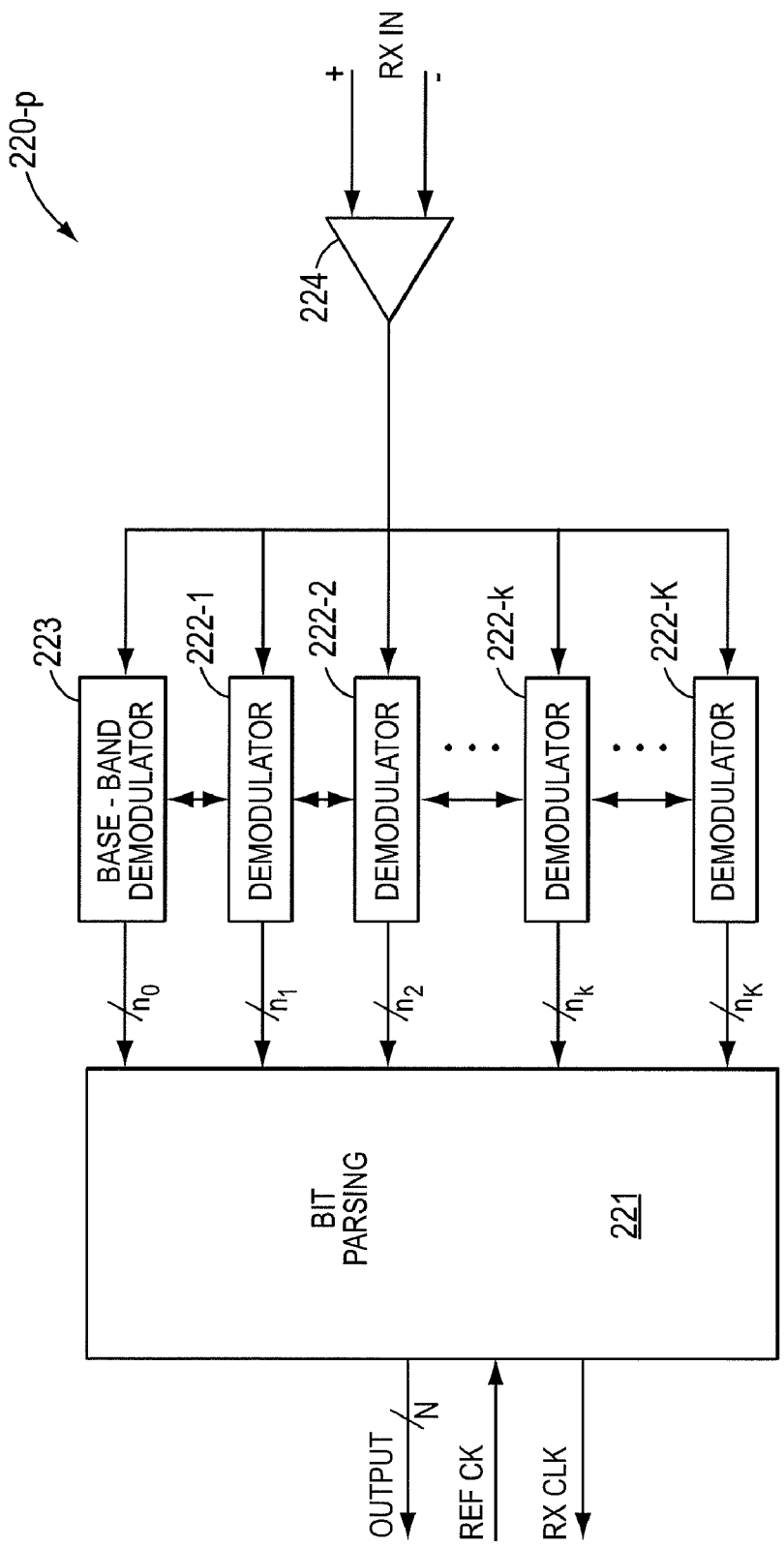
FIG. 2C shows a block diagram of a receiver according to the present invention.

FIG. 2C shows an embodiment of a receiver system 220-p, which can be an arbitrary one of receiver system 220-1 through 220-P of FIG. 2A. Receiver system 220-p can receive a differential receive signal, which originated from one of transmitter systems 210-1 through 210-P (typically not transmitter 210-p), into an input buffer 224. In some embodiments, an optical signal can be received at input buffer 224, in which case input buffer 224 includes an optical detector. The output signal from input buffer 224, Z(t), is closely related to the output signal z(t) of summer 213. However, the signal Z(t) shows the effects of transmission through transmission medium 250 on z(t), including intersymbol interference (ISI).

The signal Z(t) is input to each of receivers 222-1 through 222-K and into baseband receiver 223. Receivers 222-1 through 222-K demodulate the signals from each of the transmission channels 301-1 through 301-K, respectively, and recovers the bit stream from each of carrier frequencies $f_1$ through $f_K$, respectively. Baseband receiver 223 recovers the bit stream which has been transmitted into the baseband channel. The output signals from each of receivers 222-1 through 222-K, then, include $n_1$ through $n_K$ parallel bits, respectively, and the output signal from baseband receiver 223 include $n_0$ parallel bits. The output signals are input to bit parsing 221 where the transmitted signal having N parallel bits is reconstructed. Receiver system 220-p also receives the reference clock signal from PLL 203, which can be used to generate internal timing signals. Furthermore, receiver system 220-p outputs a receive clock signal with the N-bit output signal from bit parsing 221.

Further, demodulators (receivers) 222-1 through 222-K are coupled so that cross-channel interference can be cancelled. In embodiments where filter 215 of transmitter 210-p is not present or does not completely remove the baseband from the output signal of adder 213, then cross-channel interference in the baseband channel also will need to be considered. As discussed further below, due to the mixers in the up-conversion process, multiple harmonics of each signal may be generated from each of transmitters 212-1 through 212-K. For example, in some embodiments transmitters 212-1 through 212-K transmit at carrier frequencies $f_1$ through $f_K$ equal to $f_0$, $2f_0 \ldots Kf_0$, respectively. The baseband transmitter 213 transmits at the baseband frequency, e.g. transmitter 213 transmits with no carrier.

Due to the harmonics in the mixer, the signal transmitted at carrier frequency $f_1$ will also be transmitted in the base band and at frequencies $2f_1, 3f_1, \ldots$ Additionally, the signal transmitted at carrier frequency $f_2$ will also be transmitted in the base band and at $2f_2, 3f_2, \ldots$ Therefore, any time any of the bandwidth of any harmonics of the channels overlap with other channels or the other channel's harmonics, significant cross-channel symbol interference can occur due to harmonics in the mixers of transmitters 212-1 through 212-K. For example, in the case where the carrier frequencies are multiples of $f_0$, channel 1 transmitting at $f_0$ will also transmit at 0, $2f_0, 3f_0, \ldots$, i.e. into each of the other channels. Additionally, the down converters also create harmonics, which means that some of the transmission of the third channel will be down-converted into the first channel, for example. Therefore, further cross-channel interference can be generated in the down-conversion process of receivers 221-1 through 222-K. Embodiments of the present invention correct for the cross-channel symbol interference as well as the inter-symbol interference. Note that it is well known that if the duty cycle of the harmonic wave that is being mixed with an input signal is 50%, only odd harmonics will be generated. Even harmonics require higher or lower duty cycles.

In some embodiments, N-bits of high-speed parallel digital data per time period is input to bit allocation 211 of transmitter system 210-p along with a reference clock signal. Data is transmitted at a transmit clock rate of CK1, which can be determined by an internal phase-locked-loop from the reference clock signal. Each of these input signals of N-bits can change at the rate of a transmit clock signal CK1. The transmit clock signal CK1 can be less than or equal to $\eta$GHz/N, where $\eta$ represents the total desired bit rate for transmission of data from transmitter system 210-p over transmission medium 250. The resultant maximum aggregate input data rate, then, equals $\eta$Gbps. The $\eta$Gbps of aggregate input data is then split into K+1 sub-channels 301-0 through 301-K (see FIG. 3) which are generated by transmitters 217 and 212-1 through 212-K, respectively, such that:

$$\sum_{k=0}^{K} B_k n_k = \eta \; Gbps, \quad (1)$$

where $n_k$ is the number of bits transmitted through the kth transmission band, centered about frequency $f_k$ for k equal to 1 or greater and the base band for k=0, with a symbol baud rate on the $k^{th}$ sub-channel being equal to $B_k$.

In some embodiments of the invention, each of transmitters 217 and 212-1 through 212-K operate at the same baud rate $B_k$. Furthermore, the center frequency of transmitter 212-k (corresponding to channel k), or one of its harmonics, is substantially the same as harmonics of the center frequencies of other ones of transmitters 212-1 through 212-K. One skilled in the art will recognize that in other embodiments of the invention one or both of these conditions may not be satisfied.

In some embodiments of the invention, each of the K+1 sub-channels 301-0 through 301-K can have the same baud rate B. In general, the baud rate $B_k$ of one sub-channel 301-k, which is an arbitrary one of sub-channels 301-0 through 301-K, can differ from the baud rate of other sub-channels. Additionally, bit-loading can be accomplished by choosing symbol sets which carry a larger number of bits of data for transmission channels at lower frequencies and symbol sets which carry a lower number of bits of data for transmission channels at higher frequencies (i.e., $n_k$ is higher for lower frequencies).

In the case of a copper backplane interconnect channel of trace length l<2 meters, for example, the signal-to-noise ratio of the lower carrier frequency channels is substantially greater than the signal-to-noise ratio available on the higher sub-channels because the signal attenuation on the copper trace increases with frequency and because the channel noise resulting from alien signal cross-talk increases with frequency. These properties of the copper interconnect channel can be exploited to "load" the bits/baud of the K sub-channels so that the overall throughput of the interconnect system is maximized. For example, digital communication signaling schemes (modulation+coding), see, e.g. BERNARD SKLAR, DIGITAL COMMUNICATIONS, FUNDAMENTALS AND APPLICATIONS (Prentice-Hall, Inc., 1988), can be utilized that provide higher bit density per baud interval over channels occupying the lower region of the frequency spectrum, and that result in lower bit density over channels that occupy higher frequencies. This "bit-loading" is especially important when the data rates over copper interconnect channel need to be increased, for example to a rate in excess of 10 Gbps per differential copper pair.

Figure 4:
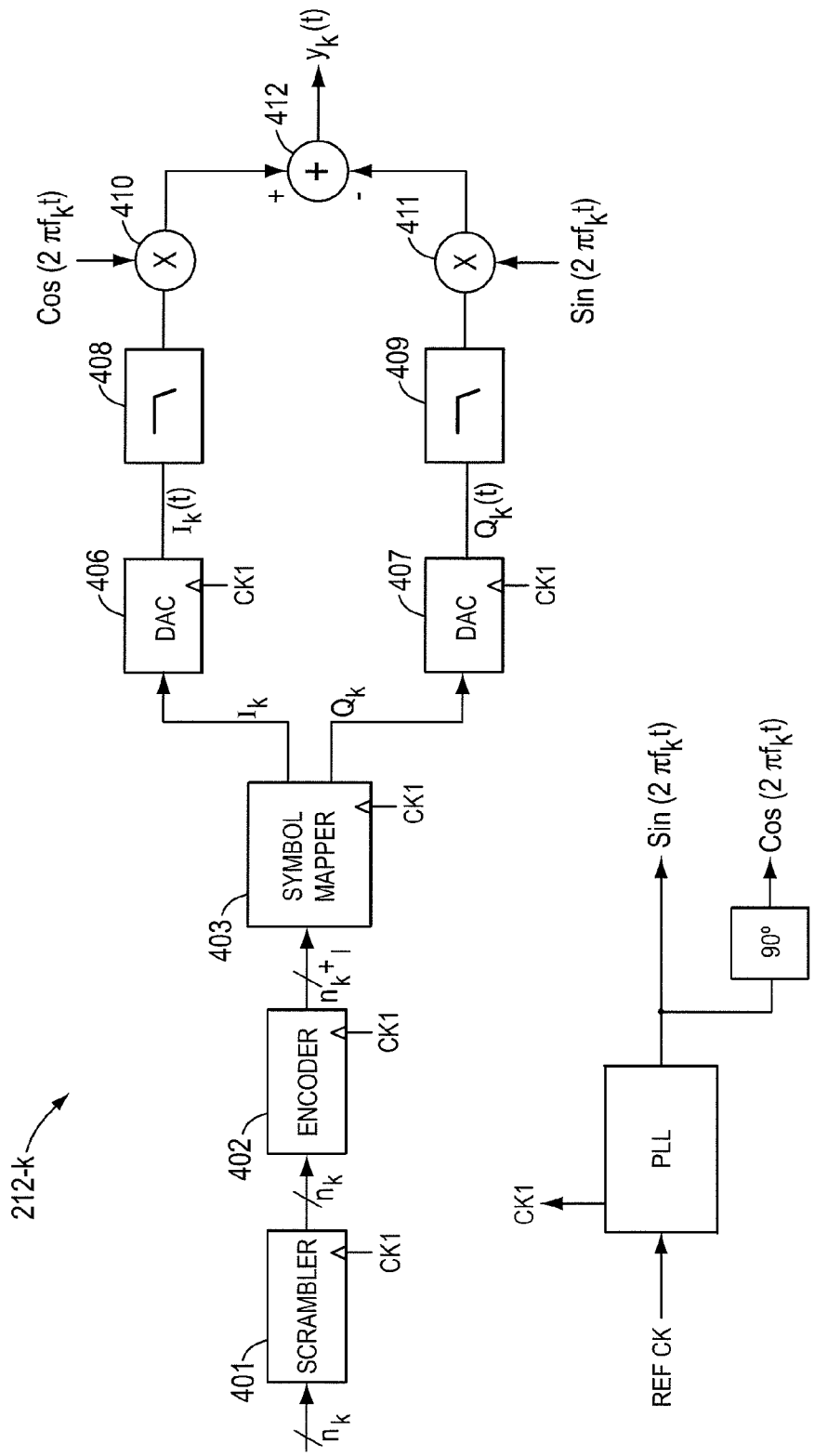
FIG. 4 shows a block diagram of an embodiment of a transmission modulator according to the present invention.

FIG. 4 shows an embodiment of transmitter 212-k, an arbitrary one of transmitters 212-1 through 212-K. Transmitter 212-k receives $n_k$ bits per baud interval, $1/B_k$, for transmission into sub-channel 301-k. The $n_k$ bits are received in scrambler 401. Scrambler 401 scrambles the $n_k$ bits and outputs a scrambled signal of $n_k$ bits, which "whitens" the data.

The output signal of $n_k$ parallel bits is then input to encoder 402. Although any encoding scheme can be utilized, encoder 402 can be a trellis encoder for the purpose of providing error correction capabilities. Trellis coding allows for redundancy in data transmission without increase of baud rate, or channel bandwidth. Trellis coding is further discussed in, for example, BERNARD SKLAR, DIGITAL COMMUNICATIONS, FUNDAMENTALS AND APPLICATIONS (Prentice-Hall, Inc., 1988), G. Ungerboeck., "Trellis Coding Modulation with Redundant Signal Sets, Part I. Introduction," IEEE Communications Magazine, vol. 25, no. 2, February, 1987, pp. 5-11, and G. Ungerboeck., "Trellis Coding Modulation with Redundant Signal Sets, Part II. State of the Art," IEEE Communications Magazine, vol. 25, no. 2, February 1987, pp. 12-21. Other encoding schemes include block coding schemes such as Reed-Solomon encoders, and BCH encoders, see, e.g., G. C. CLARK, JR., AND J. B. CAIN., ERROR CORRECTION CODING FOR DIGITAL COMMUNICATIONS (Plenum Press, New York, 1981), however they result in an increase of channel bandwidth usage. Typically, the signal output from encoder 402 includes more bits than $n_k$, $n_k$+1e. In some embodiments, encoder 402 can be a trellis encoder which adds one additional bit, in other words encoder 402 can be a rate $n_k/n_k+1$ encoder, see, e.g., G. Ungerboeck., "Trellis Coding Modulation with Redundant Signal Sets, Part I. Introduction," IEEE Communications Magazine, vol. 25, no. 2, February, 1987, pp. 5-11, and G. Ungerboeck., "Trellis Coding Modulation with Redundant Signal Sets, Part II. State of the Art," IEEE Communications Magazine, vol. 25, no. 2, February, 1987, pp. 12-21. In some embodiments, additional bits can be added to insure a minimum rate of transitions so that timing recovery can be efficiently accomplished at receiver 220-p.

Figure 6A:
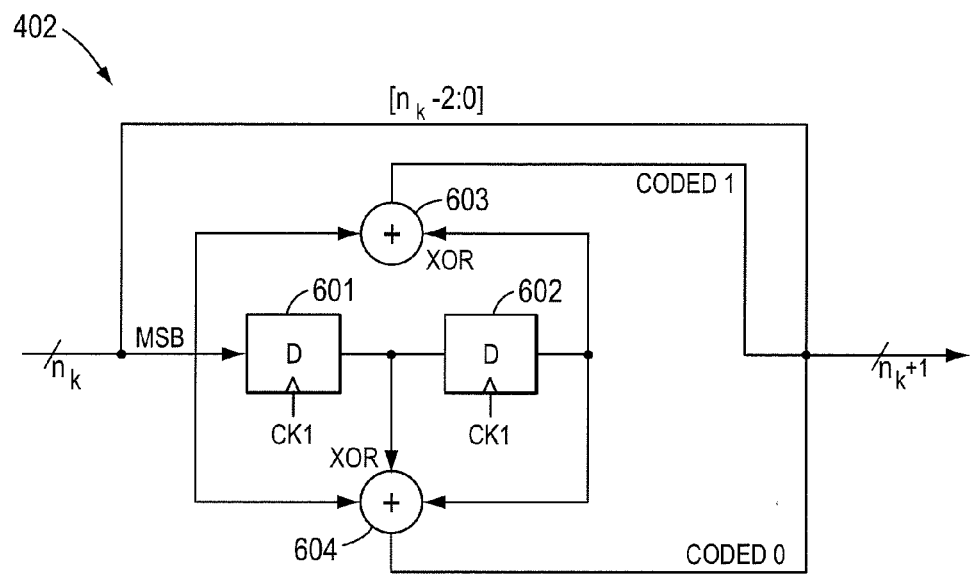
FIG. 6A shows a schematic diagram of a trellis encoder according to the present invention.

FIG. 6A shows an embodiment of encoder 402. Encoder 402 of FIG. 6A is an $n_k/n_k+1$ trellis encoder. Encoder 402 of FIG. 6A performs a rate ½ convolutional coding on the most-significant-bit (MSB) of the $n_k$ bit input signal. The MSB is input to delay 601. The output signal from delay 601 is input to delay 602. The MSB and the output signal from delay 602 are input to XOR adder 603. The output from XOR adder 603 provides a coded bit. The MSB, the output signal from delay 601, and the output signal from delay 602 are XORed in adder 604 to provide another coded bit. The two coded bits are joined with the remaining $n_k-1$ bits to form a $n_k+1$ bit output signal. Delays 601 and 602 are each clocked at the symbol baud rate B. One skilled in the art will recognize that other embodiments of encoder 402 can be utilized with embodiments of this invention.

Figure 1A:
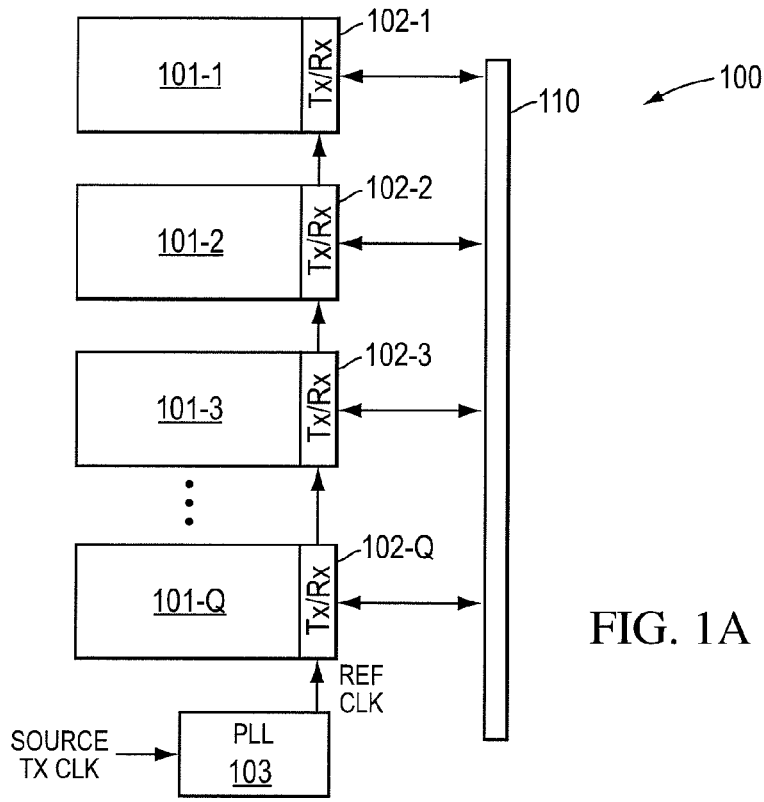
FIGS. 1A, 1B and 1C show block diagrams for a conventional system of transmitting data over a backplane.
Figure 1B:
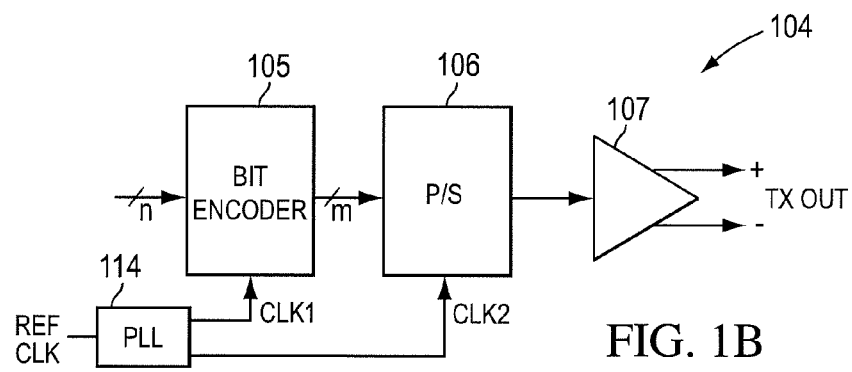
Figure 1C:
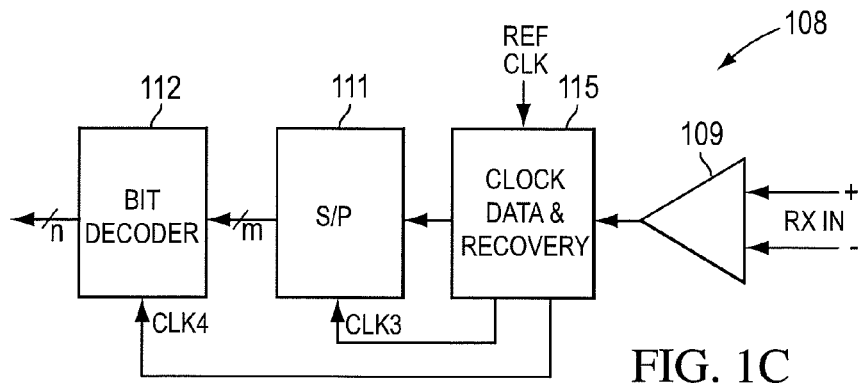

In transmitter 212-k of FIG. 4, the output signal from encoder 402 is input to symbol mapper 403. Symbol mapper 403 can include any symbol mapping scheme for mapping the parallel bit signal from encoder 402 onto symbol values for transmission. In some embodiments, symbol mapper 403 is a QAM mapper which maps the $(n_k+1e)$ bits from encoder 402 onto a symbol set with at least $2^{(n_k+1e)}$ symbols. As shown in FIG. 6A, 1e=1 in the output signal from encoder 402. A trellis encoder in conjunction with a QAM mapper can provide a trellis encoded QAM modulation for sub-channel 301-k.

Figure 6B:
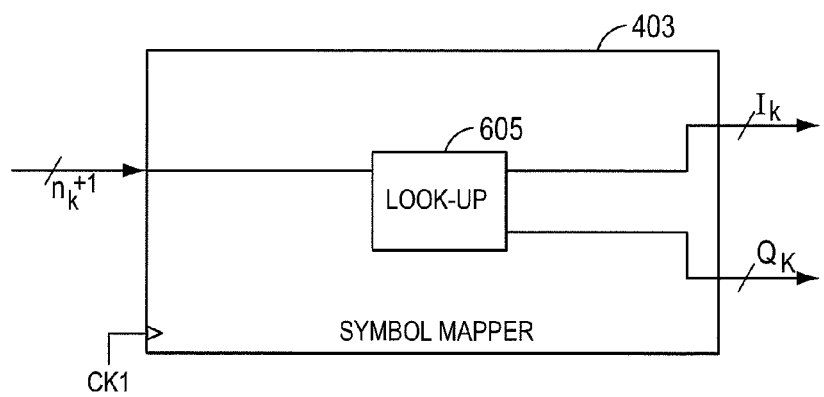
FIG. 6B shows a schematic diagram of a symbol mapper according to the present invention.

FIG. 6B shows an embodiment of symbol mapper 403. Symbol mapper 403 receives the $n_k+1$ data bits from encoder 402 and generates a symbol, which can include an in-phase component $I_k$ and a quadrature component $Q_k$. In some embodiments, symbol mapper 403 includes a look-up table 605 which maps the $n_k+1$ input bits to the complex output symbol represented by $I_k$ and $Q_k$.

Table I shows an example symbol look-up table for conversion of a 7-bit data signal into a 128-symbol QAM scheme. Table entries are in decimal format with the in-phase values along the bottom row and the quadrature values represented along the last column. From Table I, a decimal value of 96, for example, results in an I value of −1 and a Q value of −1.

In some embodiments, encoder 402 could be a 16 state, rate 2/3 encoder, encoding the 2 most significant bits (MSBs) of the $n_k$ bit input signal. In general, any pair of bits could be chosen for encoding in this example. This 16 state encoder could determine its future state from the current state and the 2 incoming bits. If the old state is 4 bits, x=[x3 x2 x1 x0] and the incoming bits are [y1 y0], the next state could be 4 bits, z=[z3 z2 z1 z0]=[x1 x0 y1 y0]. The values x3 and z3 are the most significant bits (MSBs) of the state. The transition from the old state to the next state can define the 3 bit output of the encoder as shown in table II. In table II, the notation a→b, means that the transition from old_state=a to next_state=b. The encoded 3-bits corresponding to that transition in this example is listed as the encoded value.

The encoded output bits from encoder 402 are input to mapper 403. In an example where $n_k=6$ and 1e=1, 7 bits from encoder 402 are input to mapper 403. If encoder 402 is the 16 state, rate 2/3 encoder discussed above, the 3 bit output of encoder 402 can be the 3 MSBs and the 4 uncoded bits can be the least significant bits (LSBs). An example of mapper 403 can be found in table III.

In some embodiments, a 16 symbol QAM scheme can be utilized. In those embodiments, 4 bits with no encoding (or 3 bits in an 3/4 encoding scheme) can be directly mapped onto 16 QAM symbols. In some embodiments, 4 bits can be encoded (with a 4/5 encoding scheme) into a 32 QAM symbol set. In general, any size symbol set can be utilized.

Figures 6C, 6D:
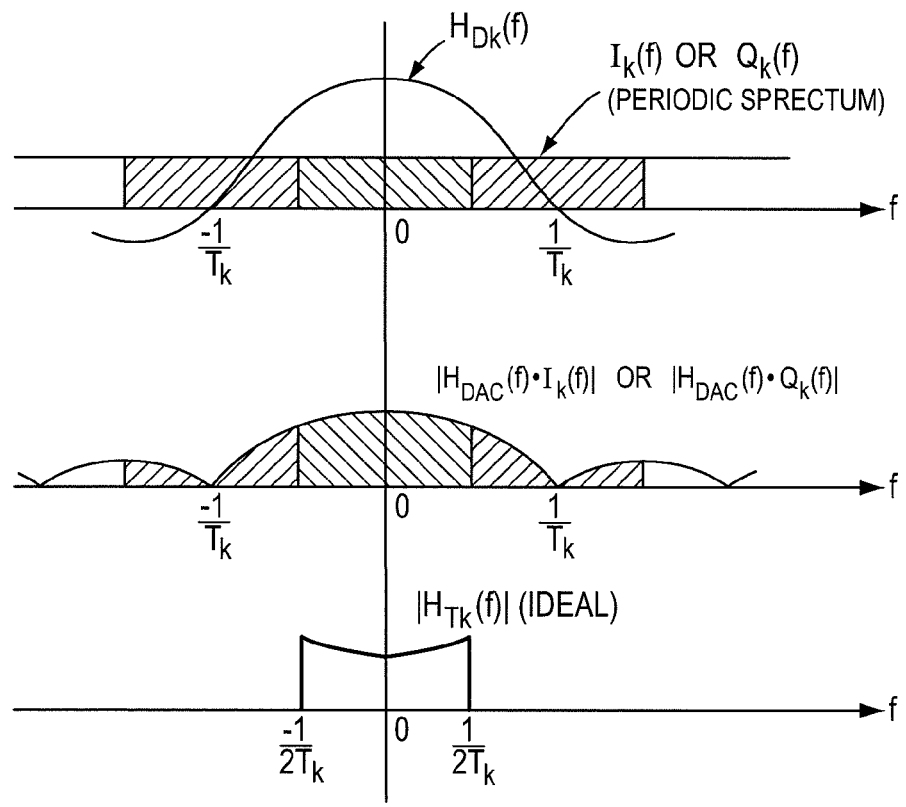
FIG. 6C shows a schematic diagram of a 128 QAM constellation.
FIG. 6D shows filtering of the output signal from a digital to analog converter according to the present invention.

In some embodiments, the QAM mapping can be segregated into groups of four as is shown in FIG. 6C. In some embodiments, with a 128 QAM system, then $n_k+1$ is 7 (referred to as 6/7 encoding). The two control bits from encoder 402 are arranged so that in groups of four symbols, the two control bits determine placement in the group. Control bits 00 and 11 and control bits 01 and 10 are in opposite corners of the groupings of four. This leads to a 6 dB gain in decoding at the receiver using this mapping scheme. Furthermore, the remaining five bits determine the actual grouping of four.

The output signal from symbol mapper 403 can be a complex signal represented by in-phase signal $I_k(n)$ and a quadrature signal $Q_k(n)$, where n represents the nth clock cycle of the clock signal CK1, whose frequency equals the baud rate $B_k$. Each of signals $I_k(n)$ and $Q_k(n)$ are digital signals representing the values of the symbols they represent. In some embodiments, a QAM mapper onto a constellation with 128 symbols can be utilized. An embodiment of a 128-symbol QAM constellation is shown in Table I. Other constellations and mappings are well known to those skilled in the art, see, e.g., BERNARD SKLAR, DIGITAL COMMUNICATIONS, FUNDAMENTALS AND APPLICATIONS (Prentice-Hall, Inc., 1988) and E. A. LEE AND D. G. MESSERSCHMITT, DIGITAL COMMUNICATIONS (Kluwer Academic Publishers, 1988). The number of distinct combinations of $I_k(n)$ and $Q_k(n)$, then, represents the number of symbols in the symbol set of the QAM mapping and their values represent the constellation of the QAM mapping. Further examples of QAM symbol sets include 16 QAM symbol sets (16-QAM) and 4/5 encoded 32-QAM symbol sets (4/5 encoded 32 QAM).

The signals from symbol mapper 403, $I_k(n)$ and $Q_k(n)$, are input to digital-to-analog converters (DACs) 406 and 407, respectively. DACs 406 and 407 operate at the same clock rate as symbol mapper 403. In some embodiments, therefore, DACs 406 and 407 are clocked at the symbol rate, which is the transmission clock frequency $B_k$.

The analog output signals from DACs 406 and 407, represented by $I_k(t)$ and $Q_k(t)$, respectively, can be input to low-pass filters 408 and 409, respectively. Low pass filters 408 and 409 are analog filters that pass the symbols represented by $I_k(t)$ and $Q_k(t)$ in the base band while rejecting the multiple frequency range reflections of the base band signal. FIG. 6D shows a schematic diagram of the ideal requirements for filters 408 and 409. The filter function h(f) cuts off to include all of the base band signal while rejecting all of the higher frequency reflections of the base band signal created by DACs 406 and 407.

Figure 6E:
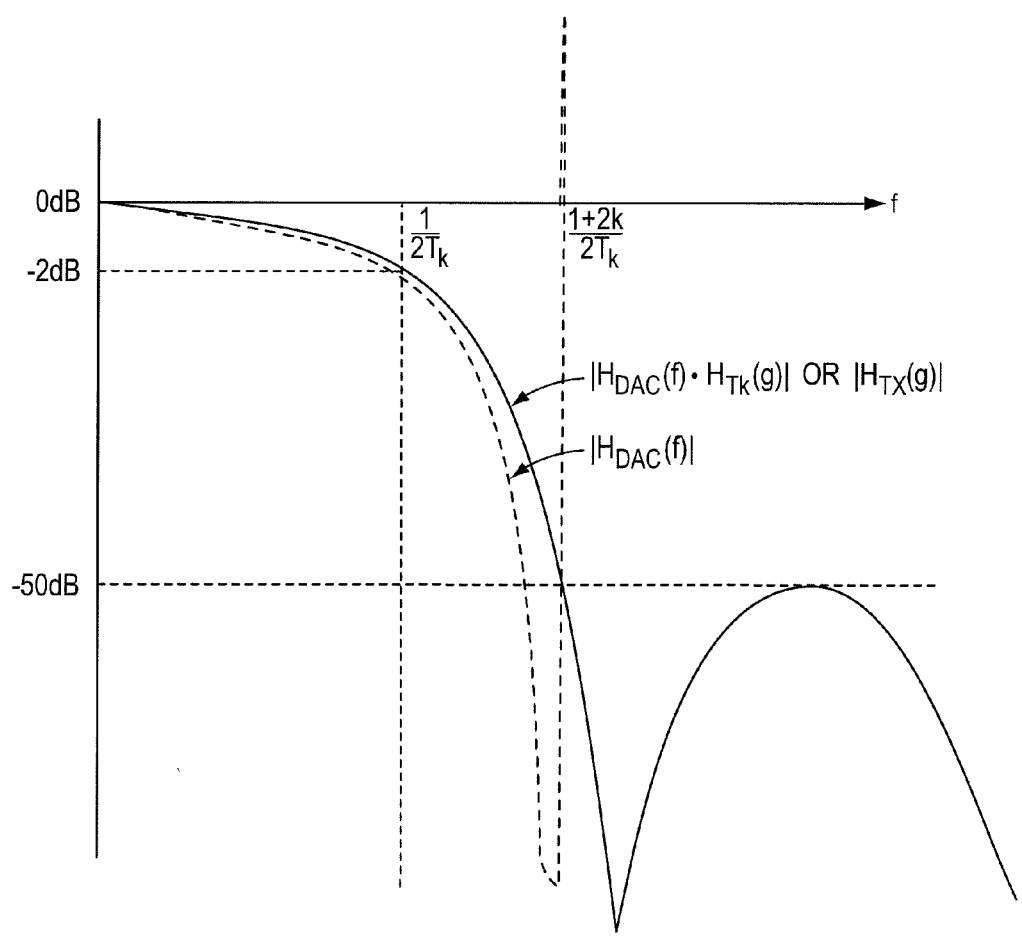
FIG. 6E shows raised square root cosine filter response.

An example embodiment of filters 408 and 409 can be described by a two-zero, five-pole filter function of the form $$H_{TX}(s) = \frac{b_2 s^2 + b_1 s + b_0}{s^5 + a_4 s^4 \ldots + a_0}, \tag{2}$$

where $s=j(2\pi f)$ (j is $\sqrt{-1}$) and the coefficients $b_2$, $bi_1$, $b_0$, and $a_4$ through $a_0$ are the parameters of filters 408 and 409. The parameters for filters 408 and 409, then, can be found by minimizing the cost function $$\int_0^\infty \left| H_{DAC}(f) H_{TX}(s) - H_{RRC}(f) e^{-j2\pi f\tau} \right|^2 W(f) df, \tag{3}$$

where $H_{DAC}(f)$ is the response of DACs 406 and 407, which can be given by $$H_{DAC}(f) = \frac{\sin(\pi f T_k)}{\pi f}, \tag{4}$$

where $T_k$ is the symbol period, W(f) is a weighting function, $H_{RRC}(f)$ is a target overall response and $\tau$ is the time delay on the target response. The cost function is minimized with respect to the parameters of the filter (e.g., coefficients $b_2$, $b_1$, $b_0$, and $a_4$ through $a_0$) and the time delay $\tau$. FIG. 6E shows an example of a target overall response function $H_{RRC}(f)$, which is a square-root raised cosine function. The function $H_{RRC}(f)$ can be determined by a parameter $\alpha_k$ along with the baud rate frequency $1/T_k$ (which is the baud rate $B_k$ for transmitter 212-k). The parameter $\alpha_k$ is the excess bandwidth of the target function $H_{RRC}(f)$. In some embodiments, $\alpha_k$ can be set to 0. In some embodiments of the invention, $\alpha_k$ can be set to 0.6.

The weight function $W(f)$ can be chosen such that the stop band rejection of $H_{TX}(s)$ is less than about −50dB. Initially, $W(f)$ can be chosen to be unity in the pass band frequency $0<f<(1+\gamma_k)/2T_k$ and zero in the stop band frequency $f>(1+\gamma_k)/2T_k$, where $\gamma_k$ is the excess bandwidth factor of the kth channel. The minimization of the cost function of Equation 3 can be continued further by increasing $W(f)$ in the stop band until the rejection of analog filters 408 and 409 is less than −50 dB.

In some embodiments, the overall impulse response of the transmit signal is a convolution of the impulse response of DACs 406 and 407 and the impulse response of transmit analog filters 408 and 409, i.e.

$$h_k^{Tx}(t) = h_k^f(t) \otimes h_k^{DAC}(t), \quad (5)$$

where $h_k^f(t)$ is the response of the filter and $h_k^{DAC}(t)$ is the response of DACs 406 and 407. In some embodiments, the DAC response $h_k^{DAC}(t)$ is a sinc function in the frequency domain and a rectangular pulse in the time domain. As shown in Equation 5, the overall response is a convolution of filters 408 and 409 with the response of DACs 406 and 407. The overall filter response can be close to the target response $H_{RRC}(f)$ when $h_k^{TX}(t)$ is determined with the cost function of Equation 3.

The output signals from low-pass filters 408 and 409, designated $I_k^{LPF}(t)$ and $Q_k^{LPF}(t)$, respectively, are then up-converted to a center frequency $f_k$ to generate the output signal of $y_k(t)$, the kth channel signal. The output signal from low-pass filter 408, $I_k^{LPF}(t)$, is multiplied by $\cos(2\pi f_k t)$ in multiplier 410. The output signal from low-pass filter 409, $Q_k^{LPF}(t)$, is multiplied by $\sin(2\pi f_k t)$ in multiplier 411. The signal $\sin(2\pi f_k t)$ can be generated by PLL 414 based on the reference clock signal and the signal $\cos(2\pi f_k t)$ can be generated by a $\pi/2$ phase shifter 413.

However, since mixers 410 and 411 are typically not ideal mixers and the harmonic sine wave input to mixer 410, and the resulting cosine wave input to mixer 411, often varies from a sine wave, signals having harmonics of the frequency $f_k$ are also produced. Often, the harmonic signals input to mixers 410 and 411 may more closely resemble square-wave signals than harmonic sine wave signals. Even if the "sine wave input" is a true sine wave, the most commonly utilized mixers, such as Gilbert Cells, may act as a band-limited switch, resulting in a harmonic signal with alternating positive and negative voltages with frequency the same as the "sine wave input" signal. Therefore, the output signals from filters 408 and 409 are still multiplied by signals that more closely resemble square waves than sine waves. As a result, signals having frequency $2f_k$, $3f_k$, . . . are also produced, as well as signals in the base band ($0f_k$). Although the amplitude of these signals may be attenuated with higher harmonics, they are non-negligible in the output signal. Additionally, even harmonics (i.e., $0f_k$, $2f_k$, $4f_k$ . . . ) are absent if the duty cycle of the harmonic sine wave input to mixers is 50%. Otherwise, some component of all of the harmonics will be present.

The output signals from multipliers 410 and 411 are summed in summer 412 to form $$y_k(t) = \xi_k^0 I_k^{LPF}(t) - \zeta_k^0 Q_k^{LPF}(t) + \sum_{n>0}(\xi_k^n I_k^{LPF}\cos(2\pi n f_k t) - \zeta_k^n Q_k^{LPF}\sin(2\pi n f_k t))(k \geq 1). \quad (6)$$

where $\xi_k^n$ and $\xi_k^n$ is the contribution of the nth harmonic to $y_k(t)$. If the duty cycle of the harmonic input signals to mixers 410 and 411 is near 50%, the even harmonics are low and the odd harmonics are approximately given by $\xi_k^n = 1/n$ and $\xi_k^n = 1/n$ for odd n.

Figure 11:
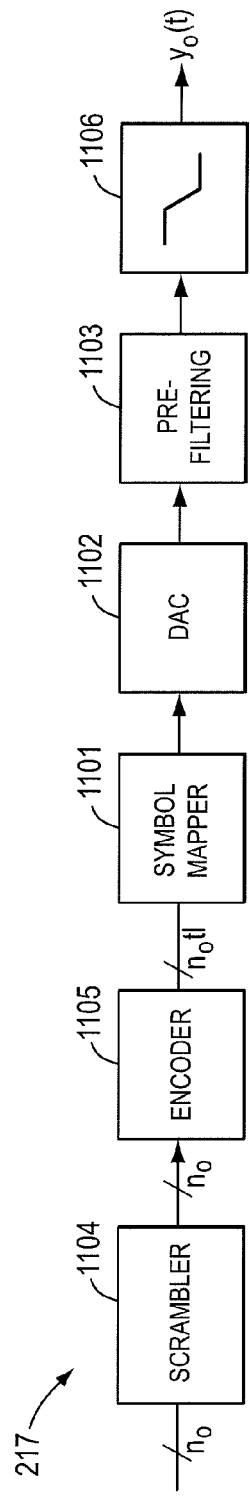
FIG. 11 shows an embodiment of a baseband transmitter according to the present invention.

FIG. 11 shows an embodiment of baseband transmitter 217. Transmitter 217 may include a scrambler 1104 and encoder 11 05. Scrambler 1104 can be similar to that described as scrambler 401 described above and functions to whiten the data. In some embodiments, scrambler 1104 may utilize a different function for scrambling the incoming bits than that described above as scrambler 401. Encoder 1105 can be similar to that described as encoder 402 above and encodes the $n_0$ bits input to transmitter 217 to $n_0+1$ bits. The output signal from encoder 1105 is then input to symbol mapper 1101. Symbol mapper 1101 converts the $n_0+1$ parallel bits into a symbol for transmission. In some embodiments, symbol mapper 1101 can be a PAM encoder. The PAM symbol set can be of any size. In some embodiments, for example, a 16 level symbol set (16-PAM) can be utilized to represent $n_0+1=4$ parallel bits. Encoder 1105 can provide 3/4 encoding or no encoding. The output signal from symbol mapper 1101 is input to digital-to-analog converter 1102 which converts the symbol set determined by symbol mapper 1101 into the corresponding output voltages.

In some embodiments, the analog output signal from DAC 1102 is prefiltered through filter 1103. In some embodiments, filter 1103 may prepare the output signal for transmission through medium 250 (see FIG. 2A) so that the signal received by a receiver is corrected for distortions caused by the channel. For example, if the baseband channel of transmission medium 250 is known to have a transfer function of (1+D(z)), then filter 1103 may execute a transfer function equal to 1/(1+D(z)) in order to cancel the transfer function of transmission medium 250. The output signal from filter 1103 can be input to low-pass filter 1106. Filter 1106 removes the higher frequency content, which may interfere with transmissions on the higher frequency channels. The output signal from filter 1106 is the base band signal $y_0(t)$. With a combination of low pass filter 1106 and high pass filter 215 coupled to summer 213, cross-channel interference between the base band channel, channel 301-0, and higher frequency channels 301-1 through 301-K can be minimized or eliminated.

The overall output of transmitter 210-p (FIG. 2B), the output from summer 216, is then given by $$z(t) = \sum_{n=0}^{K} y_n(t). \quad (7)$$

In an example where the frequencies $f_1$ through $f_K$ are given by frequencies $f_0$ through ($Kf_0$), respectively, then, the overall output signal z(t) is given by:

$$z(t) = y_0(t) + \sum_{k=1}^{K} (\xi_k^0 I_k^{LPF}(t) - \zeta_k^0 Q_k^{LPF}) + \quad (8)$$

$$\xi_1^1 I_1^{LPF}(t)\cos\omega_0 t - \zeta_1^1 Q_1^{LPF}(t)\sin\omega_0 t +$$

$$(\xi_1^2 I_1^{LPF}(t) + \xi_2^1 I_2^{LPF}(t))\cos 2\omega_0 t - (\zeta_1^2 Q_1^{LPF}(t) +$$

$$\zeta_2^1 Q_2^{LPF}(t))\sin 2\omega_0 t +$$

$$(\xi_1^3 I_1^{LPF}(t) + \zeta_3^1 I_3^{LPF}(t))\cos 3\omega_0 t - (\zeta_1^3 Q_1^{LPF}(t) +$$

$$\zeta_3^1 Q_3^{LPF}(t))\sin 3\omega_0 t +$$

$$(\xi_1^4 I_1^{LPF}(t) + \xi_2^2 I_2^{LPF}(t) + \xi_4^1 I_4^{LPF}(t))\cos 4\omega_0 t -$$

$$(\zeta_1^4 Q_1^{LPF})(t) + \zeta_2^2 Q_2^{LPF}(t) + \zeta_4^1 Q_4^{LPF}(t))\cos 4\omega_0 t + \ldots$$

$$= y_0(t) + \sum_{k=1}^{K} (\xi_k^0 I_k^{LPF}(t) - \zeta_k^0 Q_k^{LPF}(t)) +$$

$$\sum_{M=1}^{\infty} \sum_{\forall k, n\in k^*n=M} (\xi_k^n I_k^{LPF}(t)\cos M\omega_0 t - \zeta_k^n Q_k^{LPF}(t)\sin M\omega_0 t)$$

where $\omega_0$ is $2\pi f_0$ and where $I_k^{LPF}(t)$ and $Q_k^{LPF}(t)$ are 0 for all $k>K$.

As shown in Equation 8, the signal on channel one is replicated into all of higher K channels, the baseband, and into harmonic frequencies beyond the base band and the K channels. Filter 215 can remove the contribution to the baseband channel from transmitters 212-1 through 212-K. The signal on channel two, for example, is also transmitted on channels 4, 6, 8, ..., and the baseband. The signal on channel 3 is transmitted on channels 6, 9, 12, ... and the base band. In general, the signal on channel k will be mixed into channels 2k, 3k, ... and the baseband. Further, the attenuation of the signals with higher harmonics in some systems can be such that the signal from channel k is non negligible for a large number of harmonics, potentially up to the bandwidth of the process, which can be 30-40 GHz.

In some embodiments of the invention, a high pass filter 215 (see FIG. 2B) receives the signal from summer 213. High pass filter 215 can, for example, be a first-order high-pass filter with 3 dB attenuation at $f_1/2$. Filter 215 removes the DC harmonics, i.e. the baseband transmissions, from the transmitter. In embodiments with a separate baseband transmission, then, cross-channel coupling into the baseband is minimized or eliminated. Further, removing the baseband harmonics from the transmitted signals simplifies cross-channel cancellation at receiver 220-p. In embodiments where high pass filter 215 exists, the baseband contribution from each of transmitters 212-1 through 212-K, $$\sum_{k=1}^{K} (\xi_k^0 I_k^{LPF}(t) - \zeta_k^0 Q_k^{LPF}(t)),$$

is filtered out and becomes close to 0. The output signal from transmitter 210-p then becomes $$z'(t) = y_0(t) + \sum_{M=1}^{\infty} \sum_{\forall k, n\in k^*n=M} (\xi_k^n I_k^{LPF}(t)\cos M\omega_0 t - \zeta_k^n Q_k^{LPF}(t)\sin M\omega_0 t). \quad (9)$$

In some embodiments, $B_k$ and $\gamma_k$ can be the same for all channels and the center frequencies of channels 301-1 through 301-K, frequencies $f_1$ through $f_K$, respectively, can be chosen by $$f_k = B_k k(1+\gamma_k); 1 \leq k \leq K. \quad (10)$$

In some embodiments, other center frequencies can be chosen, for example:

$$f_1 \geq 0.5 B_k (1+\gamma_k)$$

$$(f_k - f_{k-1}) \geq B_k (1+\gamma_k); k \geq 2 \quad (11)$$

The parameter $\gamma_k$ is the excess bandwidth factor. The bandwidth of the k-th channel, then, is $(1+\gamma_k)B_k$. In general, the center frequencies of channels 301-1 through 301-K can be any separated set of frequencies which substantially separate (i.e., minimizing overlap between channels) in frequency the transmission bands of transmission channels 301-1 through 301-K.

In many embodiments, however, the frequencies $f_1$ through $f_K$ are chosen as multiplies of a single frequency $f_0$ which can fulfill equations 10 and/or 11 and results in the harmonic mixing of channels as shown in Equation 8 and 9.

In some embodiments of the invention, DACs 406 and 407 of the embodiment of transmitter 212-k shown in FIG. 4 may be moved to receive the output of summer 412. Further, in some embodiments DACs 406 and 407 can be replaced by a single DAC to receive the output of summer 213. However, such DACs should have very high sampling rates. One advantage of utilizing high-sampling rate DACs is that ideal mixing could take place and the number of harmonics that need to be cancelled can be greatly reduced or even eliminated.

As an example, then, embodiments of transmitter 210-p capable of 10 Gbps transmission can be formed. In that case, $\eta=10$, i.e., an overall throughput of 10 Gbps from the transmitter to the receiver. Some embodiments, for example, can have (K+1)=8 channels 301-0 through 301-7. Channels 301-1 through 301-7 can be 6/7 trellis encoded 128 QAM with the baud rate on each channel $B_k$ being 1.25 GHz/6 or about 208.333 Msymbols/sec. Channel 301-0, the baseband channel, can be PAM-8 with no error correction coding (i.e., uncoded PAM-8) with baud rate $B_0$ being 416.667 Msymbols/sec. In other words, $n_k=6$; $1 \leq k \leq 7$ and encoder 402 is a 6/7 rate trellis encoder. In this example, channels 301-1 thorugh 301-7 can be transmitted at frequencies $2f_0$, $3f_0$, $4f_0$, $5f_0$, $6f_0$, $7f_0$ and $8f_0$, respectively, where $f_0$ can be, for example, 1.5 * $B_k$ or 312.5 MHz.

In another example embodiment, 10 Gbps ($\eta=10$) can utilize (K+1)=2 channels 301-0 and 301-1. Channel 301-1 can be, for example, 16 QAM with no error correction coding (i.e., uncoded 16-QAM) with baud rate $B_1$ of 1.25 GHz and Channel 301-0 can be, for example, 16-PAM with no error correction coding (i.e., uncoded 16-PAM) with baud rate $B_0$ at 1.25 GHz. The baud rate for both the PAM channel and the QAM channel is then 1.25 Gsps. The throughput is 5 Gbps each for a total transmission rate of 10 Gbps. With an excess bandwidth of the channels of about 50%, the center frequency of the QAM channel can be $f_1 \geq (1.5)*1.25$ GHz or above about 1.8 GHz.

In another example embodiment, 10 Gbps can utilize (K+1)=2 channels 301-0 and 301-1 as above with channel 301-1 being a 4/5 trellis encoded 32 QAM with a baud rate $B_1$ of 1.25 GHz with channel 301-0 being uncoded 16-PAM with baud rate $B_0$ 1.25 GHz. Again, the center frequency of channel 301-1 can be $f_1 \geq (1.5)*1.25$ GHz or above about 1.8 GHz.

In yet another example, (K+1)=6 channels, channels 301-0 through 301-5, can be utilized. Channels 301-1 through 301-5 can be 6/7 trellis encoded 128-QAM with baud rate $B_k$ of 1.25 GHz/6 or 208 MHz. Channel 301-0, the baseband channel, can be 3/4 encoded 16 PAM or uncoded 8-PAM with baud rate $B_0$ 1.25 GHz. The center frequencies of channels 301-1 through 301-5 can be $4f_0$, $5f_0$, $6f_0$, $7f_0$, and $8f_0$, respectively, with $f_0$ being about 312.5 MHz.

In some embodiments, DACs 406 and 407 of each of transmitters 212-1 through 212-K can each be 4 bit DACs. A schematic diagram of an embodiment of trellis encoder 402 and an embodiment of the resultant 128-QAM constellation mapping are shown in FIGS. 6A, 6B, and 6C, respectively. An example of a 128 symbol QAM mapping table is shown as Table I. The above described trellis encoder 402, in this embodiment, provides an asymptotic coding gain of about 6 dB over uncoded 128-QAM modulation with the same data rate, see, e.g., G. Ungerboeck., "Trellis Coding Modulation with Redundant Signal Sets, Part I. Introduction," IEEE Communications Magazine, vol. 25, no. 2, February 1987, pp. 5-11, and G. Ungerboeck., "Trellis Coding Modulation with Redundant Signal Sets, Part II. State of the Art," IEEE Communications Magazine, vol. 25, no. 2, February, 1987, pp. 12-21.

Figures 1, 5A:
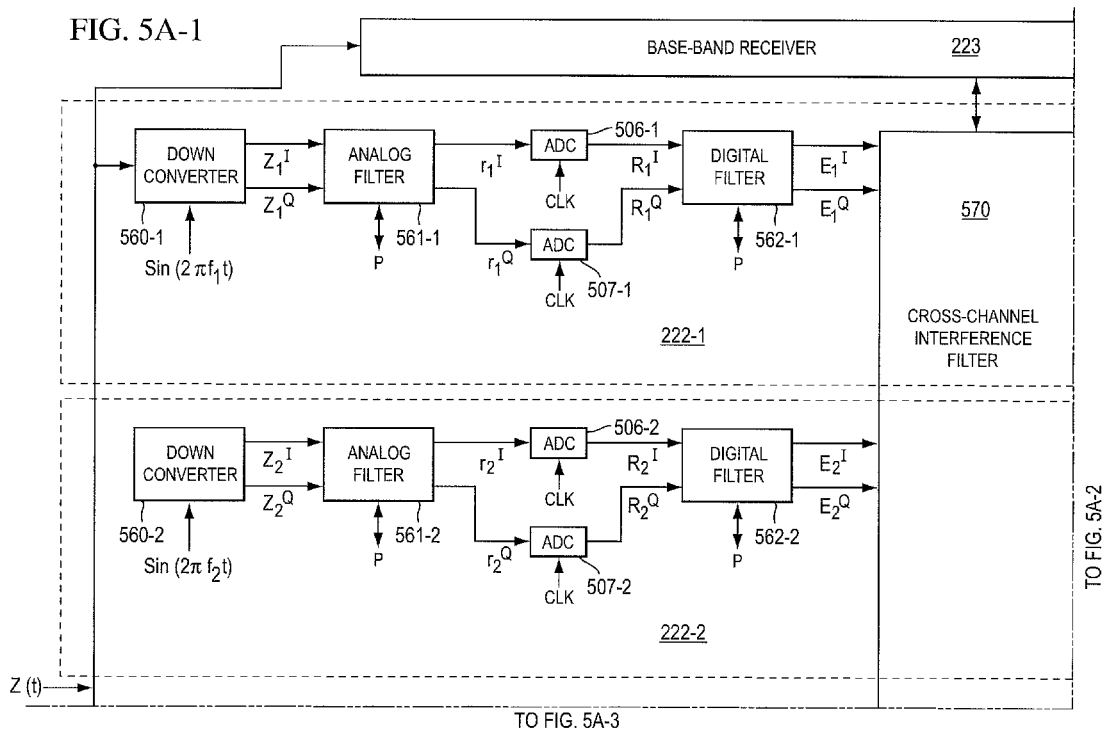
FIG. 5A shows a block diagram of an embodiment of a receiver according to the present invention.
Figures 2, 5A:
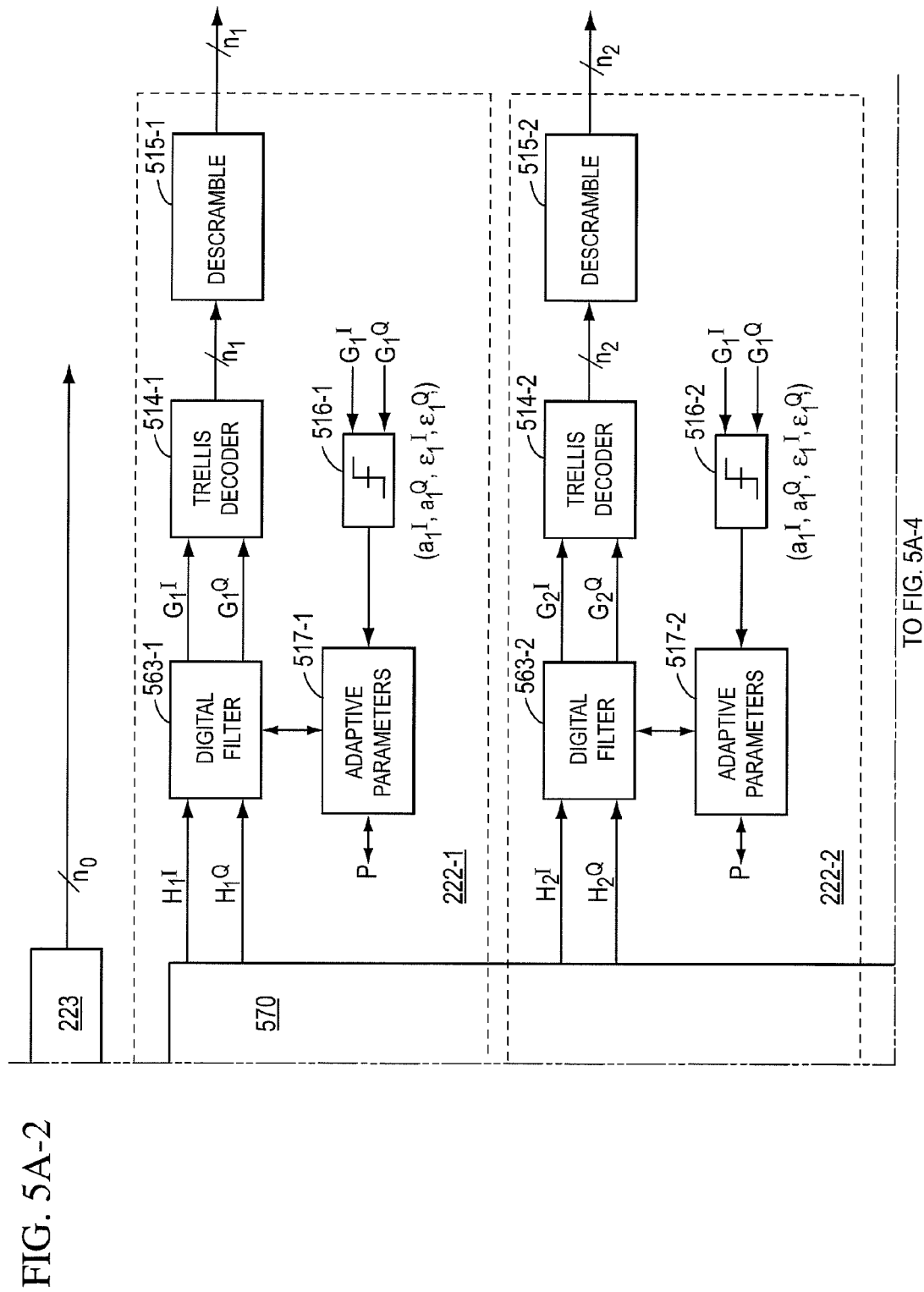
Figures 3, 5A:
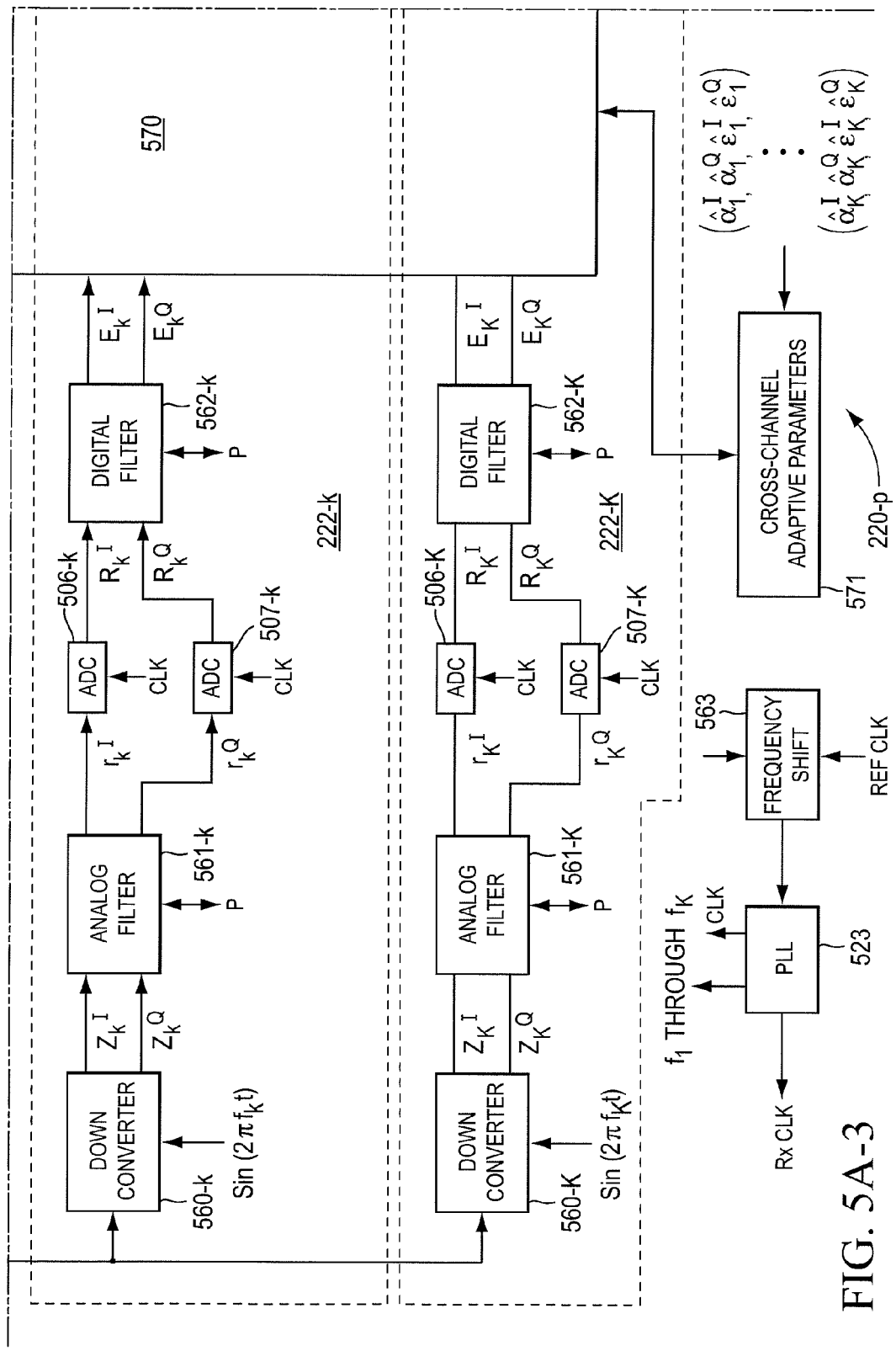
Figures 4, 5A:
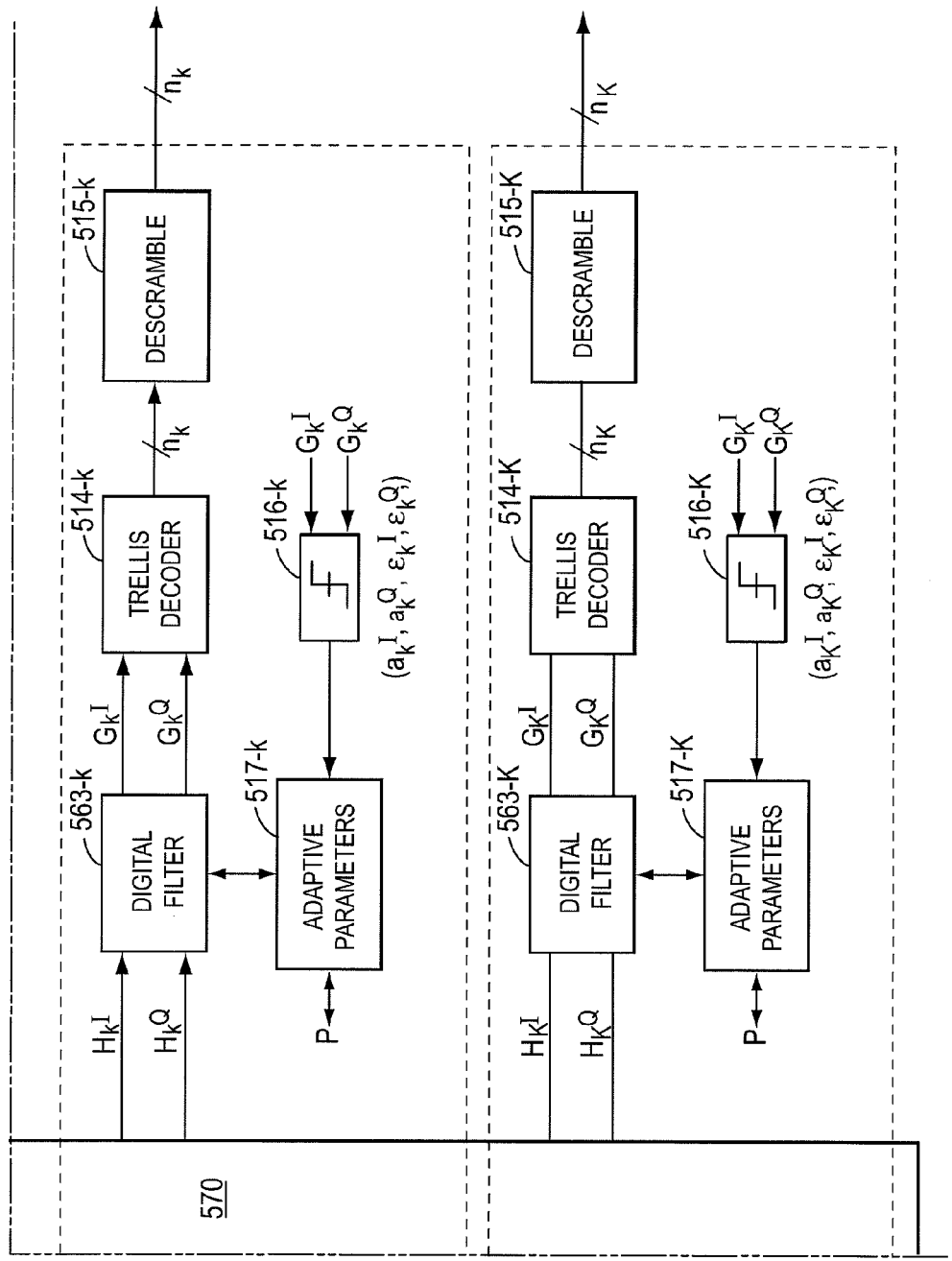
Figure 5B:
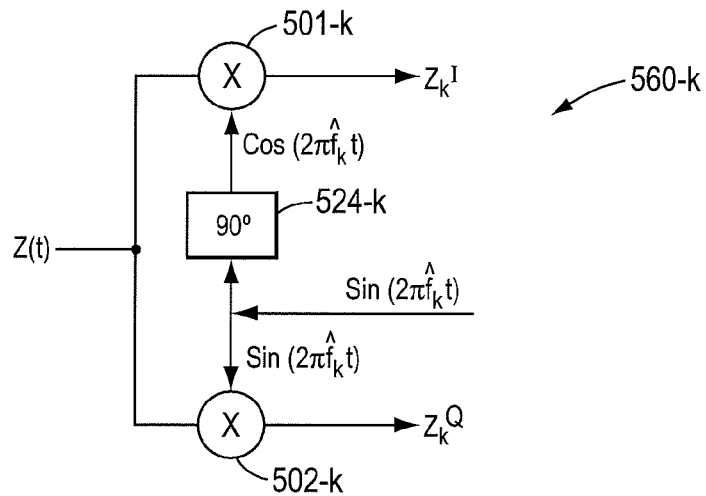
FIG. 5B shows a block diagram of a down-conversion module of a receiver as shown in FIG. 5A.

FIG. 5A shows an example of one of receiver systems 220-p where receiver system 220-p is an arbitrary one of receiver systems 220-1 through 220-P of system 200. Receiver system 220-p includes receivers 221-1 through 221-K and baseband receiver 223 to form a (K+1)-channel receiver. As shown in FIG. 2C, the output signals from receiver input buffer 224, Z(t), is received in each of receivers 222-1 through 222-K and 223. The signal Z(t), then, is the transmitted signal z(t) after transmission through medium 250. As shown in FIG. 3, the attenuation of signals at each of the K carrier frequencies after transmission through medium 250 can be different. Additionally, the signal Z(t) suffers from inter-symbol interference caused by the dispersive effects of medium 250. The dispersive effects cause the signals received within a particular timing cycle to be mixed with those signals at that carrier frequency received at previous timing cycles. Therefore, in addition to cross-channel interference effects caused by the harmonic generation in mixers of the transmitter (an arbitrary one of which being designated transmitter 210-p), but also the signals for each channel are temporally mixed through dispersion effects in medium 250.

Signal Z(t) is then received into each of receivers 222-1 through 222-K. As shown in FIG. 5A, receiver 222-k, an arbitrary one of receivers 222-1 through 222-K, for example, receives the signal Z(t) into down converter 560-k which, in the embodiment shown in FIG. 5A, down converts the channel transmitted at frequency $f_k$ back into the baseband and recovers in-phase and quadrature components $Z_k^I$ and $Z_k^Q$, respectively.

FIG. 5A shows an embodiment of down-converter 560-k. Signal Z(t) is received in multipliers 501-k and 502-k where it is down-converted to baseband to obtain an in-phase component $Z_k^I(t)$ and a quadrature component $Z_k^Q(t)$. Multiplier 501-k multiplies signal Z(t) with $\cos(2\pi \hat{f}_k t)$ and multiplier 502-k multiplies signal Z(t) with $\sin(2\pi \hat{f}_k t)$, where $\hat{f}_k$ can be the locally generated estimate of the carrier center frequency $f_k$ from the corresponding transmitter. The clock signals within component 201-p, an arbitrary one of components 201-1 through 201-P, which are generated based on the reference signal from PLL 230 as shown in FIG. 2A, will have the same frequencies. However, the frequencies between differing ones of components 201-1 through 201-P can be slightly different. Therefore, $\{f_k\}$ denotes the set of frequencies at the transmitter and $\{\hat{f}_k\}$ denotes the set of frequencies at the receiver.

In some embodiments, component 201-p is a slave component where the frequencies $\{\hat{f}_k\}$ can be adjusted to match those of the component that includes the transmitter, which is also one of components 201-1 through 201-P. In some embodiments, component 201-p is a master component, in which case the transmitter of the component communicating with component 201-p adjusts frequencies $\{f_k\}$ to match those of $\{\hat{f}_k\}$. Arbitration in any given communication link between receiver 220-p of component 201-p and a transmitter in one of the other of components 201-1 through 201-P can be accomplished in several ways. In some embodiments, priority may be set between pairs of components 201-1 through 201-P so that the master/slave relationship between those pairs is pre-determined. In some embodiments, an overall system control chooses at the start of each communication which component is master and which is slave. In some embodiments, the two components may negotiate, for example by each randomly choosing one of the k channels on which to transmit and designating the one that transmits on the lowest numbered channel as master. In any event, in any transmission either the transmitter adjusts $\{f_k\}$ or the receiver adjusts $\{\hat{f}_k\}$ depending on which has been designated master and which slave upon start of the communications As shown in FIG. 5A, PLL 523 generates the clock signals for each of receivers 222-1 through 222-K and receiver 223 and, in particular, generates the $\sin(2\pi \hat{f}_k t)$ signal for receiver 222-k. The $\cos(2\pi \hat{f}_k t)$ signal can be generated by $\pi/2$ phase shifter 524-k. PLL 523 generates the sampling clock signal utilized in analog to digital converters (ADCs) 506-k and 507-k as well as other timing signals utilized in receivers 222-1 through 222-K and receiver 223. PLL 523 also generates an RX CLK signal for output with the $n_k$ bit output signal from receiver 222-k.

Down converters 560-1 through 560-K also generate harmonics for very much the same reasons that harmonics are generated in transmitters 212-1 through 212-K. Therefore, down converter 560-k will down-convert into the base band signals from signals having center frequencies 0, $\hat{f}_k$, $2\hat{f}_k$, $3\hat{f}_k$, . . . For example, if $\hat{f}_1$ through $\hat{f}_K$ correspond to frequencies $\hat{f}_0$ through $K \hat{f}_0$, then the down conversion process for down converter 560-1 will result in the output signals $Z_1^I$ and $Z_1^Q$ including interference contributions from the received signals from all of the other channels. Additionally, the output signals $Z_2^I$ and $Z_2^Q$ include contributions from channels with frequencies 0, $2\hat{f}_0$, $4\hat{f}0$, $6\hat{f}_0$ . . . and those channels with harmonics at these frequencies. For example, if a channel has a center frequency at $3\hat{f}_0$ and transmits a second harmonic at $6\hat{f}_0$, then the receiver will bring signals at $6\hat{f}_0$ back to the baseband by the third harmonic of the mixer for the channel at $2\hat{f}_0$. Therefore, signals from channel k=3 need to be cancelled from signals transmitted on channel k=2. Each of the channels also include the cross-channel interference generated by the transmitter mixers and the dispersive interference created by the channel. If the baseband component of the harmonics is not filtered in filter 215 (FIG. 2B) out between the transmit and receive mixers, then every channel could put a copy of its transmit signal onto the baseband and every channel will receive the baseband signal at the receive side.

PLL 523 can be a free-running loop generating clock signals for receiver 222-k based on a reference clock signal. In some embodiments transmitter 212-k of transmitter and demodulator 222-k of the receiver system 220-p, because they are part of different ones of components 201-1 through 201-P, are at different clock signals. This means that the digital PLLs for timing recovery and carrier recovery correct both phase and frequency offsets between the transmitter clock signals and receiver clock signals. Within one of components 201-1 through 201-P, a transmitter/receiver pair (i.e., transmitter 210-p and receiver 220-p of component 201-p) can operate with the same PLL and therefore will operate with the same clock signals. Components 201-i and 201j, where i and j refer to different ones of components 201-1 through 201-P, in general may operate at different clock signal frequencies.

Therefore, in some embodiments the signals $Z_k^I$ and $Z_k^Q$ output from down converter 560-k suffer the effects of cross-channel interference resulting from harmonic generation in the transmitter mixers, the effects of cross-channel interference resulting from harmonic generation in the receiver mixers, and the effects of temporal, intersymbol interference, resulting from dispersion in the transport media. As an additional complicating factor, in some embodiments the transmitter and receiver clocks can be different. Therefore, as an example, in embodiments where $f_1$ through $f_K$ of the transmitter correspond to frequencies $f_0$ through $Kf_0$, respectively, then $\tilde{f}_1$ through $\tilde{f}_K$ of the receiver will correspond to frequencies $(f_0+\Delta)$ through $K(f_0+\Delta)$, where $\Delta$ represents the frequency shift between PLL 523 of receiver 220-p and the PLL of the transmitter component. The transmitter mixers then cause cross-channel interference by mixing the signals transmitted at frequency $f_k$ into $2f_k$, $3f_k$ ... ($2kf_0$, $3kf_0$ ... in one example). The receiver mixers cause cross-channel interference by down-converting the signals received at $\tilde{f}_k$, $2\tilde{f}_k$, $3\tilde{f}_k$ ... to the baseband. If the frequencies $\tilde{f}_0$ is $f_0+\Delta$, then the harmonics will be down-converted to a baseband shifted in frequency by $k\Delta$, $2k\Delta$, $3k\Delta$, ..., respectively.

In some embodiments of the invention, receiver 220-p includes a frequency shift 563 which supplies a reference clock signal to PLL 523. The reference clock signal supplied to PLL 523 can be frequency shifted so that $\Delta$ becomes 0. The frequency supplied to PLL 523 by frequency shift 563 can be digitally created and the input parameters to frequency shift 563 can be adaptively chosen to match the receiver frequency with the transmitter frequency. Embodiments of frequency adjustments in frequency shift 563 and PLL 523 are further discussed below.

Figure 5C:
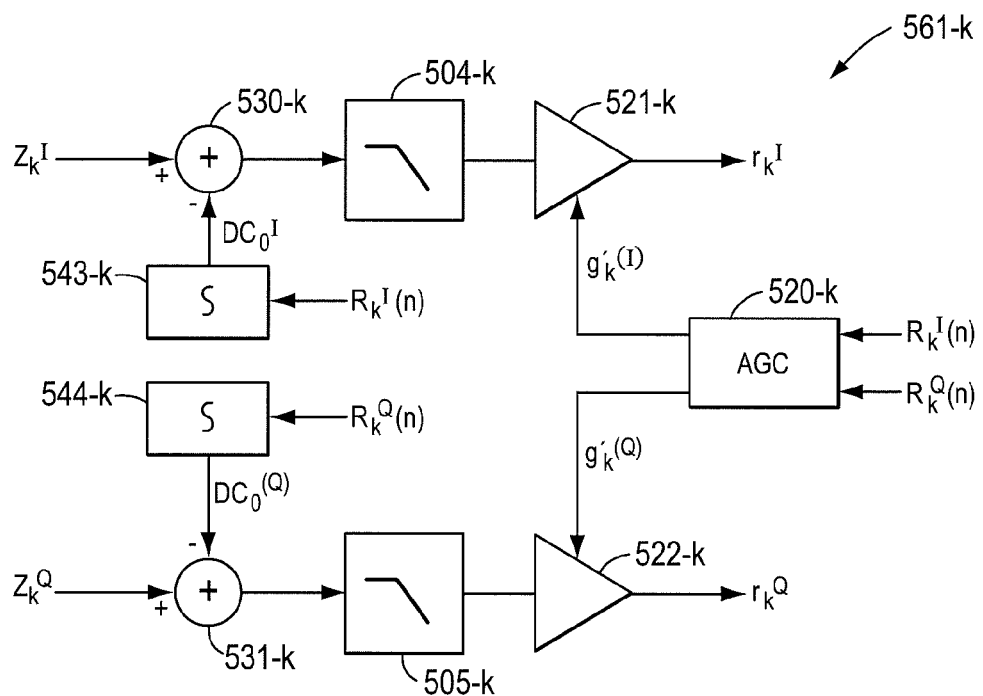
FIG. 5C shows an embodiment of a block diagram of an analog filter of a receiver as shown in FIG. 5A.

As shown in FIG. 5A, the output signals from down-converter 560-k, $Z_k^I$ and $Z_k^Q$, are input to analog filter 561-2. An embodiment of analog filter 561-2 is shown in FIG. 5C. The signals $Z_k^I$ and $Z_k^Q$ are input to offset corrections 530-k and 531-k, respectively. DC offset corrections 530-k and 531-k provide a DC offset for each of the outputs $Z_k^I$ and $Z_k^Q$ from down-converter 560-k to correct for any leakage onto signal Z(t) from the sine and cosine signals provided by PLL 523, plus any DC offset in filters 504-k and 505-k and ADCs 506-k and 507-k. Leakage onto Z(t) can, in some cases, provide a significant DC signal component of the output signals $Z_k^I$ and $Z_k^Q$ from down-converter 560-k. In some embodiments, offsets 530-k and 531-k can offset by the same amount. In some embodiments, different offset values, DCOI and DCOQ in FIG. 5C, can be provided for each of the output signals $Z_k^I$ and $Z_k^Q$ from down-converter 560-k. The DC offset values can be adaptively chosen in blocks 543-k and 544-k. In some embodiments, after an initial start-up procedure, the DC offset values are fixed.

In some embodiments, the DC offsets, DCOI and DCOQ inputs to offsets 530-k and 531-k, respectively, can be generated by providing a low frequency integration of the output signal from analog-to-digital converters (ADCs) 506-k and 507-k (FIG. 5A). In FIG. 5C, for example, low-frequency integrator 543-k receives the output signal from of ADC 506-k, $R_k^I$, and provides the DCOI input signal to offset 530-k; integrator 544-k receives the output signal from ADC 507-k, $R_k^Q$, and provides the DCOQ input signal to offset 531-k. The low frequency integration of integrators 544-k and 543-k provides signals that set the average output signal of each of ADCs 506-k and 507-k to zero. In some embodiments of the invention, integrators 543-k and 544-k hold the offset values DCOI and DCOQ, respectively, constant after a set period time of integration when receiver 222-k is first started.

The output signals $Z_k^I$ and $Z_k^Q$ from down-converter 560-k, or from offsets 530-k and 531-k in embodiments with offsets, can be input to low-pass filters 504-k and 505-k. Low-pass filters 504-k and 505-k are analog filters that filter out signals not associated with the baseband signal (i.e., signals from the remaining bands of transmitter 210-p) for the kth transmission band. Low pass filters 504-k and 505-k, however, do not remove the interference caused by harmonic generation in transmit and receive mixers involved in the up-conversion and down-conversion process.

Filters 504-k and 505-k again, in some embodiments, can be parameterized by the two-zero, five-pole filter design described by Equation 2, $$H_{RX}(s) = \frac{b_2 s^2 + b_1 s + b_0}{s^5 + a_4 s^4 + \ldots + a_0}. \tag{12}$$

Furthermore, the parameters $b_2$, $b_1$, $b_0$, and $a_4$ through $a_0$ can be found by minimizing the cost function $$\int_0^\infty |H_{RX}(s) - H_{RRC}(f)e^{-j2\pi f \tau}|^2 W(f) df. \tag{13}$$

The cost function is minimized with respect to the parameters of the filter and the time delay $\tau$. Again in Equation 13, the weighting function W(f) can be chosen such that the stop band rejection of $H_{RX}(s)$ is less than –50 dB. Furthermore, the function $H_{RRC}(f)$ is the square root raised cosine function shown in FIG. 6E. As shown in FIG. 6E, the function $H_{RRC}(f)$ is characterized by a parameter $\alpha_k$ and baud frequency $1/T_k$. The parameter $\alpha_k$ is the excess bandwidth of the target function $H_{RRC}(f)$. In some embodiments, $\alpha_k$ can be 0. In some embodiments, $\alpha_k$ can be 0.6. In general, the parameter $\alpha_k$ can be any value, with smaller values providing better filtering but larger values being easier to implement. The parameter $T_k$ is related to the baud rate, $T_k=1/B_k$.

In some embodiments of the invention, filters 504-k and 505-k can be determined by minimizing the function $$\int_0^\infty |H_{DAC}(f)H_{TX}(s)H_{RX}(s) - H_{RC}(f)e^{-j2\pi f \tau}|^2 W(f) df, \tag{14}$$

where the function $H_{RC}(f)$ is a square-root raised cosine function. The function $H_{RC}(f)$ is characterized by the parameters $\alpha_k$ and $1/T_k$. Equation 14 includes the effects of the transmit digital to analog converters 406 and 407 (FIG. 4) as well as the analog transmit filters 408 and 409 (FIG. 4) to set the overall response of filters 408 and 409, filters 504-k and 505-k, and transmitter digital to analog converters 406 and 407 to the target response function $H_{RC}(f)$. In some embodiments, $H_{TX}(f)$ and $H_{RX}(f)$ can be the same.

Figure 8A:
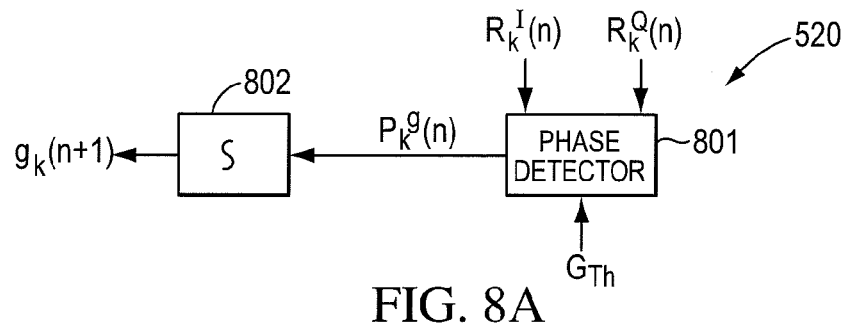
FIGS. 8A and 8B show a block diagram of an embodiment of an automatic gain control circuit of a receiver demodulator according to the present invention.
Figure 8B:
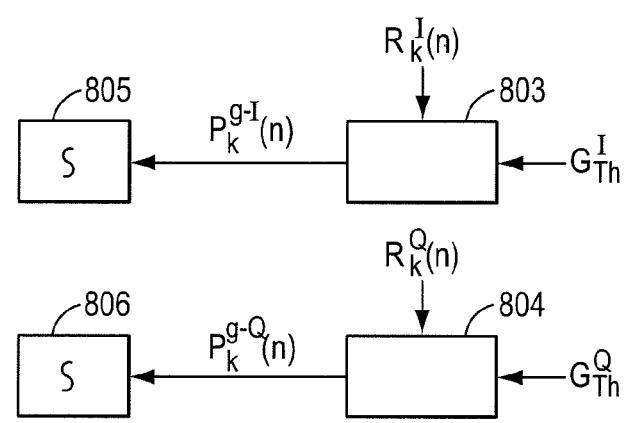

The output signals from low-pass filters 504-k and 505-k can, in some embodiments, be amplified in variable gain amplifiers 521-k and 522-k, respectively. In some embodiments, the gains $g_k^{1(I)}$ and $g_k^{1(Q)}$ of amplifiers 521-k and 522-k, respectively, are set such that the dynamic range of analog-to-digital converters 506-k and 507-k, respectively, is filled. The output signals from amplifiers 521-k and 522-k, then, are $$r_k^I(t) = LPF[Z(t)\cos(2\pi f_k t)]g_k^{1(I)}$$

$$r_k^Q(t) = LPF[Z(t)\sin(2\pi f_k t)]g_k^{1(Q)}, \quad (15)$$

where $g_k^{1(I)}$ and $g_k^{1(Q)}$ represents the gain of amplifiers 521-k and 522-k, respectively. The gains of amplifiers 521-k and 522-k can be set in an automatic gain control circuit (AGC) 520-k. An embodiment of automatic gain circuit 520-k where $g_k^{1(I)}$ and $g_k^{1(Q)}$ are set equal to one another is shown in FIGS. 8A and 8B. In some embodiments, amplifiers 521-k and 522-k can be before or incorporated within filters 504-k and 505-k, respectively.

As shown in FIG. 5A, the signals output from analog filter 561-k, signals $r_k^I(t)$ and $r_k^Q(t)$, are input to analog-to-digital converters (ADC) 506-k and 507-k, respectively, which forms digitized signals $R_k^I(t)$ and $R_k^Q(t)$ corresponding with the analog signals $r_k^I(t)$ and $r_k^Q(t)$, respectively. In some embodiments, ADCs 506-k and 507-k operate at a sampling rate that is the same as the transmission symbol rate, e.g. the QAM symbol rate. In some embodiments, ADCs 506-k and 507-k can operate at higher rates, for example twice the QAM symbol rate. The timing clock signal SCLK, as well as the sine and cosine functions of Equation 15, is determined by PLL 523. In outputs with $\eta=10$, K=8, and $n_k=6$, as described above, ADCs 506-k and 507-k can operate at a rate of about 208 Msymbols/sec or, in embodiments with K=16, about 104 Msymbols/sec. In some embodiments, ADCs 506-k and 507-k can be 8-bit ADCs. However, for 128 QAM operation, anything more than 7 bits can be utilized.

In some embodiments, the gain of amplifiers 521-k and 522-k of analog filters 560-k can be set by automatic gain control circuit (AGC) 520-k (see FIG. 5C). Gain control circuit 520-k can receive the digital output signals from ADCs 506-k and 507-k, $R_k^I(n)$ and $R_k^Q(n)$, respectively, and determines the gain $g_k^I(n+1)$ for each of amplifiers 521-k and 522-k (i.e., in this embodiment $g^{1(I)}{}_k(n)$ and $g^{1(Q)}{}_k(n)$ are equal). FIGS. 8A and 8B show some embodiments of AGC 520-k. The embodiment of AGC 520-k shown in FIG. 8A includes an AGC phase detector 801 and an integrator 802. Phase detector 801 estimates whether or not the mean-squared-power of signals $R_k^I(t)$ and $R_k^Q(t)$ are at a pre-determined threshold value and, if not, provides a correction signal to adjust the amplitudes of signals $r_k^I(t)$ and $r_k^Q(t)$. The output signal from phase detector 801 can be given by $$p_k^g(n) = [G_{th} - (R_k^I(n)^2 + R_k^Q(n)^2)], \quad (16)$$

where $G_{th}$ is the mean squared power of the signals input to ADCs 506-k and 507-k once AGC 520-k converges. The output signal from phase detector 801, $p_k^g(n)$, is then input to integrator 802. Integrator 802 digitally adjusts the gain $g_k$ according to $$g_k^1(n+1) = g_k^1(n) + \alpha_g p_k^g(n), \quad (17)$$

where $\alpha_g$ determines the rate of adaptation of the AGC algorithm. The constant $\alpha_g$ can be chosen to be a negative power of 2 for ease of implementation.

The embodiment of phase detector 520-k shown in FIG. 8B includes two phase detectors 803 and 804 which calculate the mean squared powers of $R_k^I(n)$ and $R_k^Q(n)$ separately and compare them with thresholds $G_{th}^I$ and $G_{th}^Q$, respectively. The output signals from phase detectors 803 and 804 can be given by $$p_k^{g-I}(n) = [G_{th}^I - (R_k^I(n)^2)]$$

$$p_{kg-Q}(n) = [G_{th}^Q - (R_k^Q(n)^2)], \quad (18)$$

respectively. The output signals from detectors 803 and 804 can then be integrated in integrators 805 and 806 according to $$g_k^{1-I}(n+1) = g_k^{1-I}(n) + \alpha_g^I p_k^{g-I}(n), \text{ and}$$

$$g_k^{1-Q}(n+1) = g_k^{1-Q}(n) + \alpha_g^Q p_k^{g-Q}(n), \quad (19)$$

where $\alpha_g^I$ and $\alpha_g^Q$ determine the rate of adaptation of the AGC algorithm as in Equation 17 above.

In some embodiments AGC 520-k can include a peak detection algorithm so that the gain values $g_k^{1(I)}$ and $g_k^{1(Q)}$ are determined from the peak values of $R_k^I$ and $R_k^Q$, respectively. Again, the peak values of $R_k^I$ and $R_k^Q$ can be compared with threshold values and the gain values $g_k^{1(I)}$ and $g_k^{1(Q)}$ adjusted accordingly.

Figure 5D:
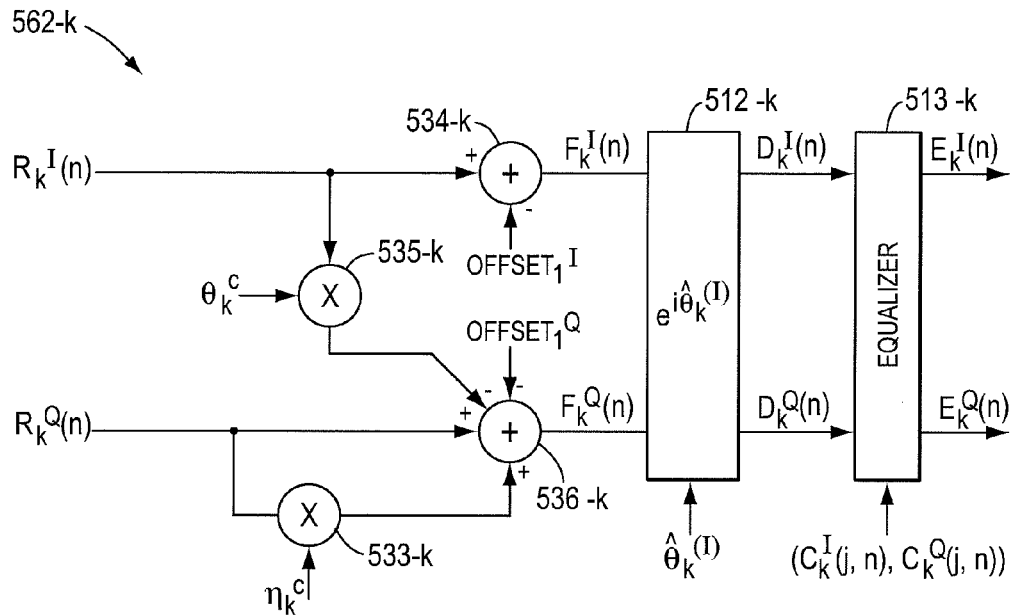
FIG. 5D shows an embodiment of a digital filter of a receiver as shown in FIG. 5A.

As shown in FIG. 5A, the output signals from ADCs 506-k and 507-k, $R_k^I$ and $R_k^Q$, respectively, are input to a first digital filter 562-k. An embodiment of first digital filter 562-k is shown in FIG. 5D. In some embodiments of the invention, the in-phase and quadrature data paths may suffer from small differences in phase and small differences in gain. Therefore, in some embodiments a phase and amplitude correction is included in digital filter 562-k. In order to correct the phase and amplitude between the in-phase and quadrature data paths, one of the values $R_k^I(n)$ and $R_k^Q(n)$ is assumed to be of the correct phase and amplitude. The opposite value is then corrected. In the embodiment shown in FIG. 5D, $R_k^I(n)$ is assumed to be correct and $R_k^Q(n)$ is corrected. The phase error can be corrected by using the approximation for small $\theta_k^c$ where $\sin\theta_k^c$ is approximately $\theta_k^c$, and $\cos\theta_k^c$ is approximately one. This correction can be implemented by subtracting in summer 536-k the value $\theta_k^c R_k^I(n)$ calculated in multiplier 535-k to $R_k^Q(n)$. The amplitude of $R_k^Q(n)$ can be corrected by adding a small portion $\eta_k^c$ of $R_k^Q(n)$, calculated in multiplier 533-k, in summer 536-k. The value $\eta_k^c$ can be determined in tracking and recovery block 517-k by integrating the difference in magnitude of the output signals from summer 534-k and 536-k, $F_k^I(n)$ and $F_k^Q(n)$, in a very low frequency integration block (for example several kHz), such that $$\eta_k^c = \int (|F_k^I(n)| - |F_k^Q(n)|) dn. \quad (20)$$

The value $\theta_k^c$ can be chosen in tracking and recovery block 517-k by $$\theta_k^c = \int (\text{sign}(F_k^I(n))F_k^Q(n) + \text{sign}(F_k^Q(n))F_k^I(n)) dn. \quad (21)$$

Additionally, an arithmetic offset can be implemented by subtracting the value OFFSET$_1^I$ in summer 534-k to $R_k^I(n)$ and subtracting the value OFFSET$_1^Q$ in summer 536-k. The offset values OFFSET$_1^I$ and OFFSET$_1^Q$ can be adaptively chosen in tracking and recovery block 517-k by integrating the output signals from summer 534-k and summer 536-k, $F_k^I(n)$ and $F_k^Q(n)$, respectively, in a low frequency integration. The offsets implemented in summer 534-k and 536-k offset the dc offset not corrected in analog filter 561-k, e.g. by offsets 530-k and 531-k, for example, as well as arithmetic errors in summers 534-k, 536-k and multipliers 535-k and 533-k.

The output signals from summers 534-k and 536-k, then, can be given by $$F_k^I(n) = R_k^I(n) - \text{OFFSET}_{1,k}^I, \text{ and}$$

$$F_k^Q(n) = (1+\eta_k^c)R_k^Q(n) - \theta_k^c R_k^I(n) - \text{OFFSET}_{1,k}^Q. \quad (22)$$

In some embodiments, the parameters $\text{OFFSET}_{1,k}^I$, $\text{OFFSET}_{1,k}^Q$, $\eta_k^c$, and $\theta_k^c$ vary for each cycle n. Additionally, the parameters can be different for each of the k receivers 222-1 through 222-k.

The output signals from summers 534-k and 536-k, $F_k^I(n)$ and $F_k^Q(n)$, respectively, are then input to a phase rotation circuit 512-k. Phase rotation 512-k rotates signals $F_k^I(n)$ and $F_k^Q(n)$ according to the output of a carrier phase and frequency offset correction circuit, which depends on the difference between $\hat{f}_k$ and $f_k$, and the relative phase of the transmit mixers (multipliers 410 and 411) and the receive mixers (multipliers 501-k and 502-k) and transmission channel 250 (FIG. 2A). The rotation angle $\hat{\theta}_k^I(n)$ is computed in carrier tracking and timing recovery block 517. The resultant output signals of carrier phase rotation circuit 512, $D_k^I(n)$ and $D_k^Q(n)$, can be given by:

$$D_k^I(n) = F_k^I(n)\cos(\hat{\theta}_k^I(n)) + F_k^Q(n)\sin(\hat{\theta}_k^I(n))$$

$$D_k^Q(n) = F_k^Q(n)\cos(\hat{\theta}_k^I(n)) - F_k^I(n)\sin(\hat{\theta}_k^I(n)). \quad (23)$$

The output signals from rotation circuit 512-k, $D_k^I(n)$ and $D_k^Q(n)$, are then input to a complex adaptive equalizer 513-k to counter the intersymbol interference caused by frequency dependent channel attenuation, and the reflections due to connectors and vias that exist in communication system 200 (which can be a backplane communication system, an inter-cabinet communication system, or a chip-to-chip communication system) and both transmit and receive low pass filters, e.g. filters 408 and 409 of FIG. 4 and filters 504-k and 505-k of FIG. 5C.

It should be noted that because of the frequency division multiplexing of data signals, as is accomplished in transmitter system 210-p and receiver system 220-p, the amount of equalization needed in any one of channels 301-0 through 301-K is minimal. In some embodiments, such as the 16-channel, 6 bit per channel, 10 Gbps example, only about 1-2 dB of transmission channel magnitude distortion needs to be equalized. In 8 channel embodiments, 3-4 dB of distortion needs to be equalized. In other words, the number of taps required in a transport function for equalizer 513-k can be minimal (e.g., 1-4 complex taps) in some embodiments of the present invention, which can simplify receiver 220-p considerably. In some embodiments of the invention, equalizer 513 can have any number of taps.

Complex Equalizer 513-k can be either a linear equalizer (i.e., having a feed-forward section only) or a decision feedback equalizer (i.e., having a feed-forward and a feedback portion). The coefficients of the equalizer transfer function are complex-valued and can be adaptive. In some embodiments, the complex equalizer coefficients that operate on signals $D_k^I$ and $D_k^Q$ are the same, but in other embodiments the complex equalizer coefficients are allowed to be different for $D_k^I$ and $D_k^Q$.

Additionally, the feed-forward portion of an adaptive equalizer (either a linear equalizer or decision feed-back equalizer) can be preceded by a non-adaptive all-pole filter with transfer function $1/A(z)$. In some embodiments, the coefficients of $A(z)$, which can be found by a minimum mean squared error technique, can be real-valued, for example $$A(Z) = 1.0 + 0.75Z^{-1} + 0.0625Z^{-2} + 0.0234375Z^{-3} + 0.09375Z^{-4}, \quad (24)$$

which can be rewritten as $$A(Z) = 1 + 0.75Z^{-1} + \frac{1}{16}Z^{-2} + \left(\frac{1}{64} + \frac{1}{128}\right)Z^{-3} + \left(\frac{1}{16} + \frac{1}{32}\right)Z^{-4}. \quad (25)$$

The resulting transfer function $H(z) = 1/A(z)$ can be implemented in a linear equalizer or a decision feedback equalizer. In some embodiments, however, complex adaptive equalizer 513-k includes adaptively chosen parameters.

In general, complex adaptive equalizer 513-k can be decision feedback equalizer (DFE) or a linear equalizer. See, e.g., EDWARD A. LEE, AND DAVID G. MESSERSCHMITT, DIGITAL COMMUNICATION, pp. 371-402 (Kluwer Academic Publishers, 1988). The in-phase and quadrature output signals from adaptive equalizer 513 in embodiments with linear equalization can be given by:

$$E_k^I(n) = \sum_{j=-M}^{N} C_k^{x,I}(j,n)D_k^I(n-j) - C_k^{y,I}(j,n)D_k^Q(n-j) \text{ and} \quad (26)$$

$$E_k^Q(n) = \sum_{j=-M}^{N} C_k^{x,Q}(j,n)D_k^Q(n-j) + C_k^{y,Q}(j,n)D_k^I(n-j).$$

where j refers to the tap $Z^{-j}$. The complex adaptive equalizer coefficients $C_k^{x,I}(j,n)$, $C_k^{y,I}(j,n)$, $C_k^{x,Q}(j,n)$ and $C_k^{y,Q}(j,n)$ can be updated according to the least mean squares (LMS) algorithm as described in BERNARD SKLAR, DIGITAL COMMUNICATIONS, FUNDAMENTALS AND APPLICATIONS (Prentice-Hall, Inc., 1988), for example. In some embodiments, equalizer coefficients $C_k^{x,I}(j,n)$ and $C_k^{x,Q}(j,n)$ are the same and equalizer coefficients $C_k^{y,I}(j,n)$ and $C_k^{y,Q}(j,n)$ are the same.

In some embodiments of the invention, the center coefficients of the feed-forward part of equalizer 513-k, $C_k^{x,I}(0,n)$, $C_k^{y,I}(0,n)$, $C_k^{x,Q}(0,n)$ and $C_k^{y,Q}(0,n)$ can each be fixed at 1 and 0, respectively, to avoid interaction with the adaptation of gain coefficients $g_k^{2(I)}$ and $g_k^{2(Q)}$ used in amplifiers 537-k and 538-k of a second digital filter 563-k and the carrier phase correction performed in phase rotator 512-k. Additionally, in some embodiments the coefficients $C_k^{x,I}(-1,n)$, $C_k^{y,I}(-1,n)$, $C_k^{x,Q}(-1,n)$ and $C_k^{y,Q}(-1,n)$ can be fixed at constant values to avoid interaction with the adaptation of the phase parameter $\hat{\tau}_k$ by tracking and timing recovery 517-k. For example, the parameters $C_k^{x,I}(-1,n)$ and $C_k^{x,Q}(-1,n)$ can be $-\frac{1}{4}-\frac{1}{16}$, which is $-0.3125$, and the parameters $C_k^{y,I}(-1,n)$ and $C_k^{y,Q}(-1,n)$ can be $-\frac{1}{64}$, which is $-0.015625$. In some embodiments, one set of parameters, for example $C_k^{x,I}(-1,n)$ and $C_k^{x,Q}(-1,n)$, are fixed while the other set of parameters, for example $C_k^{y,I}(-1,n)$ and $C_k^{y,Q}(-1,n)$, can be adaptively chosen.

Figure 7:
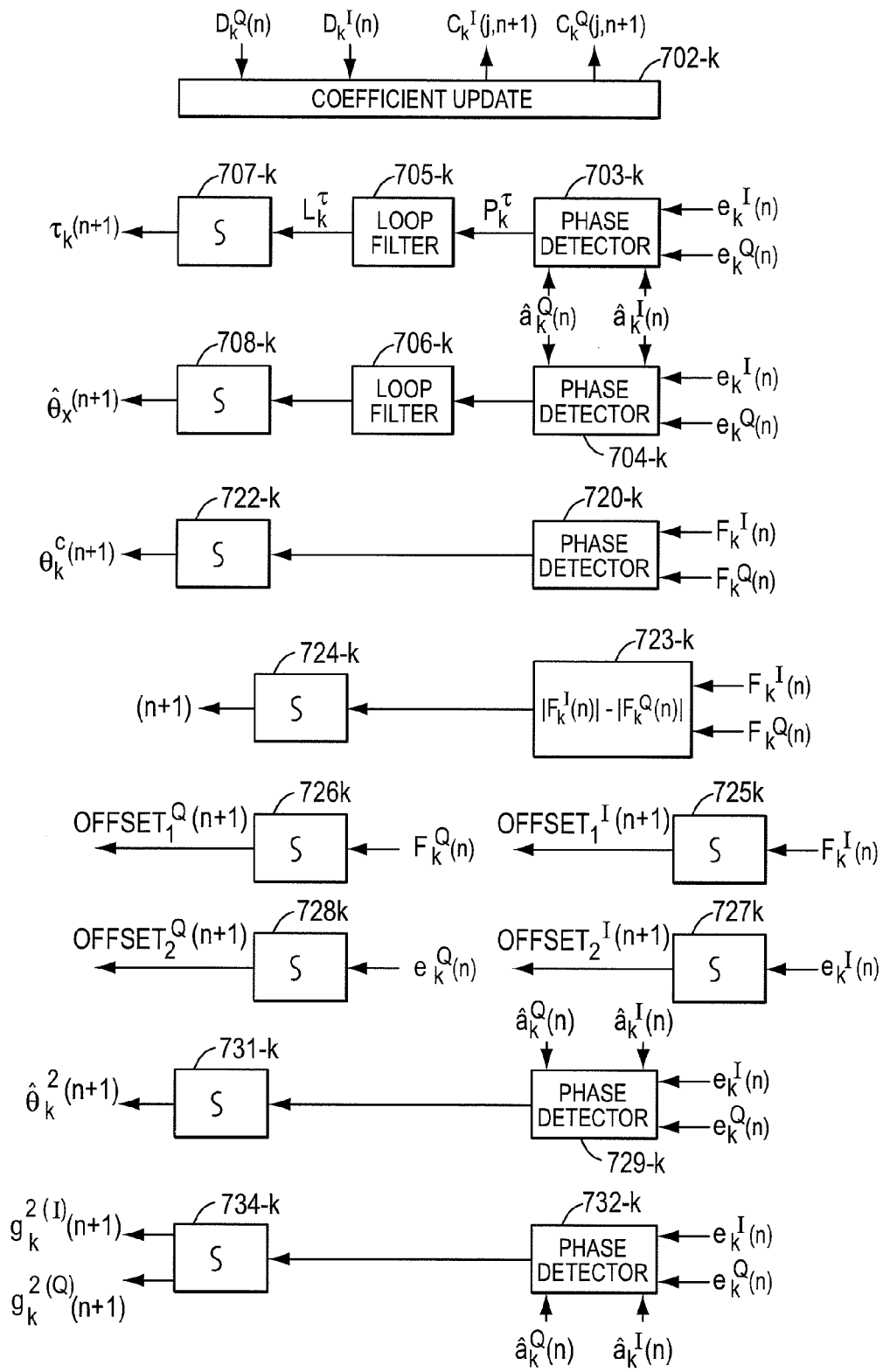
FIG. 7 shows a block diagram of an embodiment of a tracking and error-recovery circuit of the receiver shown in FIG. 5A.

In some embodiments of the invention, for example, $C_k^{x,I}(-1,n)$ and $C_k^{y,I}(-1,n)$ are fixed and the timing recover loop of adaptive parameters 517-2 for determining the phase parameter $\hat{\tau}_k$ utilizes errors $e_k^I$ only (see FIG. 7). In that way, adaptively choosing parameters in the Q channel do not interact with the timing loop. In some embodiments, the opposite can be utilized (i.e., $C_k^{x,Q}(-1,n)$ and $C_k^{y,Q}(-1,n)$ are fixed and the timing loop determines the phase parameter $\hat{\tau}_k$ from error parameter $e_k^Q$).

The output signals from each of digital filters 562-1 through 562-K, signals $E_1^I(n)$ and $E_1^Q(n)$ through $E_K^I(n)$ and $E_K^Q(n)$, respectively, are input to cross-channel interference filter 570. Cross-channel interference canceller 570 removes the effects of cross-channel interference. Cross-channel interference can result, for example, from harmonic generation in the transmitter and receiver mixers, as has been previously discussed. As described in the embodiment of digital filter 562-k shown in FIG. 5D, equalization for intersymbol interference can be performed in digital filter 562-k. In some embodiments of the invention, cross-channel interference filter 570 may be placed before equalizer 513-k (in other words, equalizer 513-k may be placed in digital filter 563-2 instead of digital filter 562-2).

The output signals from digital filter 562-2, $E_k^I(n)$ and $E_k^Q(n)$, for each of receivers 222-1 through 222-K are input to cross-channel interference filter 570. An embodiment of cross-channel interference canceller 570 is shown in FIG. 5F. For convenience of discussion, the input signals $E_k^I(n)$ and $E_k^Q(n)$ are combined into a complex value $E_k(n)=E_k^I(n)+iE_k^Q(n)$ (where i is $\sqrt{-1}$). Each of the complex values $E_1$ through $E_K$ is input to a summer 571-1 through 571-K, respectively, where contributions from all of the other channels are removed. The output signals from summers 571-1 through 571-K, $H_1$ through $H_K$, respectively, are the output signals from cross-channel interference filter 570. Again, the complex value $H_k(n)$ is $H_k^I(n)+iH_k^Q(n)$, representing the in-phase and quadrature output signals.

The signal $E_k$ is also input to blocks 572-k,1 through 572-k,k−1 and blocks 572-k,k+1 to 572-k,K. Block 572-k,l, an arbitrary one of blocks 572-1,2 through 572-K,K−1, performs a transfer function $Q_{k,l}$ which determines the amount of signal $E_k$ which should be removed from $E_l$ to form $H_l$. Further, delays 573-1 through 573-K delay signals $E_1$ through $E_K$ for a set number of cycles N to center the cancellations in time. Therefore, the output signals $H_1$ through $H_K$ can be determined as $$\begin{pmatrix} H_1^I \\ H_2^I \\ \vdots \\ H_k^I \\ \vdots \\ H_K^I \end{pmatrix} = \begin{pmatrix} Z^{-N} & 0 & \cdots & 0 & \cdots & 0 \\ 0 & Z^{-N} & \cdots & 0 & \cdots & 0 \\ \vdots & \vdots & \ddots & \vdots & \cdots & \vdots \\ 0 & 0 & \cdots & Z^{-N} & \cdots & 0 \\ \vdots & \vdots & \cdots & \vdots & \ddots & \vdots \\ 0 & 0 & \cdots & 0 & \cdots & Z^{-N} \end{pmatrix} \begin{pmatrix} E_1^I \\ E_2^I \\ \vdots \\ E_k^I \\ \vdots \\ E_K^I \end{pmatrix} - \quad (27)$$

$$\mathrm{RE}\left[\begin{pmatrix} 0 & Q_{2,1}^I & \cdots & Q_{k,1}^I & \cdots & Q_{K,1}^I \\ Q_{1,2}^I & 0 & \cdots & Q_{k,2}^I & \cdots & Q_{K,2}^I \\ \vdots & \vdots & \ddots & \vdots & \cdots & \vdots \\ Q_{1,k}^I & Q_{2,k}^I & \cdots & 0 & \cdots & Q_{K,k}^I \\ \vdots & \vdots & \vdots & \vdots & \ddots & \vdots \\ Q_{1,K}^I & Q_{2,K}^I & \cdots & Q_{k,K}^I & \cdots & 0 \end{pmatrix}\begin{pmatrix} E_1 \\ E_2 \\ \vdots \\ E_k \\ \vdots \\ E_K \end{pmatrix}\right]$$

$$\begin{pmatrix} H_1^Q \\ H_2^Q \\ \vdots \\ H_k^Q \\ \vdots \\ H_K^Q \end{pmatrix} = \begin{pmatrix} Z^{-N} & 0 & \cdots & 0 & \cdots & 0 \\ 0 & Z^{-N} & \cdots & 0 & \cdots & 0 \\ \vdots & \vdots & \ddots & \vdots & \cdots & \vdots \\ 0 & 0 & \cdots & Z^{-N} & \cdots & 0 \\ \vdots & \vdots & \cdots & \vdots & \ddots & \vdots \\ 0 & 0 & \cdots & 0 & \cdots & Z^{-N} \end{pmatrix} \begin{pmatrix} E_1^Q \\ E_2^Q \\ \vdots \\ E_k^Q \\ \vdots \\ E_K^Q \end{pmatrix} -$$

$$\mathrm{IM}\left[\begin{pmatrix} 0 & Q_{2,1}^Q & \cdots & Q_{k,1}^Q & \cdots & Q_{K,1}^Q \\ Q_{1,2}^Q & 0 & \cdots & Q_{k,2}^Q & \cdots & Q_{K,2}^Q \\ \vdots & \vdots & \ddots & \vdots & \cdots & \vdots \\ Q_{1,k}^Q & Q_{2,k}^Q & \cdots & 0 & \cdots & Q_{K,k}^Q \\ \vdots & \vdots & \vdots & \vdots & \ddots & \vdots \\ Q_{1,K}^Q & Q_{2,K}^Q & \cdots & Q_{k,K}^Q & \cdots & 0 \end{pmatrix}\begin{pmatrix} E_1 \\ E_2 \\ \vdots \\ E_k \\ \vdots \\ E_K \end{pmatrix}\right]$$

where $Z^{-1}$ represents a once cycle delay. The transfer functions $Q_{k,l}^I$ and $Q_{k,l}^Q$ can have any number of taps and, in general, can be given by $$Q_{k,l}^I = \sigma_{k,l}^{0,I} + \sigma_{k,l}^{1,I} Z^{-1} + \sigma_{k,l}^{2,I} Z^{-2} + \ldots + \sigma_{k,l}^{M,I} Z^{-M};$$

$$Q_{k,l}^Q = \sigma_{k,l}^{0,Q} + \sigma_{k,l}^{1,Q} Z^{-1} + \sigma_{k,l}^{2,Q} Z^{-2} + \ldots + \sigma_{k,l}^{M,Q} Z^{-M}; \quad (28)$$

where $\sigma_{k,l}^{m,I}$ and $\sigma_{k,l}^{m,Q}$ are complex values, further discussed below with respect to Equations 46 through 48. In general, each of the functions $Q_{k,l}$ can have a different number of taps M and N can be different for each channel In some embodiments, the number of taps M for each function $Q_{k,l}$ can be the same. In some embodiments, delays can be added in order to match the timing between all of the channels. Further, in general delays 573-1 through 573-K can delay signals $E_1$ through $E_K$ by a different number of cycles. In some embodiments, where each of functions $Q_{k,l}$ includes M delays, each of delays 573-1 through 573-K includes N=M/2 delays where N is rounded to the nearest integer.

The coefficients $\sigma_{k,l}^{0,I}$ through $\sigma_{k,l}^{M,I}$ and $\sigma_{k,l}^{0,Q}$ through $\sigma_{k,l}^{M,Q}$ can be adaptively chosen in cross-channel adaptive parameter block 571 as shown in FIG. 5A in order to optimize the performance of receiver system 220-p. In some embodiments, M is chosen to be 5. In some embodiments, transfer function $Q_{k,l}$ may simply be two complex numbers, M=0. Cross-channel adaptive parameter block 571 is further discussed below.

Therefore, in cross channel interference canceller 570 the cross channel interference is subtracted from the output signals from digital filters 562-1 through 562-K as indicated by Equation 26. The output signals from cross-channel interference canceller 570 for an arbitrary one of receivers 222-k, $H_k^I$ and $H_k^Q$, can be input to a second digital filter 563-k. An embodiment of second digital filter 563-k is shown in FIG. 5E.

The parameters $\sigma_{k,l}^{m,I}$ and $\sigma_{k,l}^{m,Q}$ of Equation 28 can be adaptively chosen. In the adaptation algorithm, the real and imaginary parts of $\sigma_{k,l}^{m,I}$ and $\sigma_{k,l}^{m,Q}$ can be adjusted separately. The adaptive adjustments of parameters $\sigma_{k,l}^{m,I}$ and $\sigma_{k,l}^{m,Q}$ is further discussed below.

Figure 5E:
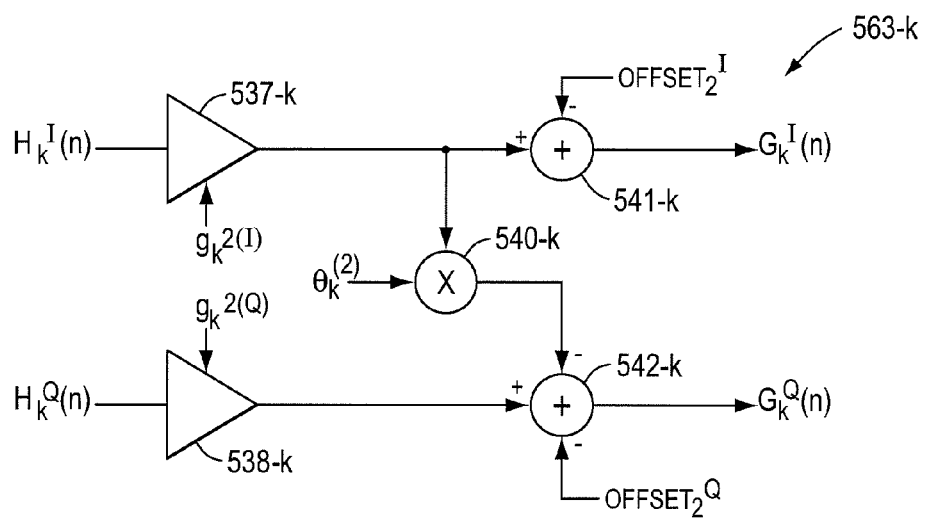
FIG. 5E shows an embodiment of a second digital filter of a receiver as shown in FIG. 5A.
Figure 5F:
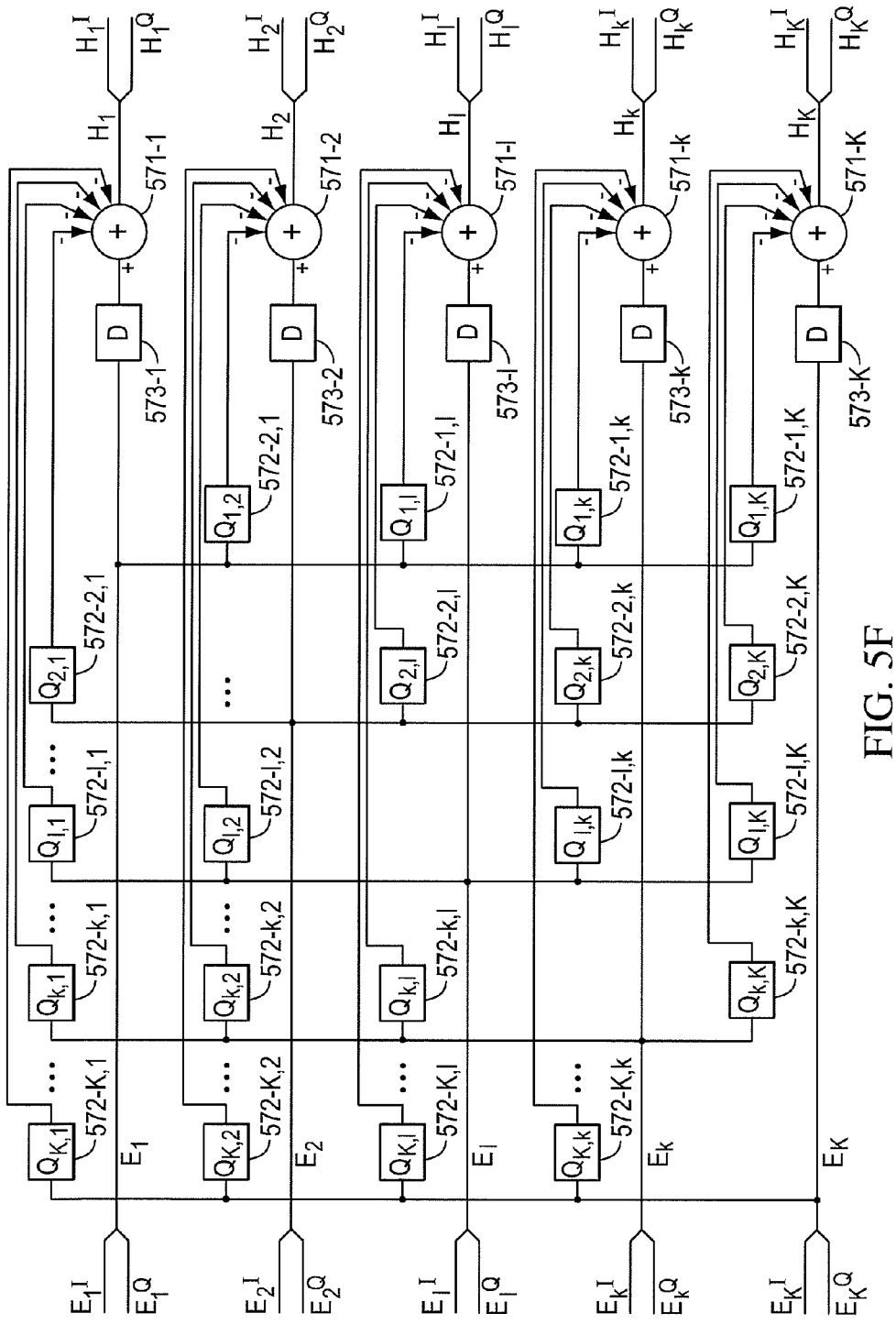
FIG. 5F shows an embodiment of a cross-channel interference canceller of the receiver shown in FIG. 5A in accordance with the present invention.

As shown in FIG. 5E, the signals $H_k^I$ and $H_k^Q$ can be input to AGC controlled amplifiers 537-k and 538-k, respectively. The gains of amplifiers 537-k and 538-k, $q_k^{2(I)}$ and $g_k^{2(Q)}$, respectively, are set such that the output signals from amplifiers 537-k and 538-k yield appropriate levels for the symbol set. The gain values $g_k^{2(I)}$ and $g_k^{2(Q)}$ are set in tracking and timing recovery 517-k and can be determined in much the same fashion as in AGC 520-k of FIG. 5C. In the embodiment shown in FIG. 7, the gain values $q_k^{2(I)}$ and $q_k^{2(Q)}$ are determined based on the sign of the determined symbol from decision unit 516-k and the error signal. These calculations are discussed further below.

The output signals from amplifiers 537-k and 538-k can be input to quadrature correction 540-k. Quadrature correction 540-k corrects for the phase error between the in-phase and quadrature mixers at the transmitter. The angle $\hat{\theta}_k^{(2)}(n)$ of the phase error can be adaptively chosen in tracking and timing recovery 517. The value $\hat{\theta}_k^{(2)}(n)$ can be changed very slowly and can be almost constant.

Additionally, arithmetic offsets $OFFSET_2^I$ and $OFFSET_2^Q$ can be subtracted in summers 541-k and 542-k, respectively. The values of $OFFSET_2^I$ and $OFFSET_2^Q$ can be adaptively chosen in tracking and timing recovery 517-k. In some embodiments, the $OFFSET_2^I$ and $OFFSET_2^Q$ can be set by integrating the output signals of summers 541-k and 542-k, $G_k^I(n)$ and $G_k^Q(n)$, respectively. Alternatively, as shown in FIG. 7, $OFFSET_2^I$ and $OFFSET_2^Q$ can be set such that the error at decision unit 516-k is zero. In that embodiment, data dependent jitter can be reduced. In some embodiments, tracking and timing recovery 517-k integrates the error values between the output samples from decision unit 516-k and the output signals $G_k^I(n)$ and $G_k^Q(n)$ to minimize the error values.

The output signals $G_k^I(n)$ and $G_k^Q(n)$, then, are given by $$G_k^I(n) = g_k^{2-I} E_k^I(n) - OFFSET_2^I$$

$$G_k^Q(n) = g_k^{2-Q} E_k^Q(n) - g_k^{2-I} E_k^I(n)\hat{\theta}_k^{(2)} - OFFSET_2^Q. \quad (29)$$

FIG. 7 shows an embodiment of Tracking and Timing Recovery 517-k. Tracking and timing recovery 517-k inputs decision values $\hat{a}_k^I(n)$ and $\hat{a}_k^Q(n)$, which are decisions of the symbol values based on the signals $G_k^I(n)$ and $G_k^Q(n)$ in decision unit 516-k, and error values $e_k^I(n)$ and $e_k^Q(n)$ based on the decided values $\hat{a}_k^I(n)$ and $\hat{a}_k^Q(n)$ and the values $G_k^I(n)$ and $G_k^Q(n)$. In some embodiments, the error values $e_k^I(n)$ and $e_k^Q(n)$ are the differences between the decided values $\hat{a}_k^I(n)$ and $\hat{a}_k^Q(n)$ and the values $G_k^I(n)$ and $G_k^Q(n)$. The coefficients of equalizer 513-k of first digital filter 562-k are computed in coefficient update 702-k.

The coefficients of Equalizer 513-k of FIG. 5D are updated in tracking and timing recovery block 517-k. In a multi-tap equalizer, for example, equalizer coefficients can be updated according to the following update equations:

$$C_k^{x,I}(j,n+1) = C_k^{x,I}(j,n) - \mu[e_k^I(n)D_k^I(n-j)],$$

$$C_k^{x,Q}(j,n+1) = C_k^{x,Q}(j,n) - \mu[e_k^Q(n)D_k^Q(n-j)]$$

$$C_k^{y,I}(j,n+1) = C_k^{y,I}(j,n) - \mu[e_k^I(n)D_k^Q(n-j)], \text{ and}$$

$$C_k^{y,Q}(j,n+1) = C_k^{y,Q}(j,n) - \mu[e_k^Q(n)D_k^I(n-j)], \quad (30)$$

where $\mu$ is the constant that determines the rate of adaptation of the coefficients, j indicates the tap of the coefficient, and $e_k^I(n)$ and $e_k^Q(n)$ are estimated error values. The constant $\mu$ is chosen to control the rate of adaptation, and, in some embodiments, is in the range of $2^{-8}$ to $2^{-14}$. In some embodiments, the coefficient $\mu$ can be different for each of the update equations for $C_k^{x,I}$, $C_k^{x,Q}$, $C_k^{y,I}$ and $C_k^{y,Q}$. The estimated error values, which are computed by decision block 516-k, can be computed according to:

$$e_k^I(n) = G_k^I(n) - \hat{a}_k^I(n) \text{ and}$$

$$e_k^Q(n) = G_k^Q(n) - \hat{a}_k^Q(n), \quad (31)$$

where $G_k^I(n)$ and $G_k^Q(n)$ are corrected values of $E_k^I(n)$ and $E_k^Q(n)$, respectively, and $\{\hat{a}_k^I(n),\hat{a}_k^Q(n)\}$ is the decision set based on the sample set $\{G_k^I(n),G_k^Q(n)\}$, and represents the closest QAM symbol in Euclidean distance to the sample set. See, e.g., EDWARD A. LEE, AND DAVID G. MESSERSCHMITT, DIGITAL COMMUNICATION, pp. 371-402 (Kluwer Academic Publishers, 1988). A decision set $\{\hat{a}_k^I(n),\hat{a}_k^Q(n)\}$ can be computed based on sample set $\{G_k^I(n),G_k^Q(n)\}$ in decision unit 516-k and the results received into tracking and timing recovery circuit 517 where the estimated error values of Equation 30 and the resulting coefficient updates of Equation 30 are computed. p FIG. 7 shows a block diagram of equalizer coefficient update, carrier tracking and timing recovery block 517-k. Block 517-k includes coefficient update block 702-k. Errors $e_k^I(n)$ and $e_k^Q(n)$ are computed in decision block 516-k according to Equation 30. Coefficient update 702-k receives errors $e_k^I(n)$ and $e_k^Q(n)$ signals $D_k^I(n)$ and $D_k^Q(n)$ from phase rotator circuit 512-k shown in FIG. 5D and calculates updated equalizer coefficients for complex adaptive equalizer 513-k shown in FIG. 5D according to Equation 30.

Tracking and timing recovery circuit 517-k can also include a carrier recovery loop for controlling carrier phase rotation circuit 512-k shown in FIG. 5D and a timing recovery loop for controlling the phase of sampling clock signal SCLK from PLL 523. In some embodiments, the timing recovery loop for determining $\tau_k(n+1)$ in tracking and timing recovery 517 can be implemented as a $2^{nd}$ order digital phase locked loop as shown in FIG. 7.

The errors $e_k^I(n)$ and $e_k^Q(n)$ and the decisions $\hat{a}_k^I(n)$ and $\hat{a}_k^Q(n)$ from decision unit 516-k are input to phase detector 703-k. Phase detector 703-k can produce an estimate of the phase error $p_k^\tau$, in some embodiments according to the following equation:

$$p_k^\tau(n) = [e_k^I(n-1)\hat{a}_k^I(n) - e_k^I(n)\hat{a}_k^I(n-1)] + [e_k^Q(n-1)\\ \hat{a}_k^Q(n) - e_k^Q(n)\hat{a}_k^Q(n-1)]. \quad (32)$$

Alternatively, the phase error $p_k^\tau$ can be calculated from $$p_k^\tau(n) = e_k^I(n-1)[\hat{a}_k^I(n) - \hat{a}_k^I(n-2)] + e_k^Q(n-1)[\hat{a}_k^Q(n) - \\ \hat{a}_k^Q(n-2)], \quad (33)$$

which can be simpler to implement than Equation 32. In embodiments where the phase correction $\hat{\tau}_k$ is calculated from $e_k^I$ only or from $e_k^Q$ only, as discussed above, then the terms containing $e_k^Q$ or the terms containing $e_k^I$, respectively, are dropped from Equations 32 and 33.

The output signal from phase detector 703-k, $p_k^\tau$, can then be input to a $2^{nd}$ order loop filter, which in some embodiments can have a transfer function given by $$L(z) = \alpha_\tau + \beta_\tau \frac{z^{-1}}{1-z^{-1}} \quad (34)$$

where $\alpha_\tau$ and $\beta_\tau$ are the loop filter coefficients that determine the timing recovery loop bandwidth and damping factor. In some embodiments, a loop bandwidth equal to 1% of baud rate, and damping factor equal to 1 can be implemented. The loop bandwidth and damping factors can depend not only on loop filter coefficients, but also on phase detector slope, and the digital integrator gain. Thus, the output signal $L_k^\tau(n)$ from loop filter 705-k is given by $$L_k^\tau(n) = \alpha_\tau p_k^\tau(n) + I_k^\tau(n), \text{ where}$$

$$I_k^\tau(n) = I_k^\tau(n-1) + \beta_{vd} p_k^\tau(n-1). \quad (35)$$

The output signal from loop filter 705-k, $L_k^\tau(n)$, is then input to a digitally implemented integrator 707-k, the output of which is the phase correction $\hat{\tau}_k(n)$ given by $$\hat{\tau}_k(n+1) = \hat{\tau}_k(n) + L_k^\tau(n). \quad (36)$$

The phase correction $\hat{\tau}_k(n)$ is then received by PLL 523, as described above.

The carrier phase recovery loop which computes the parameter $\hat{\theta}$ utilized in phase rotation 512-k can also be implemented as a $2^{nd}$ order digital phase locked loop as shown in FIG. 7. Phase detector 704-k receives decision values $\{\hat{\alpha}_k^I(n),\hat{\alpha}_k^Q(n)\}$ and error signals $\{e_k^I(n),e_k^Q(n)\}$ from decision unit 516-k, and produces an estimate of the phase error. In some embodiments, the estimate of the phase error $p_k^\theta(n)$ performed by phase detector 704-k can be given by:

$$p_k^\theta(n)=[e_k^Q(n)\text{sign}\{\hat{\alpha}_k^I(n)\}-e_k^I(n)\text{sign}\{\hat{\alpha}_k^Q(n)\}], \text{ where} \quad (37)$$

$$\text{sign}(x) = \begin{cases} 1 \text{ if } x \geq 0 \\ -1 \text{ if } x < 0 \end{cases}. \quad (38)$$

The output signal from phase detector 704-k can be input to a $2^{nd}$ order loop filter 706-k with transfer function given by $$L(z) = \alpha_\theta + \beta_\theta \frac{z^{-1}}{1-z^{-1}}, \quad (39)$$

where $\alpha_\theta$ and $\beta_\theta$ are the loop filter coefficients that determine the carrier tracking loop bandwidth and the damping factor. Thus, the output signal from loop filter 706-k is given by $$L_k^\theta(n)=\alpha_\theta p_k^\theta(n)+I_k^\theta(n), \text{ where}$$

$$I_k^\theta(n)=I_k^\theta(n-1)+\beta_\theta p_k^\theta(n-1). \quad (40)$$

The output signal from loop filter 706-k is then input to a digitally implemented integrator 708-k. The output signal from integrator 708, $\hat{\theta}_k(n+1)$, is then given by $$\hat{\theta}_k(n+1)=\hat{\theta}_k(n)+L_k^\theta(n). \quad (41)$$

The carrier tracking loop output signal $\hat{\theta}_k(n)$, output from integrator 708-k, is then input to phase rotation circuit 512-k of FIG. 5D.

Further, as shown in FIG. 7, the parameter $\theta_k^c(n+1)$ can be calculated by phase detector 720-k and integrator 722-k as described in Equation 21. As described above, the parameter $\eta_k^c(n+1)$ input into multiplier 533-k shown in FIG. 5D can be calculated by blocks 723 and integration block 724 according to Equation 20.

As shown in Blocks 725-k and 726-k, the offset values OFFSET$_1^I$ and OFFSET$_1^Q$ input to summers 534-k and 536-k, respectively, of the embodiment of digital filter 562-k shown in FIG. 5D can be determined by integrating the signals $F_k^I(n)$ and $F_k^Q(n)$, respectively. Similarly, the offset values OFFSET$_2^I$ and OFFSET$_2^Q$ input to summers 541-k and 542-k, respectively, of digital filter 563-k shown in FIG. 5E can be calculated by integrating the signals $G_k^I(n)$ and $G_k^Q(n)$, respectively. The embodiment of adaptive parameter block 517-k shown in FIG. 7 calculates OFFSET$_2^I$ and OFFSET$^{2Q}$ by integrating the error signals $e_k^I(n)$ and $e_k^Q(n)$, respectively.

Further, the coefficient $\hat{\theta}_k^{(2)}$ to quadrature correction 540-k of FIG. 5E can be calculated by phase detector 729-k and integrator 731-k. The output signal from phase detector 729-k can be calculated by $$P_k^{\theta 2}=-\text{sign}(\hat{\alpha}_k^I(n))e_k^Q(n)-\text{sign}(\hat{\alpha}_k^Q(n))e_k^I(n) \quad (42)$$

The output signal from integrator 731-k, then, can be given by $$\theta_k^{(2)}(n+1)=\theta_k^{(2)}(n)+\alpha_\theta P_k^{\theta 2} \quad (43)$$

The gains $g_k^{2-I}$ and $g_k^{2-Q}$ can be calculated by phase detector 732 and integrator 734. In some embodiments, phase detector 732-k calculates the quantities $$p_k^{g2-I}(n)=-e_k^I(n)\text{sign}(\hat{\alpha}_k^I(n)) \text{ and}$$

$$p_k^{g2-Q}(n)=-e_k^Q(n)\text{sign}(\hat{\alpha}_k^Q(n)). \quad (44)$$

The output signals from integrator 734-k, then, can be given by $$g_k^{2-I}(n+1)=g_k^{2-I}(n)+\alpha_g p_k^{g2-I} \text{ and}$$

$$g_k^{2-Q}(n+1)=g_k^{2-Q}(n)+\alpha_g p_k^{g2-Q}, \quad (45)$$

where $\alpha_g$ determines how fast the gain values respond to changes.

As show in FIG. 5A, cross-channel adaptive parameter block 571 adaptively adjusts the parameters of cross-channel interference canceller 570, all of the a $\sigma_{k,l}^{m,I \text{ or } Q}$ parameters of Equations 26 and 27. In an embodiment where the cross-channel transfer functions $Q_{k,l}$ is a 5 tap function and K=8, there are 5*K*(K-1)=280 individual complex parameters $\sigma^{k,l,m,I \text{ or } Q}$ to adjust in Equations 27 and 28.

In some embodiments, cross-channel adaptive parameter block 571 receives the complex input values $E_I$ through $E_K$, where $E_k$, an arbitrary one of them, is given by $E_k=E_k^I+iE_k^Q$ (see FIG. 5F), and error signals $\{e_k(n)=e_k^I(n)+ie_k^Q(n)\}$ from decision unit 516-k of each of receivers 222-1 through 222-K. On start-up of receiver system 220-p, all of complex parameters $\sigma_{k,l}^{m,I \text{ or } Q}$ can be set to 0. Each of complex parameters $\sigma^{k,l,m,I \text{ or } Q}$ can then be updated according to $$\sigma_{k,l}^{m,x,I}(n+1)=\sigma_{k,l}^{m,x,I}(n)+\upsilon_{k,l}^{m,x,I}(e_l^I(n)E_k^I(n-m));$$

$$\sigma_{k,l}^{m,y,I}(n+1)=\sigma_{k,l}^{m,y,I}(n)-\upsilon_{k,l}^{m,y,I}(e_l^I(n)E_k^Q(n-m)), \text{ and} \quad (46)$$

$$\sigma_{k,l}^{m,x,Q}(n+1)=\sigma_{k,l}^{m,x,Q}(n)+\upsilon_{k,l}^{m,x,Q}(e_l^Q(n)E_k^Q(n-m));$$

$$\sigma_{k,l}^{m,y,Q}(n+1)=\sigma_{k,l}^{m,y,Q}(n)+\upsilon_{k,l}^{m,y,Q}(e_l^Q(n)E_k^I(n-m)). \quad (47)$$

In Equation 28, $$\sigma_{k,l}^{m,I}=\sigma_{k,l}^{m,x,I}+i\sigma_{k,l}^{m,y,I} \text{ and}$$

$$\sigma_{k,l}^{m,Q}=\sigma_{k,l}^{m,x,Q}+i\sigma_{k,l}^{m,y,Q}. \quad (48)$$

Additionally, the quantity $\upsilon_{k,l}^{m,I \text{ or } Q}=\upsilon_{k,l}^{m,x,I \text{ or } Q}+i\upsilon_{k,l}^{m,y,I \text{ or } Q}$ is the complex update coefficient for parameter $\sigma_{k,l}^{m,I \text{ or } Q}$ and controls how fast parameter $\sigma_{k,l}^{m,I \text{ or } Q}$ can change, in similar fashion as has been described with other update equations above. In some embodiments, all of the parameters $\upsilon^{k,l,m,x,I \text{ or } Q}$ and $\upsilon_{k,l}^{m,y,I \text{ or } Q}$ each have values on the order of $10^{-3}$ to $10^{-5}$.

In some embodiments, frequency shift 563 generates a reference signal input to PLL 523 such that the frequency of component 201-p with receiver system 220-p, $\hat{f}_1$ through $\hat{f}_K$, matches the frequency of the corresponding component 201-q with transmitter system 210-q, $f_1$ through $f_K$, where component 201-q is transmitting data to component 201-p. In embodiments where $f_1$ through $f_K$ correspond to frequencies $f_0$ through $Kf_0$, respectively, then frequency shift 563 shifts the frequency of a reference clock such that the frequency shift $\Delta$ is zero. The frequencies $\hat{f}_1$ through $\hat{f}_K$, then, are also frequencies $f_0$ through $Kf_0$. In some embodiments, frequency shift 563 can receive input from any or all loop filters 706-k (FIG. 7) and adjusts the frequency shift such that $\hat{\theta}_k^{(1)}$ through $\hat{\theta}_k^{(K)}$ remain a constant, for example 0 or any other angle. In some embodiments, frequency shift 563 receives the output signals from any or all loop filters 705-k.

As shown in FIG. 5A, the output signals from digital filter 563-k, equalized samples $\{G_k^I(n), G_k^Q(n)\}$, are input to trellis decoder 514-k. Trellis decoding can be performed using the Viterbi algorithm, see, e.g., G. Ungerboeck., "Channel Coding with Multilevel/Phase Signals," IEEE Transactions on Information Theory, vol. IT-28, January 1982, pp. 55-67, G. Ungerboeck., "Trellis Coding Modulation with Redundant Signal Sets, Part I. Introduction," IEEE Communications Magazine, vol. 25, no. 2, February 1987, pp. 5-11, G. Ungerboeck., "Trellis Coding Modulation with Redundant Signal Sets, Part II. State of the Art," IEEE Communications Magazine, vol. 25, no. 2, February 1987, pp. 12-21, or G. C. CLARK, JR., AND J. B. CAIN, ERROR CORRECTION CODING FOR DIGITAL COMMUNICATIONS, pp.253-264(Plenum Press, New York, 1981). Additionally, trellis decoder 514 converts from the QAM symbol set back to parallel bits. The output signal from trellis decoder 514, which now contains $n_k$ parallel bits, is input to descrambler 515-k. Descrambler 515-k of receiver demodulator 222-k operates to reverse the scrambling operation of scrambler 401 of transmitter modulator 212-k.

As is shown in FIG. 2C, the output signals from each of demodulators 222-1 through 222-K are recombined into an N-bit parallel signal in bit parsing 221. Additionally, the RX clock signal is output from bit parsing 221.

Figure 10A:
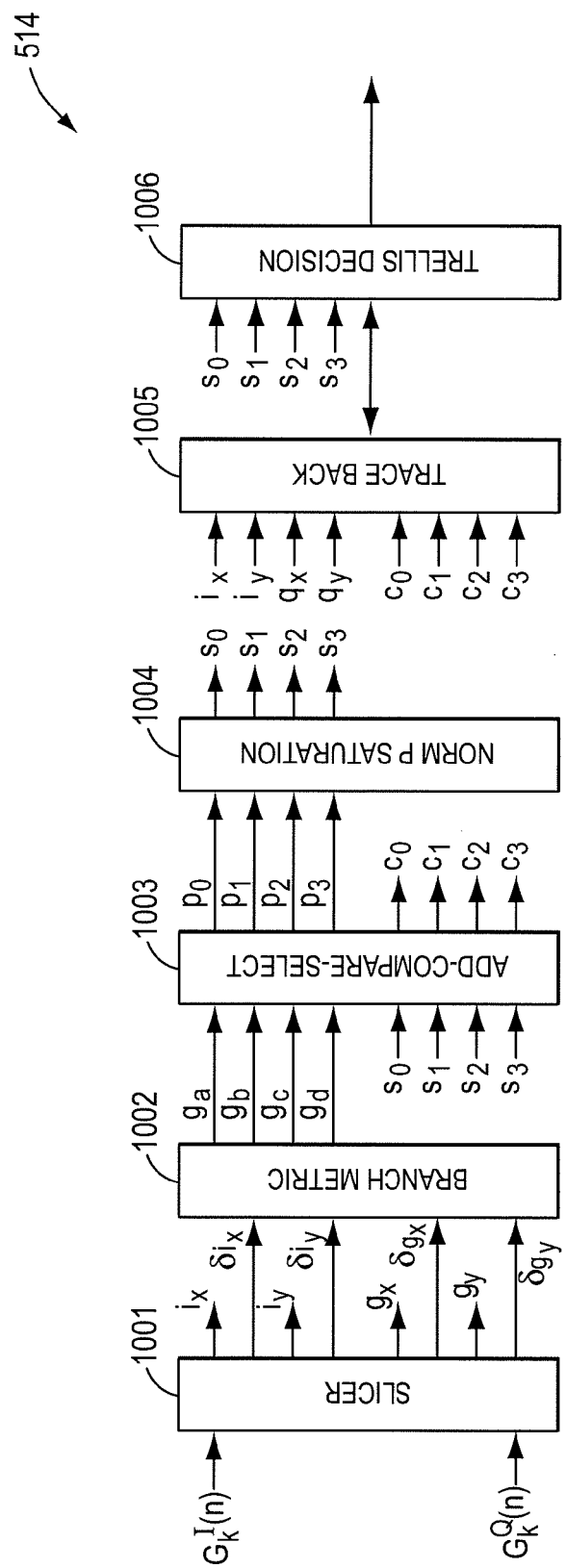
FIGS. 10A, 10B and 10C illustrate an embodiment of a trellis decoder.

FIG. 10 shows an example embodiment of trellis decoder 514 according to the present invention. Trellis decoder 514 of FIG. 10A includes a slicer 1001, a branch metric 1002, an add-compare-select (ACS) block 1003, a normalization and saturation block 1004, a trace back 1005, and a trellis decision block 1006. The output signal from trellis decoder 514 is the received bits, which are substantially as transmitted by transmitter 210-p.

Figure 10B:
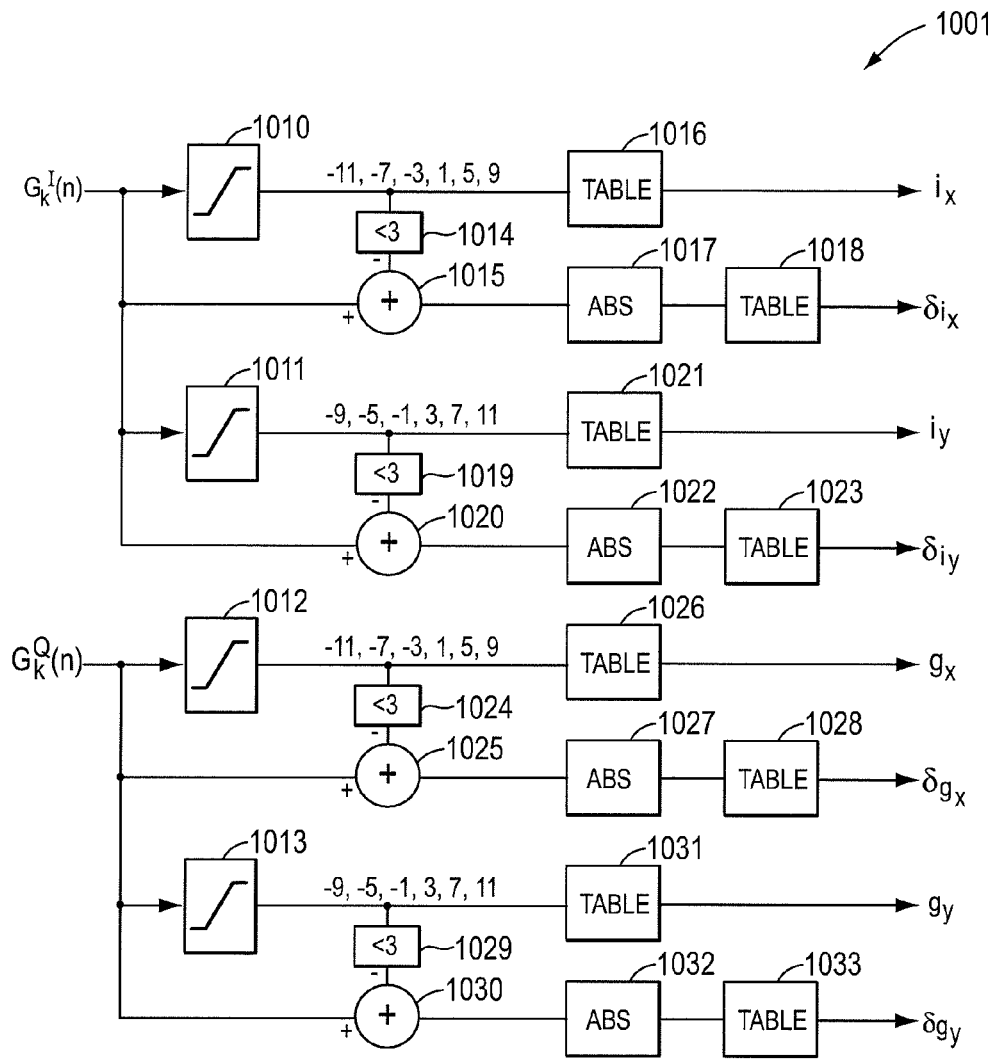
Figure 10C:
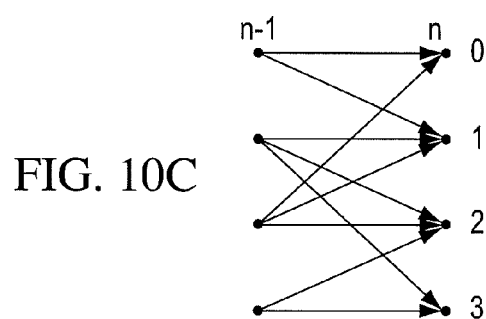

Slicer 1001 receives the output signals $G_k^I(n)$ and $G_k^Q(n)$ from offset blocks 541 and 542, respectively. FIG. 10B shows an embodiment of slicer 1001. The value $G_k^I(n)$ is received in x and y slicers 1010 and 1011, respectively. Slicer 1010 slices $G_k^I(n)$ to a first set of symbol values while slicer 1011 slices $G_k^I(n)$ to a second set of slicer values. For example, in a 128 QAM system as shown in Table I, x-slicer 1010 can slice to the symbol values $-11, -7, -3, 1, 5,$ and 9 and y-slicer 1011 can slice to the symbol values $-9, -5, -1, 3, 7, 11$. In some embodiments, the number of bits can be reduced by mapping the decided symbols from slicers 1010 and 1011 using table 1016 and 1021, respectively. The output signal from tables 1016 and 1021, then, are $i_x$ and $1_y$, indicating decisions based on the input value $G_k^I(n)$.

TABLE II

| INPUT | 0-8 | 9, 10 | 11, 12, 13 | >14 |
|---|---|---|---|---|
| OUPUT | 0 | 1 | 2 | 3 |

The errors $\delta i_x$ and $\delta i_y$ are also calculated. The output signals from slicers 1010 and 1011 are subtracted from the input signal $G_k^I(n)$ in summers 1015 and 1020, respectively. In some embodiments, the output signals from slicers 1010 and 1011 are input to blocks 1014 and 1019, respectively, before subtraction in summers 1015 and 1020. Blocks 1014 and 1019 represent shifts. In some embodiments, the input signals to slicers 1010 and 1011 are 8-bit signed numbers. The value 8 slices to a perfect 1. Similarly, the value −56 slices to a perfect −7. So if the input signal is a −56 it would be sliced to −7. To calculate the error, we need to multiply the −7 by 8 before it is subtracted from the incoming signal. Multiplying by 8 is the same as a shift to the left by 3.

The absolute values of the output signals from summers 1015 and 1020 are then taken by blocks 1017 and 1022, respectively. The output signal from ABS blocks 1017 and 1022 can be mapped into a set of values requiring a smaller number of bits by tables 1018 and 1023, as in Table II above, respectively, to generate $\delta i_x$ and $\delta i_y$, respectively.

The output signals corresponding to the quadrature data path, $q_x$, $q_y$, $\delta q_x$ and $\delta q_y$, are generated by substantially identical procedure by slicers 1012, 1013, summers 1025, 1030, and blocks 1024, 1026, 1027, 1028, 1029, 1031, 1032 and 1033.

Branch metric 1002 receives the error signals from slicer 1001 and calculates the signals $\delta a, \delta b, \delta c,$ and $\delta d$. The branch metric values $\delta a, \delta b, \delta c,$ and $\delta d$ indicate the path metric errors. In some embodiments, the path metric errors $\delta a, \delta b, \delta c,$ and $\delta d$ can be calculated as $$\delta a = \delta i_x + \delta q_x,$$

$$\delta b = \delta i_y + \delta q_x,$$

$$\delta c = \delta i_x + \delta q_y,$$

$$\delta d = \delta i_y + \delta q_y. \quad \text{tm (49)}$$

Add-Compare Select 1003 receives the path metrics $\delta a, \delta b, \delta c,$ and $\delta d$ along with state metric values $s_0, s_1, s_2$ and $s_3$, which are calculated in normalization and saturation block 1004. In some embodiments, the output values of ACS 1003 include path metrics $p_0, p_1, p_2$ and $p_3$ along with choice indicators $c_0, c_1, c_2$ and $c_3$. The path metrics $p_0, p_1, p_2$ and $p_3$ can be given by $$p_0 = \text{MIN}(s_0 + \delta a, s_2 + \delta d),$$

$$p_1 = \text{MIN}(s_0 + \delta d, s_2 + \delta a),$$

$$p_2 = \text{MIN}(s_1 + \delta b, s_3 + \delta c), \text{ and}$$

$$p_3 = \text{MIN}(s_1 + \delta c, s_2 + \delta b). \quad (50)$$

The choice indicators $c_0, c_1, c_2$ and $c_3$ indicate which of the values was chosen in each of the minimization in Equation 43.

Normalization and saturation 1004 receives the path metrics $p_0, p_1, p_2$ and $p_3$ and calculates the state metrics $s_0, s_1, s_2$ and $s_3$. In some embodiments, if the path metrics are above a threshold value, the threshold value is subtracted from each of the path metrics. In some embodiments, the smallest path metric can be subtracted from each of the path metrics $p_0, p_1, p_2$ and $p_3$. Normalization and Saturation block 1004 also ensures that path metrics $p_0, p_1, p_2$ and $p_3$ are limited to a maximum value. For example, in an embodiment where $p_0, p_1, p_2$ and $p_3$ are a four-bit number (range 0-15), if $p_0, p_1, p_2$ or $p_3$ is greater than 15, then the corresponding path metric is limited to the maximum value of 15. Then, the state metrics for the next baud period, $s_0, s_1, s_2$ and $s_3$, are set to the path metrics $p_0, p_1, p_2$ and $p_3$.

Traceback 1005 receives and stores the choice indicators $c_0, c_1, c_2$ and $c_3$ as well as the decided values from slicer 1001 in that baud period, $i_x, i_y, q_x,$ and $q_y$. The choice indicators $c_0, c_1, c_2$ and $c_3$ indicate the previous state values. As shown in the state transition diagram of FIG. 10C, which indicates state transitions between the encoded bits, for each of the states 0-3, there are only two possible previous states 0-3. For example, if the current state is 1, the previous state was either 0 or 2. Although any traceback depth can be utilized in traceback 1005, in some embodiments a traceback depth of 6 is utilized. With the use of mapping tables 1016, 1021, 1026 and 1031 reducing the number of bits required to store $i_x$, $i_y$, $q_x$, and $q_y$, (for example a total of 8 in 128 QAM systems) and the low number of bits required to store choice indicators $c_0$, $c_1$, $c_2$ and $c_3$, a low number of bits is needed. For example, in some embodiments a total of 12 bits is utilized.

For calculating the trellis output from trace back 1005, the most recently stored memory locations are utilized first with the first choice being the state with the lowest state metric. The algorithm then traces back through the stored choice indications $c_0$, $c_1$, $c_2$ and $c_3$ to the end of the traceback memory (in some embodiments, the sixth state) and arrives at state S. In the example trellis discussed above, the MSB of the output is the LSB of the state, S. The final state S and the choice indicator $c_s$ will determine which pair of symbols were transmitted ($I_x/I_y$, $Q_x/Q_y$). By reading the values of these symbols from the traceback memory, a look-up in, for example, Table I will result in a read value. The five least significant bits of the read value from the look-up table, e.g. Table I, becomes the five least significant bits of the output signal. The most significant bit was determined earlier and supplies the most significant bit (MSB).

If the example 16 state encoder described earlier is used, then a standard 16 state trellis decoder using the Viterbi algorithm can be utilized in the decoding. The 2/3 bit encoding is illustrated in Table II for the most significant bits and a look-up table for a 7 bit data mapper is illustrated in Table III.

Figure 9:
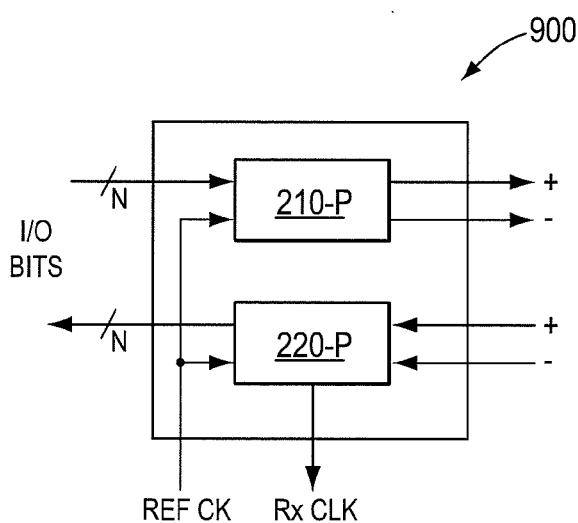
FIG. 9 shows a block diagram of a transceiver chip according to the present invention.

FIG. 9 shows a transceiver chip 900 according to the present invention. Transceiver chip 900 includes transmitter 210-p and receiver 220-p formed on a single semiconductor chip. In some embodiments, transceiver chip 900 is formed in silicon using CMOS technology. Transceiver chip 900 can receive N bits into transmitter 210-p and output N bits from receiver 220-p. In some embodiments, different pins may be utilized for input bits and output bits, as shown in FIG. 9. In some embodiments, transmitter 210-p and receiver 220-p share the same N pins. Transmitter 900 receives a reference clock signal and outputs a receive clock signal from receiver 220-p. Further, transceiver 220 includes output pins for transmitting and receiving differential signals. In some embodiments, transmitter 210-p and receiver 220-p share the same output pins and in some embodiments transmitter 210-p and receiver 220-p are coupled to separate output pins. In some embodiments, transceiver chip 900 may be coupled to an optical driver for optical transmission.

Although the digital algorithms described in this disclosure are presented as digital circuitry elements, one skilled in the art will recognize that these algorithms can also be performed by one or more digital processors executing software code to perform the same functions.

Figure 12A:
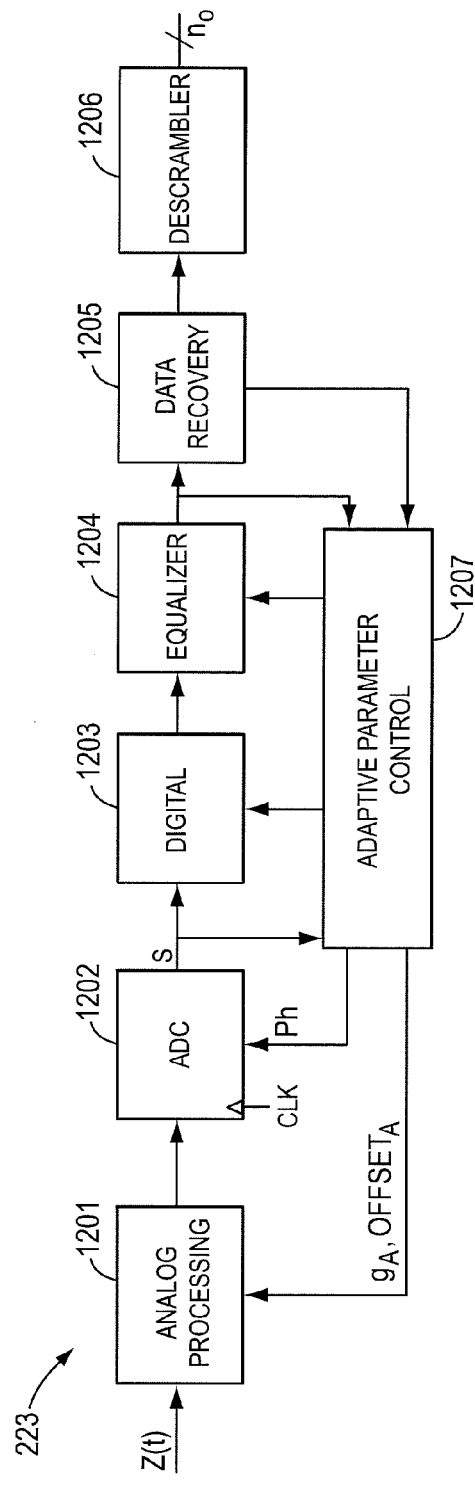
FIG. 12A shows an embodiment of a baseband receiver according to the present invention.

FIG. 12A shows an embodiment of baseband receiver 223. Baseband transmitter 217 and baseband receiver 223 may, for example, form a PAM transceiver. The signal from medium 250 (see FIG. 2A) is received by analog processing 1201. Analog processing 1201, for example, can include a low-pass filter in order to separate the baseband signal from those signals transported with carrier frequencies, such as those transmitted by transmitters 212-1 through 212-K. Filter 1201 can further include some analog correction of the signals, including anti-aliasing filters, base-line wander filters, or other filters.

Figure 12B:
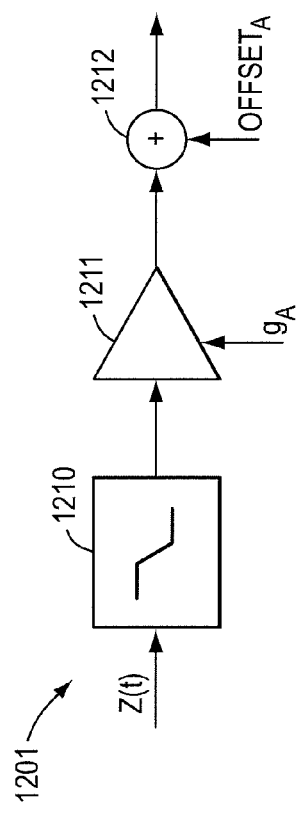
FIGS. 12B through 12C show embodiments of components of the embodiment of the baseband receiver shown in FIG. 12A.

FIG. 12B shows an embodiment of analog processing 1201. The input signal Z(t) is received by a low pass filter 1210. The parameters of low pass filter 1210 can be fixed, however in some embodiments the filter can be adjusted dynamically, for example, by adaptive parameter control 1207 of FIG. 12A. The output signal from filter 1210 is input to amplifier 1211. In some embodiments, the gain of amplifier 1211, gA, can be given by $$g_A(n+1)=g_A(n)+\alpha_A(P_{A-Th}-P), \quad (51)$$

where $\alpha_A$ is a multiplier which controls convergence of the gain, $P_{A-TH}$ is a threshold value on peak power, and P is the mean squared power $S^2$, where S is the digitized signal from ADC 1202. Amplifier 1211, then, arranges that the range of ADC 1202 is filled.

The output signal from amplifier 1211 can be input to offset 1212. The offset value $OFFSET_A$ can be arranged by adaptive parameter control 1207 such that the average output signal S from ADC 1202 is zero. The offset value $OFFSET_A$, for example, can be given by $$OFFSET_A(n+1)=OFFSET_A(n)-\alpha_{OFF}S, \quad (52)$$

where $\alpha_{OFF}$ is again the multiplicative factor that controls convergence and S is the signal output from ADC converter 1202.

The output signal from analog processing 1201 is input to ADC 1202 where it is digitized. ADC 1202 can have any number of bits of resolution. At least a four bit ADC, for example, can be utilized in a 16-PAM system. ADC 1202 can be clocked from a clock signal generated by receiver 120-p in general, for example in PLL 523 as shown in FIG. 5A. In some embodiments, adaptive parameter control 1207 can generate a phase signal which can add a phase to the timing of ADC 1202. In those embodiments, the phase signal Ph can be given by the same technique as described with the calculation of phase performed by phase detector 703-k, loop filter 705-k, and integrator 707-k, shown in FIG. 7, for the in-phase signal.

The output signal from ADC 1202, S, can be input to a digital filter 1203. Further filtering and shaping of the signal can occur in digital filter 1203. Filter 1203 can be, for example, a digital base-line wander filter, a digital automatic gain control circuit, an echo or next canceller, or any other filter. For example, if necessary, digital filter 1203 can be part of cross channel interference filter 570 (shown in FIG. 5A). The output signal from digital filter 1203 is input to equalizer 1204.

Figure 12C:
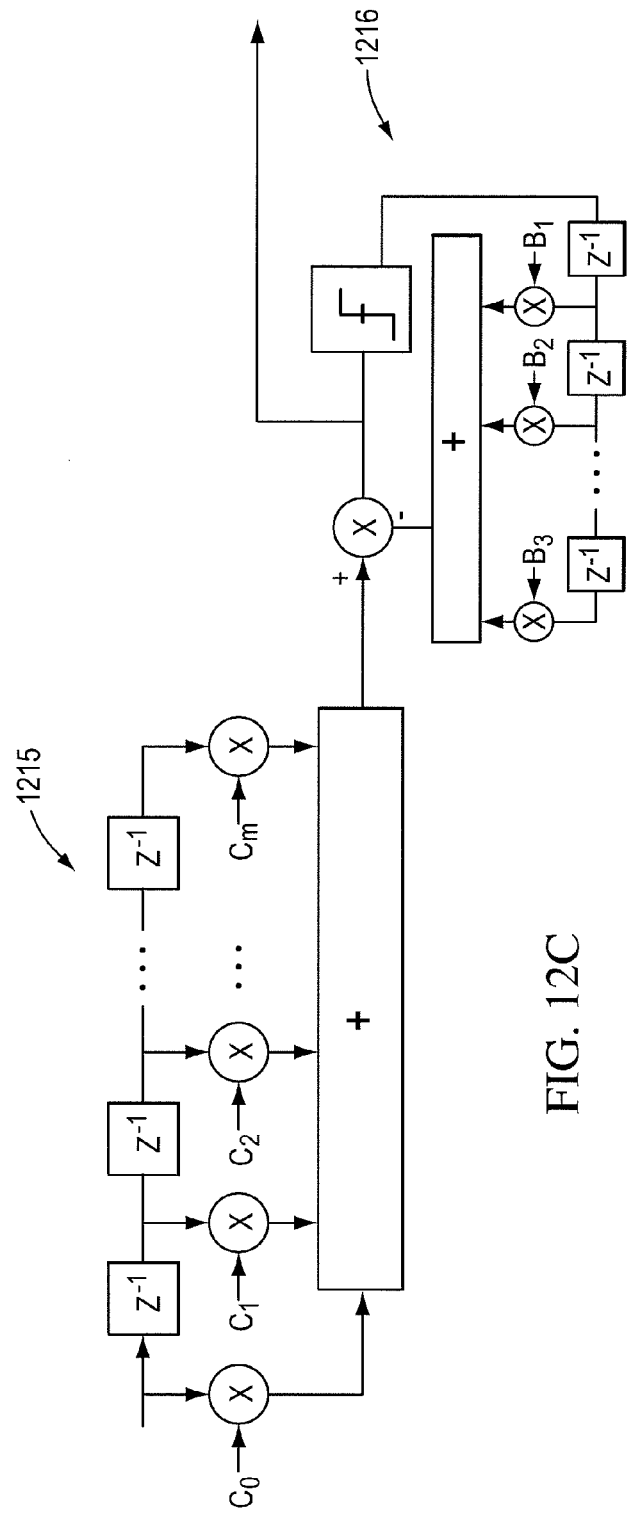

Equalizer 1204 equalizes the signal for intersymbol interference. Equalizer 1203 can include a feed-forward section, a feed-back section, or a combination of feed-forward and feed-back sections. FIG. 12C shows an embodiment of equalizer 1204 with a combination of a feed-forward section 1215 and feed-back section 1216. Each of feed-forward section 1215 and feed-back section 1216 can include any number of taps. Each of the equalization parameters $C_0$ through $C_M$ of feed-forward section 1215 and B, through BN of feed-back section 1216 can be adaptively chosen in adaptive parameter control 1207 similarly to the methods previously discussed above.

The output signal from equalizer 1204 can then be input to data recovery 1205. Data recovery 1205 recovers the digital signal from the signals. In some embodiments, data recovery 1205 is a PAM slicer. In some embodiments, data recovery 1205 can also include an error correction decoder such as a trellis decoder, a Reed-Solomon decoder or other decoder. The output signal from data recovery 1205 is then input to descrambler 1206 so that the transmitted parallel bits are recovered.

The embodiments of the invention described above are exemplary only and are not intended to be limiting. One skilled in the art will recognize various modifications to the embodiments disclosed that are intended to be within the scope and spirit of the present disclosure. As such, the invention is limited only by the following claims.

TABLE I

| | | | | | | | | | | | | I/Q |
|---|---|---|---|---|---|---|---|---|---|---|---|---|
| | | 47 | 111 | 43 | 107 | 59 | 123 | 63 | 127 | | | 11 |
| | | 15 | 79 | 11 | 75 | 27 | 91 | 31 | 95 | | | 9 |
| 42 | 106 | 45 | 109 | 41 | 105 | 57 | 121 | 61 | 125 | 58 | 122 | 7 |
| 10 | 74 | 13 | 77 | 9 | 73 | 25 | 89 | 29 | 93 | 26 | 90 | 5 |
| 46 | 110 | 44 | 108 | 40 | 104 | 56 | 120 | 60 | 124 | 62 | 126 | 3 |
| 14 | 78 | 12 | 76 | 8 | 72 | 24 | 88 | 28 | 92 | 30 | 94 | 1 |
| 38 | 102 | 36 | 100 | 32 | 96 | 48 | 112 | 52 | 116 | 54 | 118 | −1 |
| 6 | 70 | 4 | 68 | 0 | 64 | 16 | 80 | 20 | 84 | 22 | 86 | −3 |
| 34 | 98 | 37 | 101 | 33 | 97 | 49 | 113 | 53 | 117 | 50 | 114 | −5 |
| 2 | 66 | 5 | 69 | 1 | 65 | 17 | 81 | 21 | 85 | 18 | 82 | −7 |
| | | 39 | 103 | 35 | 99 | 51 | 115 | 55 | 119 | | | −9 |
| | | 7 | 71 | 3 | 67 | 19 | 83 | 23 | 87 | | | −11 |
| −11 | −9 | −7 | −5 | −3 | −1 | 1 | 3 | 5 | 7 | 9 | 11 | I/Q |

TABLE II

| State Transition | Encoded value |
|---|---|
| 0 ⟹ 0 | 0 |
| 3 ⟹ 14 | |
| 4 ⟹ 1 | |
| 7 ⟹ 12 | |
| 8 ⟹ 2 | |
| 11 ⟹ 15 | |
| 12 ⟹ 3 | |
| 15 ⟹ 3 | |
| 0 ⟹ 1 | 1 |
| 3 ⟹ 12 | |
| 4 ⟹ 3 | |
| 7 ⟹ 13 | |
| 8 ⟹ 0 | |
| 11 ⟹ 14 | |
| 12 ⟹ 2 | |
| 15 ⟹ 15 | |
| 0 ⟹ 2 | 6 |
| 3 ⟹ 15 | |
| 4 ⟹ 0 | |
| 7 ⟹ 14 | |
| 8 ⟹ 3 | |
| 11 ⟹ 13 | |
| 12 ⟹ 1 | |
| 15 ⟹ 12 | |
| 0 ⟹ 3 | 7 |
| 3 ⟹ 13 | |
| 4 ⟹ 2 | |
| 7 ⟹ 15 | |
| 8 ⟹ 1 | |
| 11 ⟹ 12 | |
| 12 ⟹ 0 | |
| 15 ⟹ 14 | |
| 1 ⟹ 6 | 2 |

TABLE II-continued

| State Transition | Encoded value |
|---|---|
| 2 ⟹ 8 | |
| 5 ⟹ 5 | |
| 6 ⟹ 10 | |
| 9 ⟹ 7 | |
| 10 ⟹ 9 | |
| 13 ⟹ 4 | |
| 14 ⟹ 11 | |
| 1 ⟹ 5 | 3 |
| 2 ⟹ 10 | |
| 5 ⟹ 7 | |
| 6 ⟹ 9 | |
| 9 ⟹ 4 | |
| 10 ⟹ 11 | |
| 13 ⟹ 6 | |
| 14 ⟹ 8 | |
| 1 ⟹ 7 | 4 |
| 2 ⟹ 9 | |
| 5 ⟹ 4 | |
| 6 ⟹ 11 | |
| 9 ⟹ 6 | |
| 10 ⟹ 8 | |
| 13 ⟹ 5 | |
| 14 ⟹ 10 | |
| 1 ⟹ 4 | 5 |
| 2 ⟹ 11 | |
| 5 ⟹ 6 | |
| 6 ⟹ 8 | |
| 9 ⟹ 5 | |
| 10 ⟹ 10 | |
| 13 ⟹ 7 | |
| 14 ⟹ 9 | |

TABLE III

| | | | | | | | | | | | | I/Q |
|---|---|---|---|---|---|---|---|---|---|---|---|---|
| | | 24 | 88 | 3 | 67 | 29 | 93 | 0 | 64 | | | 11 |
| | | 56 | 120 | 35 | 99 | 61 | 125 | 32 | 96 | | | 9 |
| 20 | 84 | 2 | 66 | 25 | 89 | 7 | 71 | 30 | 94 | 12 | 76 | 7 |
| 52 | 116 | 34 | 98 | 57 | 121 | 39 | 103 | 62 | 126 | 44 | 108 | 5 |
| 1 | 65 | 21 | 85 | 6 | 70 | 26 | 90 | 11 | 75 | 31 | 95 | 3 |
| 33 | 97 | 53 | 117 | 38 | 102 | 58 | 122 | 43 | 107 | 63 | 127 | 1 |
| 17 | 81 | 5 | 69 | 22 | 86 | 10 | 74 | 27 | 91 | 15 | 79 | −1 |
| 49 | 113 | 37 | 101 | 54 | 118 | 42 | 106 | 59 | 123 | 47 | 111 | −3 |
| 4 | 68 | 18 | 82 | 9 | 73 | 23 | 87 | 14 | 78 | 28 | 92 | −5 |
| 36 | 100 | 50 | 114 | 41 | 105 | 55 | 119 | 46 | 110 | 60 | 124 | −7 |
| | | 8 | 72 | 19 | 83 | 13 | 77 | 16 | 80 | | | −9 |
| | | 40 | 104 | 51 | 115 | 45 | 109 | 48 | 112 | | | −11 |
| −11 | −9 | −7 | −5 | −3 | −1 | 1 | 3 | 5 | 7 | 9 | 11 | I/Q |

We claim:

1. A transmission system, comprising: a baseband receiver to receive a baseband signal from a transmitted signal; and one or more down-converting receivers that receive a signal in the transmitted signal that was transmitted in a corresponding one or more frequency separated transmission bands,
wherein at least one of the down-converting receivers comprises: a down converter that converts the signal from the transmitted signal from the one of the plurality of transmission bands to a base band; a filter coupled to receive signals from the down converter, the filter substantially filtering out signals not in the base band; an analog-to-digital converter coupled to receive signals from the filter and generate digitized signals; an equalizer coupled to receive the digitized signals; and
wherein operating parameters of at least one of the down converter, the filter, the analog-to-digital converter, and the equalizer are adaptively chosen.

2. The system of claim 1, wherein the down-converter creates an in-phase signal and a quadrature signal, the in-phase signal being the input signal multiplied by a cosine function at the frequency of the one of the plurality of transmission bands and the quadrature signal being the input signal multiplied by a sine function at the frequency of the one of the plurality of transmission bands.

3. The system of claim 1, further including a descrambler circuit coupled to receive signals from the data recovery circuit.

4. The system of claim 1, further including a cross-channel interference correction circuit coupled between the one or more down-converting receivers.

5. The system of claim 4 wherein the cross-channel interference correction circuit corrects for interference between transmissions in the baseband and transmissions in the frequency separated transmission bands.

6. The system of claim 4 wherein the cross-channel interference correction circuit is further coupled to the baseband receiver to correct transmissions in the baseband for interference from transmissions in the frequency separated transmission bands.

7. The system of claim 1, further including a baseband transmitter that transmits data into the baseband; and one or more up-converting transmitters that transmit data into one of the frequency separated transmission bands.

8. The system of claim 7, wherein at least one of the up-converting transmitters includes a symbol mapper coupled to map a set of digital inputs to a symbol; and an up-conversion circuit coupled to form a transmission signal from the symbol at a carrier frequency.

9. The system of claim 7, further including a summer wherein the output signal from the up-converting transmitters is summed to form a sum signal.

10. The system of claim 9, further including a second summer wherein the sum signal is summed with an output signal from the baseband transmitter to form the transmitted signal.

11. The system of claim 10, further including a high-pass filter coupled between the summer and the second summer to filter any base-band contribution out of the sum signal.

12. The system of claim 10, further including a low-pass filter coupled between the baseband transmitter and the second summer to filter any higher frequency component from the output signal from the baseband transmitter.

13. A transmission system, comprising: a baseband receiver to receive a baseband signal from a transmitted signal; and one or more down-converting receivers that receive a signal in the transmitted signal that was transmitted in a corresponding one or more frequency separated transmission band,
wherein the baseband receiver includes an analog processing circuit to receive an input signal; an analog-to-digital converter coupled to receive signals from the low-pass filter; and a data recovery block coupled to receive signals from the analog-to-digital converter; and
wherein the analog processing circuit receives adaptively chosen parameters from an adaptive parameter control circuit.

14. The system of claim 13, wherein the analog processing circuit includes a low-pass filter.

15. The system of claim 13, wherein the analog processing circuit includes an amplifier.

16. The system of claim 13, wherein the analog processing circuit includes an offset.

17. The system of claim 13, wherein a digital circuit is coupled between the analog to digital converter and the data recovery circuit.

18. The system of claim 17, wherein the digital circuit includes a digital gain block.

19. The system of claim 17, wherein the digital circuit includes a digital base-line correction block.

20. The system of claim 17, wherein the digital circuit includes an equalizer.

21. The system of claim 20, wherein the equalizer includes a decision feedback equalizer.

22. The system of claim 20, wherein the equalizer includes a linear equalizer.

23. The system of claim 17, wherein the digital circuit receives at least one parameter that is adaptively chosen in an adaptive parameter control circuit.

24. The system of claim 13, wherein the data recovery circuit is a slicer.

25. The system of claim 13, wherein the data recovery circuit includes a forward error correction decoding circuit.

26. The system of claim 25, wherein the forward error correction decoding circuit is a trellis decoder.

27. The system of claim 25, wherein the forward error correction decoding circuit is a Reed-Solomon decoding circuit.

28. A method of transmitting data, comprising: receiving a transmitted signal from a transmission medium into a baseband receiver and one or more down-converting receivers; each of the down-converting receivers down-converting the transmission signal by a set carrier frequency to obtain a data signal for that down-converting receiver; and the baseband receiver receiving a data signal from the baseband of the transmitted signal;
further including correcting for cross-channel interference;
wherein correcting for cross-channel interference includes: receiving equalized signals from two or more of the baseband receiver and the down-converting receivers; and subtracting components of the equalized signals from two or more of the baseband receiver and the down-converting receivers.

29. The method of claim 28, further including forming a baseband signal in a baseband transmitter; forming one or more frequency separated signals in one or more up-converting transmitters; summing the baseband signal with the one or more frequency separated signals to form a sum signal; and transmitting the sum signal over the transmission medium to form the transmitted signal.

30. The method of claim 29, further including filtering a sum of the one or more frequency separated signals with a high pass filter before summing.

31. The method of claim 29, further including filtering the baseband signal with a low pass filter before summing.

32. The method of claim 28, wherein correcting for cross-channel interference includes correcting for interference between the down-converting receivers.

33. The method of claim 28, wherein correcting for cross-channel interference includes correcting for interference between the down-converting receivers and the baseband receiver.

34. The method of claim 28, wherein subtracting components of the equalized signals includes providing a transfer function between each pair of the two or more of the baseband receiver and the down-converting receivers.

35. The method of claim 34 wherein coefficients of the transfer function are adaptively chosen.

* * * * *